(12) United States Patent
Chen et al.

(10) Patent No.: US 10,288,845 B2
(45) Date of Patent: May 14, 2019

(54) IMAGE CAPTURING LENS SYSTEM, IMAGE CAPTURING UNIT AND ELECTRONIC DEVICE

(71) Applicant: LARGAN Precision Co., Ltd., Taichung (TW)

(72) Inventors: Hung-Shuo Chen, Taichung (TW); Hsin-Hsuan Huang, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 0 days.

(21) Appl. No.: 15/805,994

(22) Filed: Nov. 7, 2017

(65) Prior Publication Data

US 2018/0364455 A1 Dec. 20, 2018

(30) Foreign Application Priority Data

Jun. 14, 2017 (TW) .............................. 106119842 A

(51) Int. Cl.
*G02B 9/60* (2006.01)
*G02B 13/00* (2006.01)

(52) U.S. Cl.
CPC ........... *G02B 13/0045* (2013.01); *G02B 9/60* (2013.01)

(58) Field of Classification Search
CPC ................................................ G02B 13/0045
USPC ....................................................... 359/764
See application file for complete search history.

(56) References Cited

U.S. PATENT DOCUMENTS

| | | | |
|---|---|---|---|
| 2,279,384 A | 4/1942 | Altman | |
| 2,352,026 A | 6/1944 | Smejkal | |
| 2,380,207 A | 7/1945 | Aklin | |
| 2,810,322 A | 10/1957 | Tronnier | |
| 3,041,934 A | 7/1962 | Ruben et al. | |
| 3,215,037 A | 11/1965 | Tronnier et al. | |
| 3,388,956 A | 6/1968 | Eggert et al. | |

(Continued)

FOREIGN PATENT DOCUMENTS

| | | |
|---|---|---|
| CN | 101421658 B | 8/2010 |
| CN | 205157866 U | 4/2016 |

(Continued)

OTHER PUBLICATIONS

Taiwan Patent Office, "Office Action," issued in connection with Taiwan Patent Application No. 106119842, dated Oct. 26, 2017, 10 pages.

*Primary Examiner* — James C. Jones
(74) *Attorney, Agent, or Firm* — Hanley, Flight & Zimmerman, LLC

(57) ABSTRACT

An image capturing lens system includes five lens elements which are, in order from an object side to an image side: a first lens element, a second lens element, a third lens element, a fourth lens element and a fifth lens element. Each of the five lens elements has an object-side surface facing toward the object side and an image-side surface facing toward the image side. The first lens element has positive refractive power. The object-side surface of the first lens element is convex in a paraxial region thereof. The second lens element has negative refractive power. At least one surface among the object-side surfaces and the image-side surfaces of the five lens elements is aspheric. The image capturing lens system further includes an aperture stop disposed between an imaged object and the object-side surface of the second lens element.

33 Claims, 40 Drawing Sheets

(56) References Cited

U.S. PATENT DOCUMENTS

| | | |
|---|---|---|
| 3,692,386 A | 9/1972 | Melech |
| 3,694,057 A | 9/1972 | Price |
| 3,694,058 A | 9/1972 | Vangraafeiland |
| 3,962,386 A | 6/1976 | Driscoll |
| 3,964,058 A | 6/1976 | Winston |
| 3,998,527 A | 12/1976 | Ikeda et al. |
| 4,035,063 A | 7/1977 | Ikeda |
| 4,324,458 A | 4/1982 | Sato |
| 5,267,086 A | 11/1993 | Hirano |
| 5,642,230 A | 6/1997 | Iwata et al. |
| 9,341,820 B2 | 5/2016 | Chen et al. |
| 9,823,449 B1 | 11/2017 | Chung et al. |
| 9,864,171 B2 | 1/2018 | Hsieh et al. |
| 2015/0116569 A1 | 4/2015 | Mercado |
| 2016/0011406 A1 | 1/2016 | Koizumi et al. |
| 2016/0085059 A1 | 3/2016 | Mercado |
| 2017/0023768 A1 | 1/2017 | Hsieh et al. |
| 2017/0269329 A1 | 9/2017 | Jhang et al. |
| 2017/0269332 A1* | 9/2017 | Jhang .................. G02B 9/34 |
| 2017/0276906 A1 | 9/2017 | Gong et al. |
| 2017/0351061 A1 | 12/2017 | Chang et al. |
| 2017/0351064 A1 | 12/2017 | Chang et al. |
| 2018/0059370 A1 | 3/2018 | Chen et al. |

FOREIGN PATENT DOCUMENTS

| | | |
|---|---|---|
| CN | 106094163 A | 11/2016 |
| CN | 106154493 A | 11/2016 |
| CN | 106154494 A | 11/2016 |
| CN | 106291883 A | 1/2017 |
| CN | 106526793 | 3/2017 |
| CN | 106990508 | 7/2017 |
| JP | 1973043930 A | 6/1973 |
| JP | 1975145226 A | 11/1975 |
| JP | 1991138612 A | 6/1991 |
| TW | 201702684 A | 1/2017 |
| TW | 201702686 | 1/2017 |
| TW | 201704802 | 2/2017 |
| TW | 201713980 | 4/2017 |
| WO | 2014155465 A1 | 10/2014 |
| WO | 2016197604 | 12/2016 |

* cited by examiner

IMAGE CAPTURING LENS SYSTEM, IMAGE CAPTURING UNIT AND ELECTRONIC DEVICE

RELATED APPLICATIONS

This application claims priority under 35 U.S.C. § 119 to Taiwan Application 106119842, filed Jun. 14, 2017, which is incorporated by reference herein in its entirety.

BACKGROUND

Technical Field

The present disclosure relates to an image capturing lens system, an image capturing unit and an electronic device, more particularly to an image capturing lens system and an image capturing unit applicable to an electronic device.

Description of Related Art

In recent years, with the popularity of electronic devices having camera functionalities, the demand for miniaturized optical systems has been increasing. As advanced semiconductor manufacturing technologies have reduced the pixel size of image sensors, and compact optical systems have gradually evolved toward the field of higher megapixels, there is an increasing demand for compact optical systems featuring better image quality.

For various applications, the optical systems have been widely applied to different kinds of electronic devices, such as vehicle devices, image recognition systems, entertainment devices, sport devices and intelligent home systems. In particular, portable electronic devices equipped with the optical systems are now in very high demand. Furthermore, in order to provide better user experience, the electronic devices equipped with one or more optical systems have become the mainstream products on the market, and the optical systems are developed with various optical features according to different requirements.

However, lens elements in a conventional telephoto camera are usually made of glass material and have spherical surfaces, such that the size of the camera is difficult to be reduced. Furthermore, due to the difficulty of reducing the size of the telephoto camera, an electronic device equipped with the camera would be large in size as well; therefore, the telephoto camera is inapplicable to a compact portable electronic device. Moreover, there are lots of compact optical systems featuring high image quality on the market nowadays, but their field of view are unfavorable for capturing detailed images of an object located from afar; therefore, the compact optical systems are already incapable of meeting the requirements of the current technology trends. Accordingly, there is a need to develop an optical system featuring telephoto effect, compact size and high image quality.

SUMMARY

According to one aspect of the present disclosure, an image capturing lens system includes five lens elements. The five lens elements are, in order from an object side to an image side, a first lens element, a second lens element, a third lens element, a fourth lens element and a fifth lens element. Each of the five lens elements has an object-side surface facing toward the object side and an image-side surface facing toward the image side. The first lens element has positive refractive power. The object-side surface of the first lens element is convex in a paraxial region thereof. The second lens element has negative refractive power. At least one surface among the object-side surfaces and the image-side surfaces of the five lens elements is aspheric. The image capturing lens system further includes an aperture stop disposed between an imaged object and the object-side surface of the second lens element. When a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the second lens element and the third lens element is T23, an axial distance between the third lens element and the fourth lens element is T34, a curvature radius of the object-side surface of the fourth lens element is R7, a curvature radius of the image-side surface of the fourth lens element is R8, an axial distance between the aperture stop and the object-side surface of the second lens element is Dsr3, an axial distance between the aperture stop and the image-side surface of the second lens element is Dsr4, the following conditions are satisfied:

$0.20 < (CT2+CT3+CT4+CT5)/CT1 < 1.0;$ $0 < (T23+T34)/CT1 < 0.70;$ $-2.50 < (R7+R8)/(R7-R8) < 8.0;$ and $|Dsr3/Dsr4| < 1.0.$ According to another aspect of the present disclosure, an image capturing lens system includes five lens elements. The five lens elements are, in order from an object side to an image side, a first lens element, a second lens element, a third lens element, a fourth lens element and a fifth lens element. Each of the five lens elements has an object-side surface facing toward the object side and an image-side surface facing toward the image side. The first lens element has positive refractive power. The fourth lens element has negative refractive power. The image-side surface of the fifth lens element is concave in a paraxial region thereof. At least one surface among the object-side surfaces and the image-side surfaces of the five lens elements is aspheric. When a central thickness of the first lens element is CT1, a central thickness of the second lens element is CT2, a central thickness of the third lens element is CT3, a central thickness of the fourth lens element is CT4, a central thickness of the fifth lens element is CT5, a curvature radius of the object-side surface of the second lens element is R3, a curvature radius of the image-side surface of the second lens element is R4, the following conditions are satisfied:

$0.20 < (CT2+CT3+CT4+CT5)/CT1 < 1.40;$ $0.60 < CT3/CT5 < 1.90;$ and $-1.50 < (R3+R4)/(R3-R4) < 2.0.$ According to still another aspect of the present disclosure, an image capturing lens system includes five lens elements. The five lens elements are, in order from an object side to an image side, a first lens element, a second lens element, a third lens element, a fourth lens element and a fifth lens element. Each of the five lens elements has an object-side surface facing toward the object side and an image-side surface facing toward the image side. The first lens element has positive refractive power. The image-side surface of the fifth lens element is concave in a paraxial region thereof. At least one surface among the object-side surfaces and the image-side surfaces of the five lens elements is aspheric. When a central thickness of the first lens element is CT1, a central thickness of the second lens element is CT2, a central thickness of the third lens element is CT3, a central thickness of the fourth lens element is CT4, a central thickness of the fifth lens element is CT5, an Abbe number of the fifth lens element is V5, the following conditions are satisfied:

$0.20<(CT2+CT3+CT4+CT5)/CT1<1.40;$ $0.40<CT3/CT5<2.50;$ and $10.0<V5<25.0.$

According to yet another aspect of the present disclosure, an image capturing lens system includes five lens elements. The five lens elements are, in order from an object side to an image side, a first lens element, a second lens element, a third lens element, a fourth lens element and a fifth lens element. Each of the five lens elements has an object-side surface facing toward the object side and an image-side surface facing toward the image side. The first lens element has positive refractive power. At least one surface among the object-side surfaces and the image-side surfaces of the five lens elements is aspheric. When a central thickness of the first lens element is CT1, a central thickness of the second lens element is CT2, a central thickness of the third lens element is CT3, a central thickness of the fourth lens element is CT4, a central thickness of the fifth lens element is CT5, an Abbe number of the fifth lens element is V5, an axial distance between the second lens element and the third lens element is T23, an axial distance between the third lens element and the fourth lens element is T34, the following conditions are satisfied:

$0.20<(CT2+CT3+CT4+CT5)/CT1<1.40;$ $0.20<CT3/CT5<2.50;$ $10.0<V5<23.0;$ and $0<(T23+T34)/CT1<1.50.$ According to yet still another aspect of the present disclosure, an image capturing unit includes the aforementioned image capturing lens system, a reflector and an image sensor. The reflector is disposed on either the object side of the image capturing lens system, the image side of the image capturing lens system or both the object side and the image side of the image capturing lens system. The image sensor is disposed on an image surface of the image capturing lens system.

According to yet still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An image capturing lens system includes five lens elements. The five lens elements are, in order from an object side to an image side, a first lens element, a second lens element, a third lens element, a fourth lens element and a fifth lens element.

There can be an air gap in a paraxial region between each adjacent lens element of the image capturing lens system; that is, each of the first through the fifth lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to misalignment and it is thereby not favorable for the image quality. Therefore, having an air gap in a paraxial region between each of the adjacent lens elements of the image capturing lens system in the present disclosure is favorable for obtaining a proper space arrangement of the image capturing lens system, and broadening the design flexibility of the lens elements for correcting aberrations.

The first lens element has positive refractive power; therefore, it is favorable for providing light convergence capability in forming a telephoto lens configuration; furthermore, it is favorable for preventing a total track length of the image capturing lens system from being overly long so as to improve lens assembling. The first lens element can have an object-side surface being convex in a paraxial region thereof; therefore, it is favorable for the first lens element having good light convergence capability so as to meet the requirement of telephoto photography while correcting spherical aberrations.

The second lens element can have negative refractive power. Therefore, it is favorable for correcting aberrations generated by the first lens element and correcting chromatic aberration so as to prevent image overlaps due to light rays with different wavelengths focusing on different positions.

Figure 34:
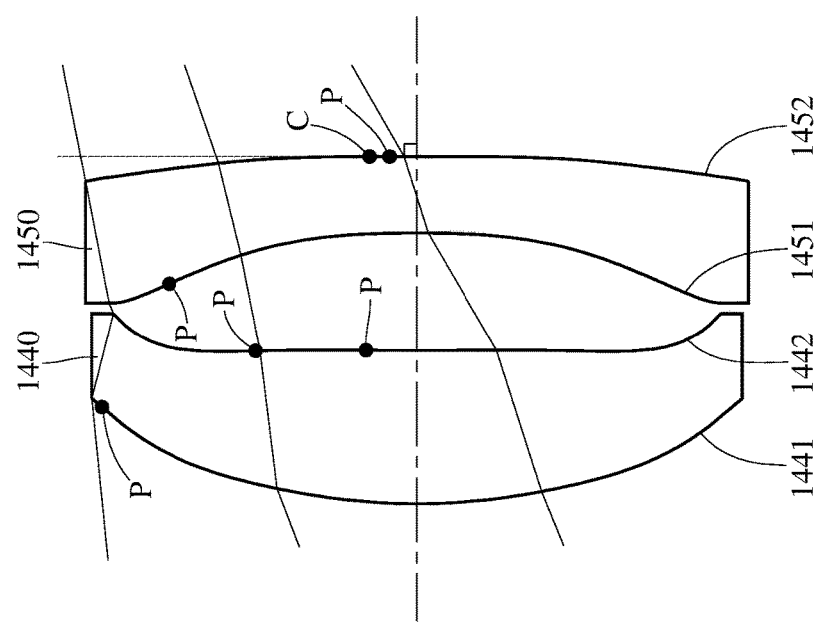
FIG. 34 shows a schematic view of inflection points on a fourth lens element and a fifth lens element, and a critical point on an image-side of the fifth lens element, according to the 14th embodiment of the present disclosure.

The fourth lens element can have negative refractive power; therefore, it is favorable for moving a principal point toward the object side so as to adjust a back focal length of the image capturing lens system, thereby preventing the total track length from being overly long; thus, it is favorable for the image capturing lens system to be installed in compact electronic devices. The fourth lens element can have an image-side surface being concave in a paraxial region thereof; therefore, the traveling direction of light ray is properly controlled so as to be favorable for reducing the incident angle of light projecting onto the image surface, thereby increasing peripheral image brightness; furthermore, along with the fifth lens element, it is favorable for adjusting the back focal length so as to reduce the size of the image capturing lens system, thereby reducing the size of the electronic devices. At least one of an object-side surface and the image-side surface of the fourth lens element can have at least one inflection point; therefore, it is favorable for controlling the traveling direction of light ray so as to prevent the diameter of the fourth lens element from being overly large, thereby reducing the size of the image capturing lens system. Please refer to FIG. 34, which shows a schematic view of inflection points P on the fourth lens element according to the 14th embodiment of the present disclosure.

The fifth lens element can have an image-side surface being concave in a paraxial region thereof; therefore, it is favorable for adjusting the back focal length so as to keep the image capturing lens system compact. At least one of an object-side surface and the image-side surface of the fifth lens element can have at least one inflection point, and, preferably, have at least one critical point; therefore, it is favorable for correcting off-axis aberrations, controlling the incident angle in the off-axis region for reducing vignetting in the peripheral region of the image, and improving the Petzval field by reducing distortion. Please refer to FIG. 34, which shows a schematic view of inflection points P and a critical point C on the fifth lens element according to the 14th embodiment of the present disclosure.

According to the present disclosure, the image capturing lens system further includes an aperture stop which can be located between an imaged object and an object-side surface of the second lens element. Therefore, it is favorable for obtaining a balance between the field of view and the total track length of the image capturing lens system so as to be applicable to a wide range of applications.

When a central thickness of the first lens element is CT1, a central thickness of the second lens element is CT2, a central thickness of the third lens element is CT3, a central thickness of the fourth lens element is CT4, and a central thickness of the fifth lens element is CT5, the following condition is satisfied: $0.20<(CT2+CT3+CT4+CT5)/CT1<1.40$. Therefore, it is favorable for increasing the structural strength of the first lens element against environmental factors; furthermore, proper central thicknesses of the lens elements are favorable for integration of the image capturing lens system in compact devices, and also favorable for preventing the lens elements from being too thin so as to ensure the structural strength of the lens elements, thereby increasing assembling yield rate. Preferably, the following condition can be satisfied: $0.20<(CT2+CT3+CT4+CT5)/CT1<1.0$. More preferably, the following condition can also be satisfied: $0.30<(CT2+CT3+CT4+CT5)/CT1<0.90$.

When the central thickness of the first lens element is CT1, an axial distance between the second lens element and the third lens element is T23, and an axial distance between the third lens element and the fourth lens element is T34, the following condition can be satisfied: $0<(T23+T34)/CT1<1.50$. Therefore, it is favorable for obtaining a balance between the axial distances between each lens element among the second through the fourth lens elements, and the central thickness of the first lens element so as to reduce the diameter of the barrel member while reducing the length thereof. Preferably, the following condition can also be satisfied: $0<(T23+T34)/CT1<0.70$.

When a curvature radius of the object-side surface of the fourth lens element is R7, and a curvature radius of the image-side surface of the fourth lens element is R8, the following condition can be satisfied: $-2.50<(R7+R8)/(R7-R8)<8.0$. Therefore, the shape of the fourth lens element is favorable for preventing total reflection due to overly large incident angle at the peripheral surface of the fourth lens element, thereby preventing image ghosting.

When an axial distance between the aperture stop and the object-side surface of the second lens element is Dsr3, and an axial distance between the aperture stop and an image-side surface of the second lens element is Dsr4, the following condition can be satisfied: $|Dsr3/Dsr4|<1.0$. Therefore, a proper axial distance between the second lens element and the aperture stop is favorable for reducing the total track length so as to keep the image capturing lens system compact.

When the central thickness of the third lens element is CT3, and the central thickness of the fifth lens element is CT5, the following condition can be satisfied: $0.20<CT3/CT5<2.50$. Therefore, a proper ratio of the central thicknesses between the third lens element and the fifth lens element is favorable for preventing the lens elements from being too thin or too thick so as to increase the manufacturing yield, and also keep the image capturing lens system compact. Preferably, the following condition can be satisfied: $0.40<CT3/CT5<2.50$. More preferably, the following condition can also be satisfied: $0.60<CT3/CT5<1.90$.

When a curvature radius of the object-side surface of the second lens element is R3, and a curvature radius of the image-side surface of the second lens element is R4, the following condition can be satisfied: $-1.50<(R3+R4)/(R3-R4)<2.0$. Therefore, it is favorable for the second lens element to have sufficient light divergence capacity so as to correct aberrations generated by the first lens element, and be favorable for controlling the field of view. Preferably, the following condition can be satisfied: $-1.50<(R3+R4)/(R3-R4)<0.95$. More preferably, the following condition can also be satisfied: $-0.35 (R3+R4)/(R3-R4)<0.95$.

When an Abbe number of the fifth lens element is V5, the following condition can be satisfied: $10.0<V5<25.0$. Therefore, by controlling proper refraction through the fifth lens element, it is favorable for the lens elements of the image capturing lens system disposed in a balanced configuration, thereby satisfying the requirements of better aberration corrections and a short total track length. Preferably, the following condition can also be satisfied: $10.0<V5<23.0$.

When a focal length of the first lens element is f1, and a focal length of the second lens element is f2, the following condition can be satisfied: $0.10<|f2/f1|<1.20$. Therefore, it is favorable for the image capturing lens system capturing images of an object located from afar by properly adjusting the refractive power of the second lens element with respect to the refractive power of the first lens element.

When an Abbe number of the second lens element is V2, and the Abbe number of the fifth lens element is V5, the following condition can be satisfied: $20<V2+V5<80$. Therefore, it is favorable for correcting aberrations, especially chromatic aberration, such that light rays with different wavelengths are able to focus onto the same image surface.

When an axial distance between the aperture stop and the image-side surface of the fifth lens element is SD, and an axial distance between the object-side surface of the first lens element and the image-side surface of the fifth lens element is TD, the following condition can be satisfied: $0.40<SD/TD<0.95$. Therefore, the positioning of the aperture stop is favorable for obtaining a balance between the field of view and the total track length of the image capturing lens system; furthermore, it is favorable for controlling the imaging range and the incident angle of light projecting onto the image surface so as to prevent vignetting, for better telephoto photography and compactness of the electronic devices.

When an axial distance between the object-side surface of the first lens element and an image surface is TL, and a maximum image height of the image capturing lens system (half of a diagonal length of an effective photosensitive area of an image sensor) is ImgH, the following condition can be satisfied: $3.0<TL/ImgH<4.50$. Therefore, it is favorable for controlling the size of the image capturing lens system while meeting the requirement for telephoto photography; furthermore, providing a sufficient imaging range is favorable for increasing image brightness, thereby improving the image quality.

When a focal length of the image capturing lens system is f, a focal length of the fourth lens element is f4, and a focal length of the fifth lens element is f5, the following condition can be satisfied: $0.20<|f/f4|+|f/f5|<3.0$. Therefore, the refractive power allocation on the image side of the image capturing lens system is favorable for reducing the incident angle of light traveling into the lens elements so as to prevent total reflection, and thereby reduce stray light.

When the focal length of the image capturing lens system is f, a curvature radius of an object-side surface of the third lens element is R5, and a curvature radius of an image-side surface of the third lens element is R6, the following condition can be satisfied: $1.0<|f/R5|+|f/R6|<12.0$. Therefore, it is favorable for preventing the refractive power of the third lens element from being overly strong, and for the third lens element to be a correction lens for correcting aberrations, thereby improving the image quality.

When the axial distance between the object-side surface of the first lens element and the image surface is TL, and the focal length of the image capturing lens system is f, the following condition can be satisfied: $0.70<TL/f<1.10$. Therefore, it is favorable for controlling the total track length of the image capturing lens system while meeting the requirement of telephoto photography.

Figure 33:
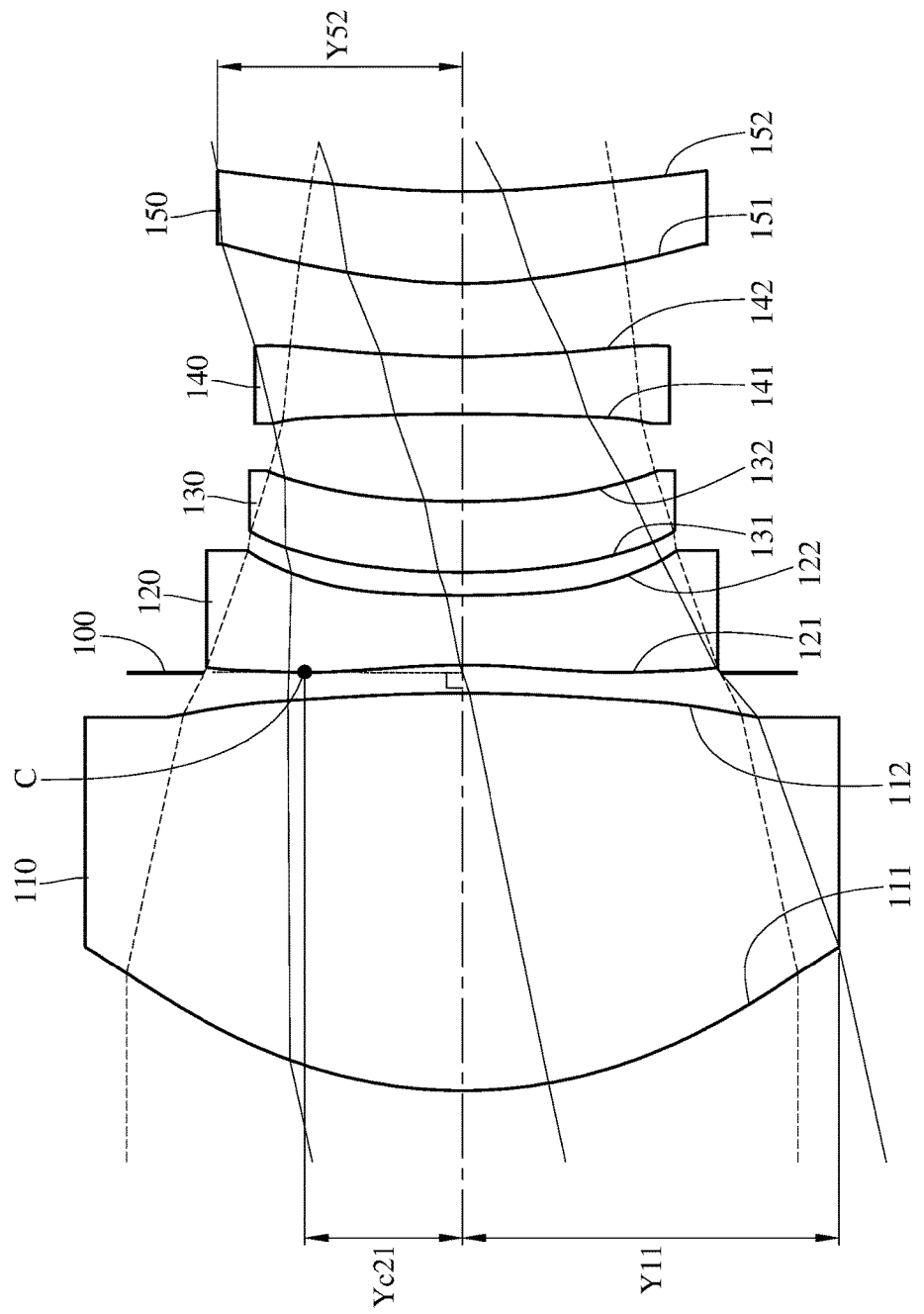
FIG. 33 shows a schematic view of Y11, Y52, Yc21 and a critical point on an object-side surface of a second lens element, according to the 1st embodiment of the present disclosure.

When a maximum effective radius of the object-side surface of the first lens element is Y11, and a maximum effective radius of the image-side surface of the fifth lens element is Y52, the following condition can be satisfied: $0.90<Y11/Y52<2.30$. Therefore, it is favorable for controlling lens diameters of the image capturing lens system so as to reduce the radial length of the lens elements, thereby providing higher usability. Please refer to FIG. 33, which shows a schematic view of Y11 and Y52 according to the 1st embodiment of the present disclosure.

When an axial distance between the first lens element and the second lens element is T12, the axial distance between the second lens element and the third lens element is T23, the axial distance between the third lens element and the fourth lens element is T34, and an axial distance between the fourth lens element and the fifth lens element is T45, the following condition can be satisfied: 0.10<(T23/T12)+(T34/T45)<30.0. Therefore, it is favorable for obtaining a proper space arrangement of the image capturing lens system so as to reduce sensitivity and thereby increase assembling yield rate.

When the focal length of the image capturing lens system is f, and the curvature radius of the image-side surface of the fourth lens element is R8, the following condition can be satisfied: −0.50<f/R8<7.50. Therefore, it is favorable for preventing the curvature of the image-side surface of the fourth lens element from being overly large so as to reduce the incident angle, thereby improving the image quality.

When the focal length of the image capturing lens system is f, the focal length of the first lens element is f1, and the focal length of the second lens element is f2, the following condition can be satisfied: 3.80<(f/f1)−(f/f2)<5.50. Therefore, it is favorable for the first lens element and the second lens element having proper refraction and for the image capturing lens system capturing detailed images of an object located from afar in a telephoto configuration.

According to the present disclosure, among the first through the fifth lens elements of the image capturing lens system, at least one lens element can have an Abbe number smaller than 22.0. Therefore, since the density difference between a high-dispersion material (low Abbe number) and the air is larger than that between a low-dispersion material (high Abbe number) and the air, it is favorable for the lens elements adopting high dispersion materials with stronger refractive power, such that incident light is properly refracted within a shorter distance, and therefore it is favorable for reducing the size of the image capturing lens system and improving the image quality. Preferably, at least one lens element can have an Abbe number smaller than 21.0.

When the axial distance between the second lens element and the third lens element is T23, and the axial distance between the fourth lens element and the fifth lens element is T45, the following condition can be satisfied: 0<T23/T45<4.50. Therefore, sufficient space between the fourth lens element and the fifth lens element is favorable for preventing interference between the lens elements, and also favorable for lens assembling, thereby obtaining good space utilization.

When half of a maximum field of view of the image capturing lens system is HFOV, the following condition can be satisfied: 0.10<tan(HFOV)<0.30. Therefore, it is favorable for adjusting the field of view, such that the image capturing lens system becomes applicable to a wide range of applications.

When the central thickness of the second lens element is CT2, and the central thickness of the fifth lens element is CT5, the following condition can be satisfied: 0.42<CT2/CT5<1.60. Therefore, it is favorable for obtaining proper central thicknesses of the lens elements and preventing the second lens element from being too thin so as to increase the manufacturing yield rate as well as the stability of the image capturing lens system; furthermore, a proper ratio of the central thickness of the second lens element to the central thickness of the fifth lens element is favorable for improving the image quality and reducing sensitivity.

When the axial distance between the first lens element and the second lens element is T12, and the axial distance between the second lens element and the third lens element is T23, the following condition can be satisfied: 0<T23/T12<4.0. Therefore, it is favorable for obtaining a proper space arrangement on the object side of the image capturing lens system so as to prevent the axial distance between the second lens element and the third lens element from being too long, thereby keeping the image capturing lens system compact; furthermore, it is favorable for the first lens element and the second lens element to become correcting lenses for each other so as to correct aberrations and improve the image quality.

When an axial distance between the image-side surface of the fifth lens element and the image surface is BL, and the axial distance between the object-side surface of the first lens element and the image-side surface of the fifth lens element is TD, the following condition can be satisfied: 0.40<BL/TD<2.50. Therefore, a sufficient back focal length is favorable for the image capturing lens system being more flexible to design.

When the focal length of the image capturing lens system is f, the following condition can be satisfied: 9.0 [mm]<f<20.0 [mm]. Therefore, a sufficient focal length of the image capturing lens system is favorable for compact devices to meet the requirement of telephoto functionality.

When a vertical distance between a non-axial critical point on the object-side surface of the second lens element and an optical axis is Yc21, and the central thickness of the fifth lens element is CT5, the following condition can be satisfied: 0.30<Yc21/CT5<5.50. Therefore, controlling a shape of the object-side surface of the second lens element in an off-axis region thereof is favorable for correcting off-axis aberrations, such as coma and astigmatism, and also favorable for balancing the central thickness of the fifth lens element so as to obtain high quality images. Please refer to FIG. 33, which shows a schematic view of Yc21 and a critical point on the object-side surface of the second lens element, according to the 1st embodiment of the present disclosure, wherein the object-side surface of the second lens element has at least one critical point C.

Figure 35:
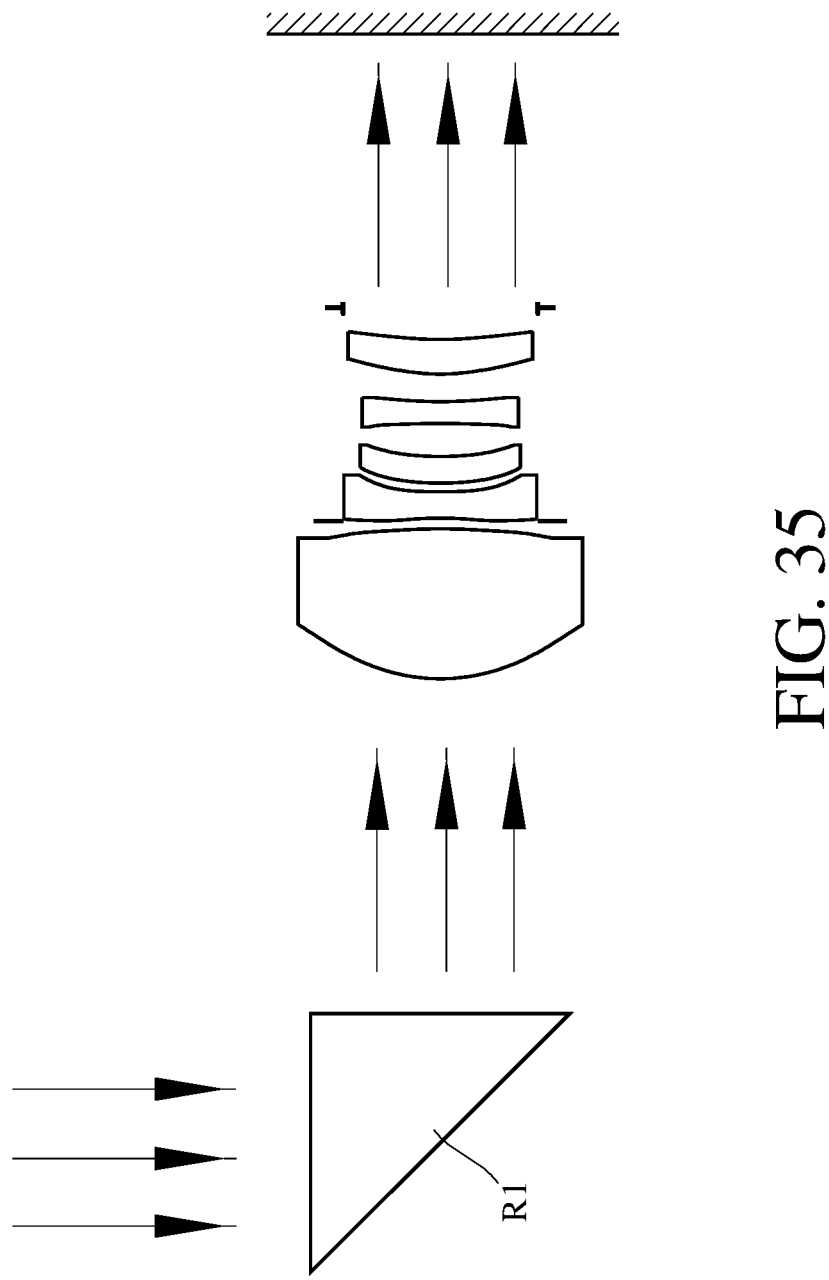
FIG. 35 shows a schematic view of a reflector and an image capturing lens system according to one embodiment of the present disclosure.
Figure 36:
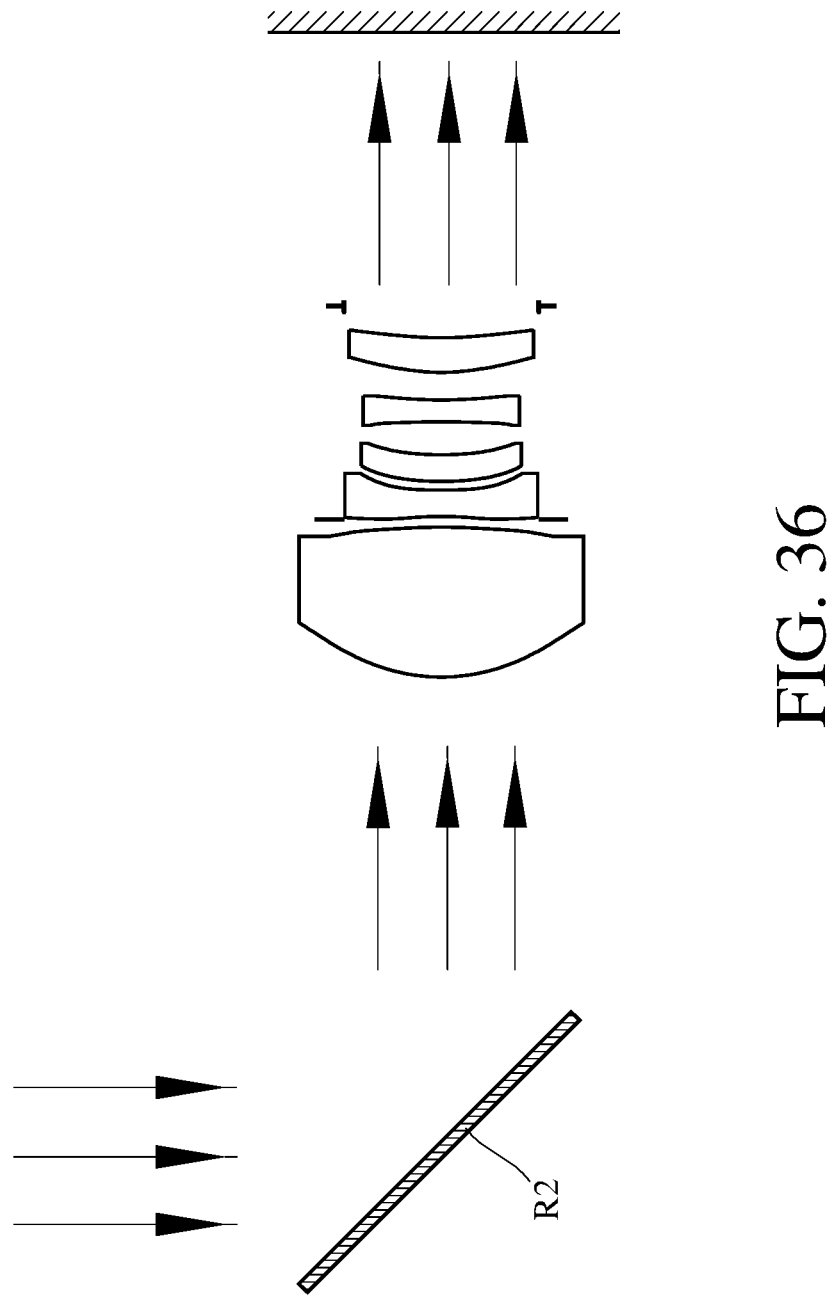
FIG. 36 shows a schematic view of another reflector and the image capturing lens system according to one embodiment of the present disclosure.
Figure 37:
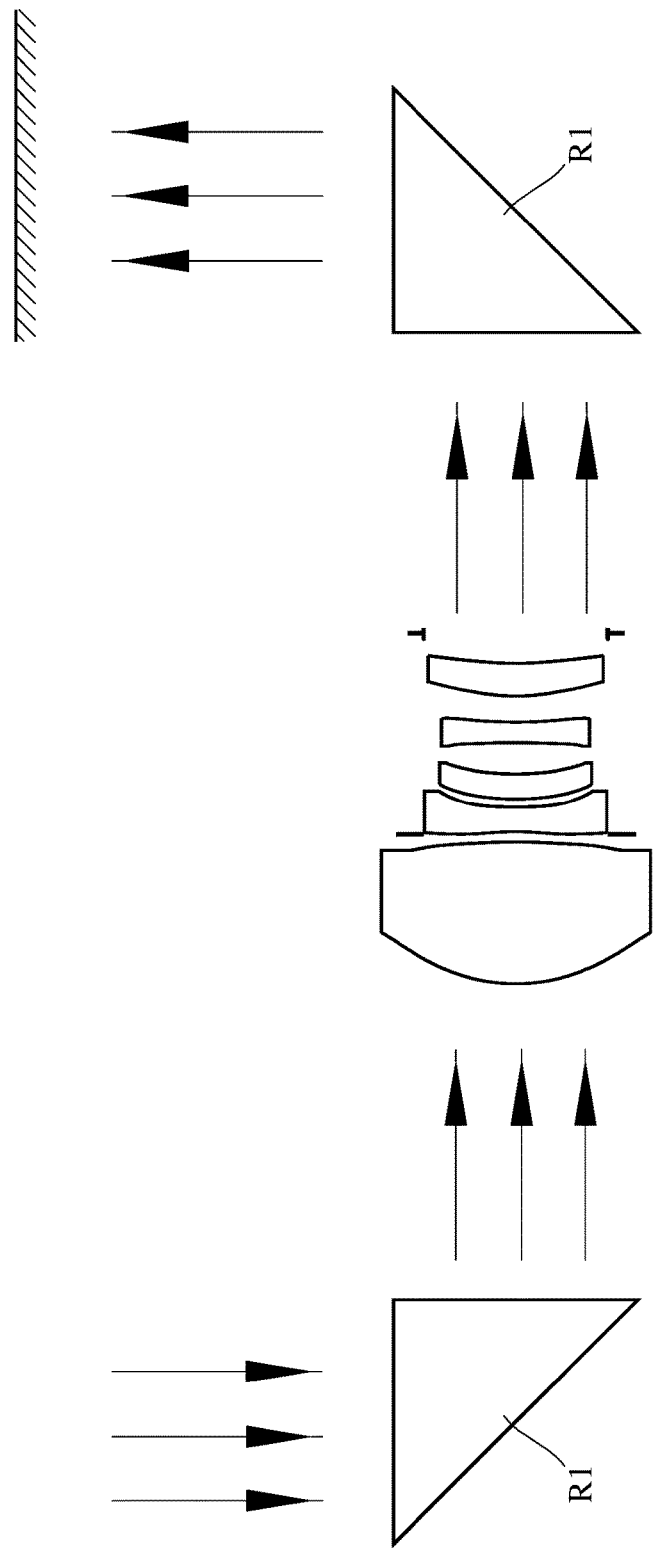
FIG. 37 shows a schematic view of two reflectors and the image capturing lens system according to one embodiment of the present disclosure.
Figure 38:
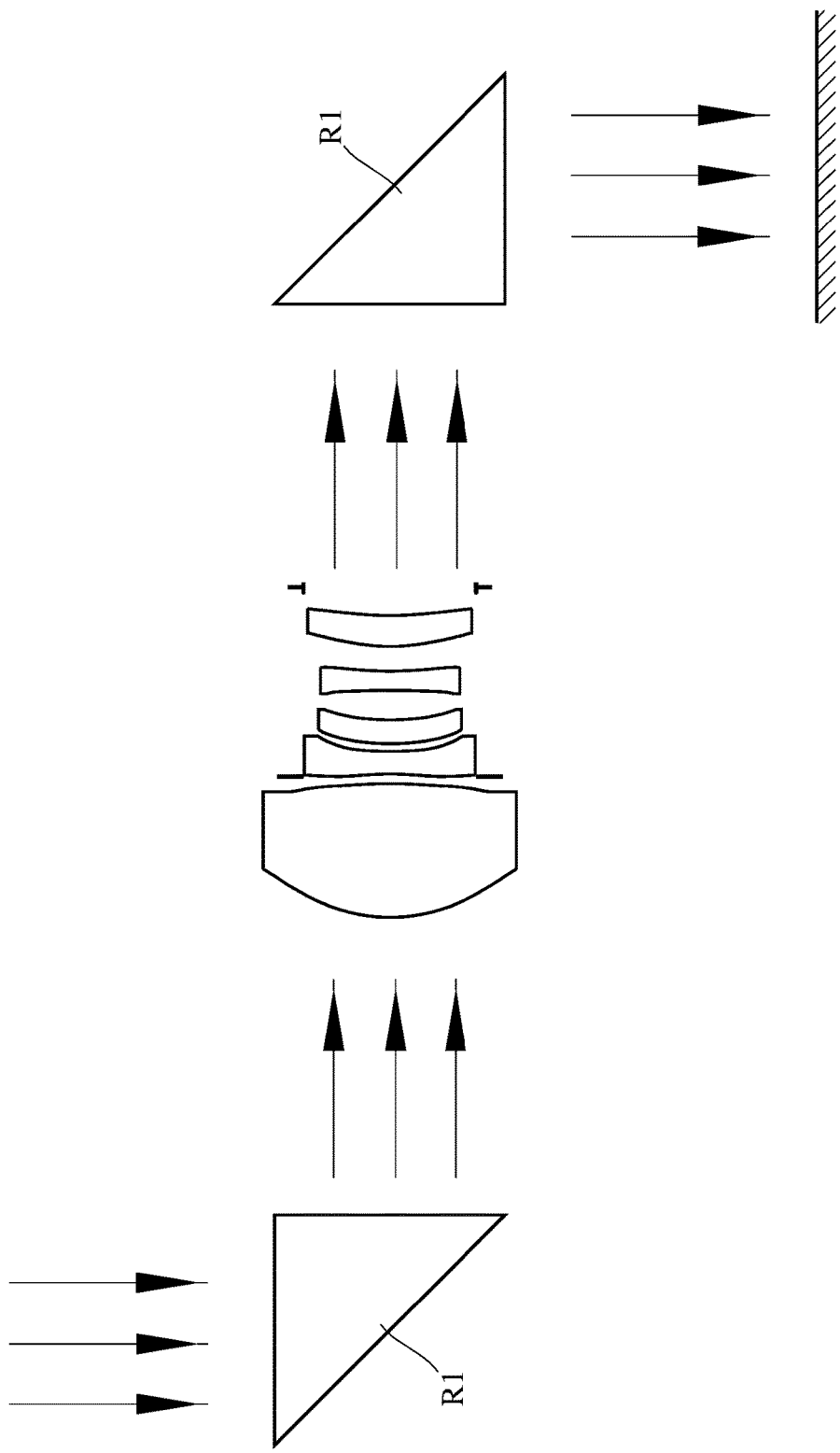
FIG. 38 shows a schematic view of two reflectors and the image capturing lens system according to another embodiment of the present disclosure.
Figure 39:
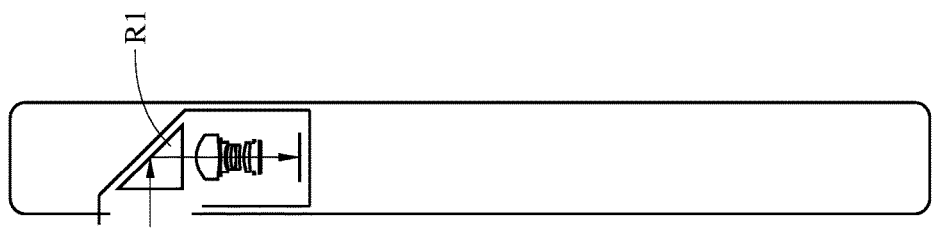
FIG. 39 shows a schematic side view of an electronic device including a reflector and the image capturing lens system according to one embodiment of the present disclosure.

According to the present disclosure, the image capturing lens system can include at least one reflector. The reflector is, for example, a prism or a reflective mirror. Therefore, the traveling direction of light rays can be changed, such that it is favorable for obtaining good space utilization, and also favorable for the image capturing lens system being more flexible to design. Preferably, the reflector can be a prism, which is favorable for extending the length of the optical axis and maintaining the distances between each adjacent lens element of the image capturing lens system, thereby maintaining the image quality. As seen in FIG. 35, which shows a schematic view of a reflector and the image capturing lens system according to one embodiment of the present disclosure, wherein the reflector is a prism R1 disposed between the imaged object (not shown in the drawings) and the lens elements of the image capturing lens system (its reference numerals is omitted), but the disclosure is not limited to the type, the amount and the position of the reflector shown in FIG. 35. For example, as shown in FIG. 36, which shows a schematic view of another reflector and the image capturing lens system according to one embodiment of the present disclosure, the reflector is a reflective mirror R2. Please refer to FIG. 37 and FIG. 38. FIG. 37 shows a schematic view of two reflectors and the image capturing lens system according to one embodiment of the present disclosure, and FIG. 38 shows a schematic view of two reflectors and the image capturing lens system according to another embodiment of the present disclosure, wherein the two prisms R1 are respectively located on the object side and the image side of the lens elements of the image capturing lens system. As shown in FIG. 39, the traveling direction of incident light rays can be changed by the reflector (the prism R1), such that the size of the electronic device is not restricted by the total track length of the image capturing lens system.

Figure 40:
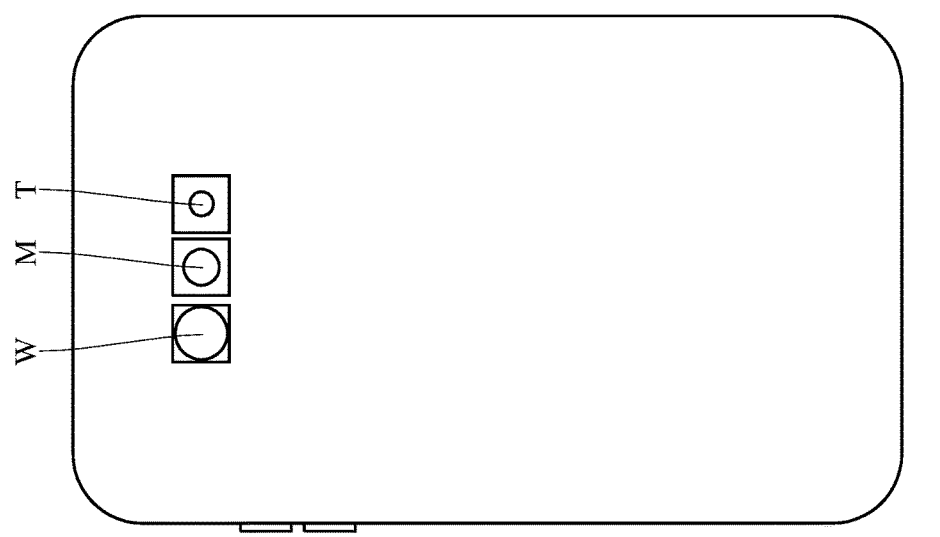
FIG. 40 shows a schematic view of an electronic device including multiple image capturing units according to one embodiment of the present disclosure.

According to the present disclosure, an image capturing unit includes the aforementioned image capturing lens system and an image sensor, wherein the image sensor is disposed on the image surface of the image capturing lens system. Preferably, the image capturing unit can further include a barrel, a holder member, an auto-focusing lens actuator, an optical image stabilization unit or a combination thereof. Furthermore, according to the present disclosure, an electronic device is provided, and the electronic device includes multiple aforementioned image capturing units. FIG. 40 shows a schematic view of an electronic device including multiple image capturing units according to one embodiment of the present disclosure, wherein the electronic device includes three image capturing units, and the three image capturing units can have different field of views. For example, the electronic device includes a wide-angle image capturing unit W, a standard image capturing unit M and a telephoto image capturing unit T. The wide-angle image capturing unit W has a larger field of view being than the standard image capturing unit M and the telephoto image capturing unit T. The standard image capturing unit M has a smaller field of view than the wide-angle image capturing unit W, but has a larger field of view than the telephoto image capturing unit T. The telephoto image capturing unit T has a smaller field of view than the standard image capturing unit M. When capturing images of an object through the three image capturing units M, W and T of the electronic device, the wide-angle image capturing unit W takes a long shot (also referred to as a full shot or a wide shot) to capture an image with a wider view of the imaged object, the standard image capturing unit M takes a medium shot to capture an image with a smaller view of the imaged object, and the telephoto image capturing unit T takes a close-up shot to capture an image with the smallest view of the imaged object. Therefore, it is favorable for capturing the images with the foregoing image capturing units W, M and T having different field of views so as to satisfy the requirement of the ability of optical zoom.

According to the present disclosure, the lens elements thereof can be made of glass or plastic material. When the lens elements are made of glass material, the distribution of the refractive power of the lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

In detail, at least one surface among the object-side surfaces and the image-side surfaces of the five lens elements is aspheric; therefore, it is favorable for correcting aberrations, reducing the size of the image capturing lens system, and decreasing the required number of the lens elements; furthermore, at least three of the five lens elements of the image capturing lens system can be made of plastic material; therefore, selecting a proper material for each lens element are favorable for increasing the flexibility in shape design of the lens elements.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the image capturing lens system, based on the corresponding image sensor, can be flat or curved, especially a curved surface being concave facing towards the object side of the image capturing lens system.

According to the present disclosure, an image correction unit, such as a field flattener, can be optionally disposed between the lens element closest to the image side of the image capturing lens system and the image surface for correcting aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the image capturing lens system can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the image capturing lens system and thereby provides a wider field of view for the same.

According to the above description of the present disclosure, the following specific embodiments are provided for further explanation.

1st Embodiment

Figure 1:
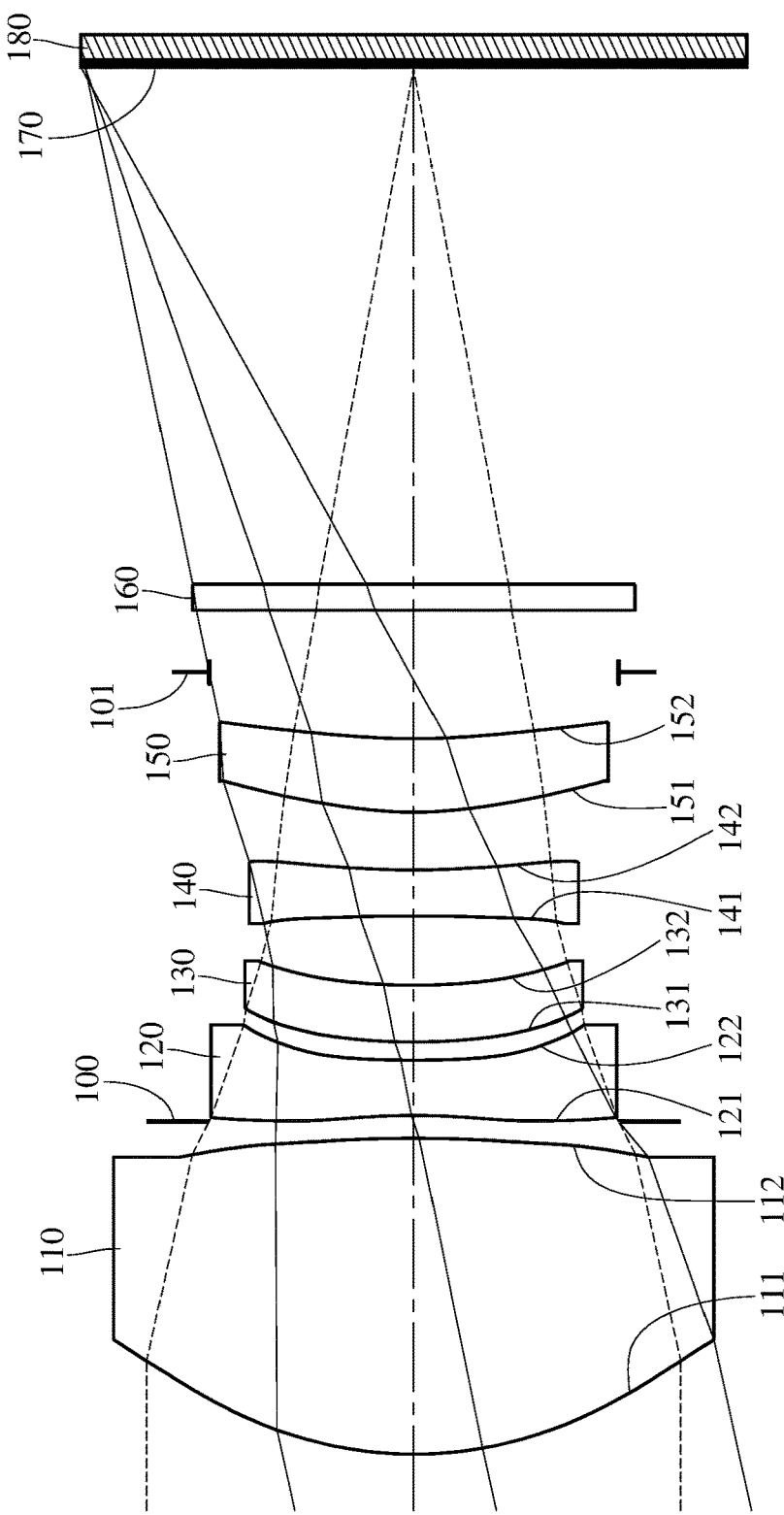
FIG. 1 is a schematic view of an image capturing unit according to the 1st embodiment of the present disclosure.
Figure 2:
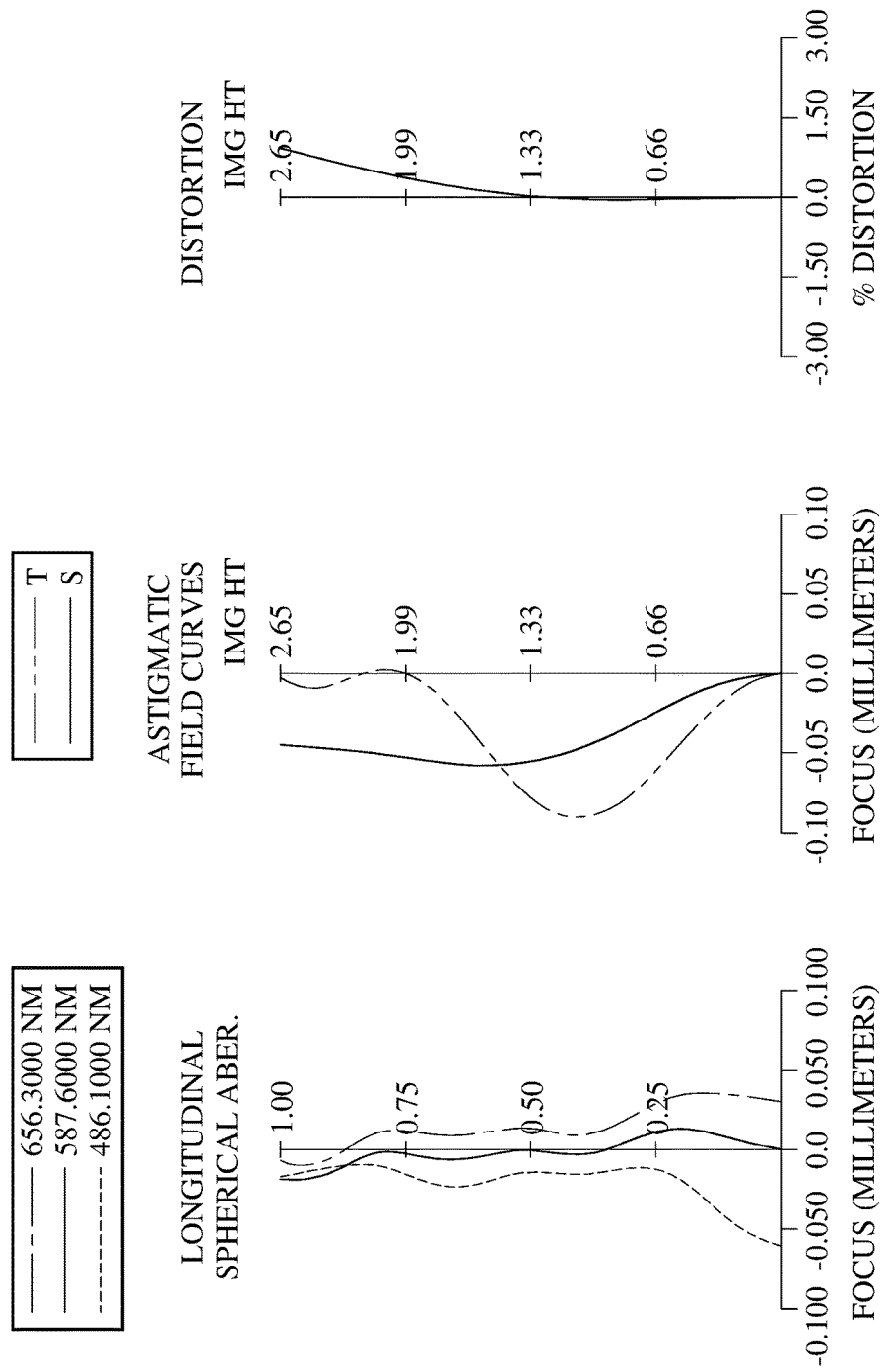
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the image capturing lens system (its reference numeral is omitted) of the present disclosure and an image sensor 180. The image capturing lens system includes, in order from an object side to an image side, a first lens element 110, an aperture stop 100, a second lens element 120, a third lens element 130, a fourth lens element 140, a fifth lens element 150, a stop 101, a filter 160 and an image surface 170. The image capturing lens system includes five single and non-cemented lens elements (110, 120, 130, 140 and 150) with no additional lens element disposed between the first lens element 110 and the fifth lens element 150, wherein there is an air gap in a paraxial region between each adjacent lens element.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has three inflection points. The image-side surface 142 of the fourth lens element 140 has one inflection point.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric.

The filter 160 is made of glass material and located between the fifth lens element 150 and the image surface 170, and will not affect the focal length of the image capturing lens system. The image sensor 180 is disposed on or near the image surface 170 of the image capturing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i} (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the image capturing lens system of the image capturing unit according to the 1st embodiment, when a focal length of the image capturing lens system is f, an f-number of the image capturing lens system is Fno, and half of a maximum field of view of the image capturing lens system is HFOV, these parameters have the following values: f=12.03 millimeters (mm), Fno=2.79, HFOV=12.3 degrees (deg.).

When an Abbe number of the fifth lens element 150 is V5, the following condition is satisfied: V5=20.4.

When an Abbe number of the second lens element 120 is V2, and the Abbe number of the fifth lens element 150 is V5, the following condition is satisfied: V2+V5=43.7.

When an axial distance between the first lens element 110 and the second lens element 120 is T12, and an axial distance between the second lens element 120 and the third lens element 130 is T23, the following condition is satisfied: T23/T12=0.80. In this embodiment, the axial distance between two adjacent lens elements is the air gap in a paraxial region between the two adjacent lens elements.

When the axial distance between the second lens element 120 and the third lens element 130 is T23, and an axial distance between the fourth lens element 140 and the fifth lens element 150 is T45, the following condition is satisfied: T23/T45=0.31.

When the axial distance between the first lens element 110 and the second lens element 120 is T12, the axial distance between the second lens element 120 and the third lens element 130 is T23, an axial distance between the third lens element 130 and the fourth lens element 140 is T34, and the axial distance between the fourth lens element 140 and the fifth lens element 150 is T45, the following condition is satisfied: (T23/T12)+(T34/T45)=1.99.

When the axial distance between the second lens element 120 and the third lens element 130 is T23, the axial distance between the third lens element 130 and the fourth lens element 140 is T34, and a central thickness of the first lens element 110 is CT1, the following condition is satisfied: (T23+T34)/CT1=0.28.

When a central thickness of the second lens element 120 is CT2, and a central thickness of the fifth lens element 150 is CT5, the following condition is satisfied: CT2/CT5=0.76.

When a central thickness of the third lens element 130 is CT3, and the central thickness of the fifth lens element 150 is CT5, the following condition is satisfied: CT3/CT5=0.77.

When the central thickness of the first lens element 110 is CT1, the central thickness of the second lens element 120 is CT2, the central thickness of the third lens element 130 is CT3, a central thickness of the fourth lens element 140 is CT4, and the central thickness of the fifth lens element 150 is CT5, the following condition is satisfied: (CT2+CT3+CT4+CT5)/CT1=0.73.

When the focal length of the image capturing lens system is f, and a curvature radius of the image-side surface 142 of the fourth lens element 140 is R8, the following condition is satisfied: f/R8=2.87.

When the focal length of the image capturing lens system is f, a curvature radius of the object-side surface 131 of the third lens element 130 is R5, and a curvature radius of the image-side surface 132 of the third lens element 130 is R6, the following condition is satisfied: |f/R5|+|f/R6|=4.84.

When a curvature radius of the object-side surface 121 of the second lens element 120 is R3, and a curvature radius of the image-side surface 122 of the second lens element 120 is R4, the following condition is satisfied: (R3+R4)/(R3−R4)=−0.41.

When a curvature radius of the object-side surface 141 of the fourth lens element 140 is R7, and the curvature radius of the image-side surface 142 of the fourth lens element 140 is R8, the following condition is satisfied: (R7+R8)/(R7−R8)=1.10.

When a focal length of the first lens element 110 is f1, and a focal length of the second lens element 120 is f2, the following condition is satisfied: |f2/f1|=1.19.

When the focal length of the image capturing lens system is f, the focal length of the first lens element 110 is f1, and the focal length of the second lens element 120 is f2, the following condition is satisfied: (f/f1)−(f/f2)=4.48.

When the focal length of the image capturing lens system is f, a focal length of the fourth lens element 140 is f4, and a focal length of the fifth lens element 150 is f5, the following condition is satisfied: |f/f4|+|f/f5|=2.76.

When half of the maximum field of view of the image capturing lens system is HFOV, the following condition is satisfied: tan(HFOV)=0.22.

When a maximum effective radius of the object-side surface 111 of the first lens element 110 is Y11, and a maximum effective radius of the image-side surface 152 of the fifth lens element 150 is Y52, the following condition is satisfied: Y11/Y52=1.54.

When a vertical distance between a non-axial critical point on the object-side surface 121 of the second lens element 120 and an optical axis is Yc21, and the central thickness of the fifth lens element 150 is CT5, the following condition is satisfied: Yc21/CT5=1.68.

When an axial distance between the aperture stop 100 and the object-side surface 121 of the second lens element 120 is Dsr3, and an axial distance between the aperture stop 100 and the image-side surface 122 of the second lens element 120 is Dsr4, the following condition is satisfied: Dsr3/Dsr4=0.10.

When an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following condition is satisfied: SD/TD=0.53.

When an axial distance between the image-side surface 152 of the fifth lens element 150 and the image surface 170 is BL, and the axial distance between the object-side surface 111 of the first lens element 110 and the image-side surface 152 of the fifth lens element 150 is TD, the following condition is satisfied: BL/TD=0.94.

When an axial distance between the object-side surface 111 of the first lens element 110 and the image surface 170 is TL, and the focal length of the image capturing lens system is f, the following condition is satisfied: TL/f=0.93.

When the axial distance between the object-side surface 111 of the first lens element 110 and the image surface 170 is TL, and a maximum image height of the image capturing lens system is ImgH, the following condition is satisfied: TL/ImgH=4.23.

The detailed optical data of the 1st embodiment are shown in Table 1 and the aspheric surface data are shown in Table 2 below.

TABLE 1

1st Embodiment
f = 12.03 mm, Fno = 2.79, HFOV = 12.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.145 | (ASP) | 2.553 | Plastic | 1.545 | 56.0 | 4.95 |
| 2 | | −13.409 | (ASP) | 0.134 | | | | |
| 3 | Ape. Stop | Plano | | 0.050 | | | | |
| 4 | Lens 2 | −5.393 | (ASP) | 0.448 | Plastic | 1.639 | 23.3 | −5.88 |
| 5 | | 12.808 | (ASP) | 0.147 | | | | |
| 6 | Lens 3 | 5.082 | (ASP) | 0.454 | Plastic | 1.559 | 40.4 | −796.17 |
| 7 | | 4.864 | (ASP) | 0.560 | | | | |
| 8 | Lens 4 | 88.327 | (ASP) | 0.372 | Plastic | 1.544 | 56.0 | −8.11 |
| 9 | | 4.195 | (ASP) | 0.470 | | | | |
| 10 | Lens 5 | 2.982 | (ASP) | 0.590 | Plastic | 1.660 | 20.4 | 9.45 |
| 11 | | 5.262 | (ASP) | 0.540 | | | | |
| 12 | Stop | Plano | | 0.500 | | | | |
| 13 | IR-filter | Plano | | 0.210 | Glass | 1.517 | 64.2 | — |
| 14 | | Plano | | 4.173 | | | | |
| 15 | Image | Plano | | — | | | | |

Note:

Reference wavelength is 587.6 nm (d-line).

An effective radius of the stop 101 (Surface 12) is 1.654 mm.

TABLE 2

Aspheric Coefficients

| Surface # | | | | | |
|---|---|---|---|---|---|
| | 1 | 2 | 4 | 5 | 6 |
| k = | −2.2868E−01 | 2.2567E+01 | −4.3815E+01 | 3.3851E+01 | 8.9544E+00 |
| A4 = | −2.3687E−03 | −4.8794E−02 | −2.3554E−02 | 1.4902E−01 | 8.3662E−02 |
| A6 = | 1.2639E−03 | 1.0426E−01 | 1.1208E−01 | −3.8572E−01 | −4.3855E−01 |
| A8 = | −7.8415E−04 | −8.4589E−02 | −8.5019E−02 | 7.5920E−01 | 9.5576E−01 |
| A10 = | 2.3050E−04 | 3.5185E−02 | 2.3751E−02 | −7.6405E−01 | −1.0255E+00 |
| A12 = | −4.1059E−05 | −8.1172E−03 | −2.0131E−04 | 4.0631E−01 | 5.7964E−01 |
| A14 = | 3.2818E−06 | 9.9620E−04 | −1.0584E−03 | −1.0981E−01 | −1.6583E−01 |
| A16 = | −7.5225E−08 | −5.0888E−05 | 1.4247E−04 | 1.1993E−02 | 1.8996E−02 |

| Surface # | | | | | |
|---|---|---|---|---|---|
| | 7 | 8 | 9 | 10 | 11 |
| k = | 1.0482E+01 | 2.9228E+01 | −9.9179E+01 | −1.6759E+01 | −1.7180E+00 |
| A4 = | −5.5990E−02 | −2.5096E−01 | −1.8969E−01 | −6.6425E−02 | −6.6757E−02 |
| A6 = | 6.1596E−02 | 7.1623E−01 | 6.3994E−01 | 1.8163E−01 | 1.0093E−01 |
| A8 = | 1.6461E−01 | −9.6343E−01 | −9.6064E−01 | −2.4073E−01 | −1.2331E−01 |
| A10 = | −3.9802E−01 | 6.8611E−01 | 7.9393E−01 | 1.8265E−01 | 9.3326E−02 |
| A12 = | 3.2123E−01 | −2.6654E−01 | −3.7600E−01 | −7.8697E−02 | −4.0402E−02 |
| A14 = | −1.1418E−01 | 5.1208E−02 | 9.4939E−02 | 1.7844E−02 | 9.1874E−03 |
| A16 = | 1.4904E−02 | −3.7311E−03 | −9.8979E−03 | −1.6516E−03 | −8.5075E−04 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
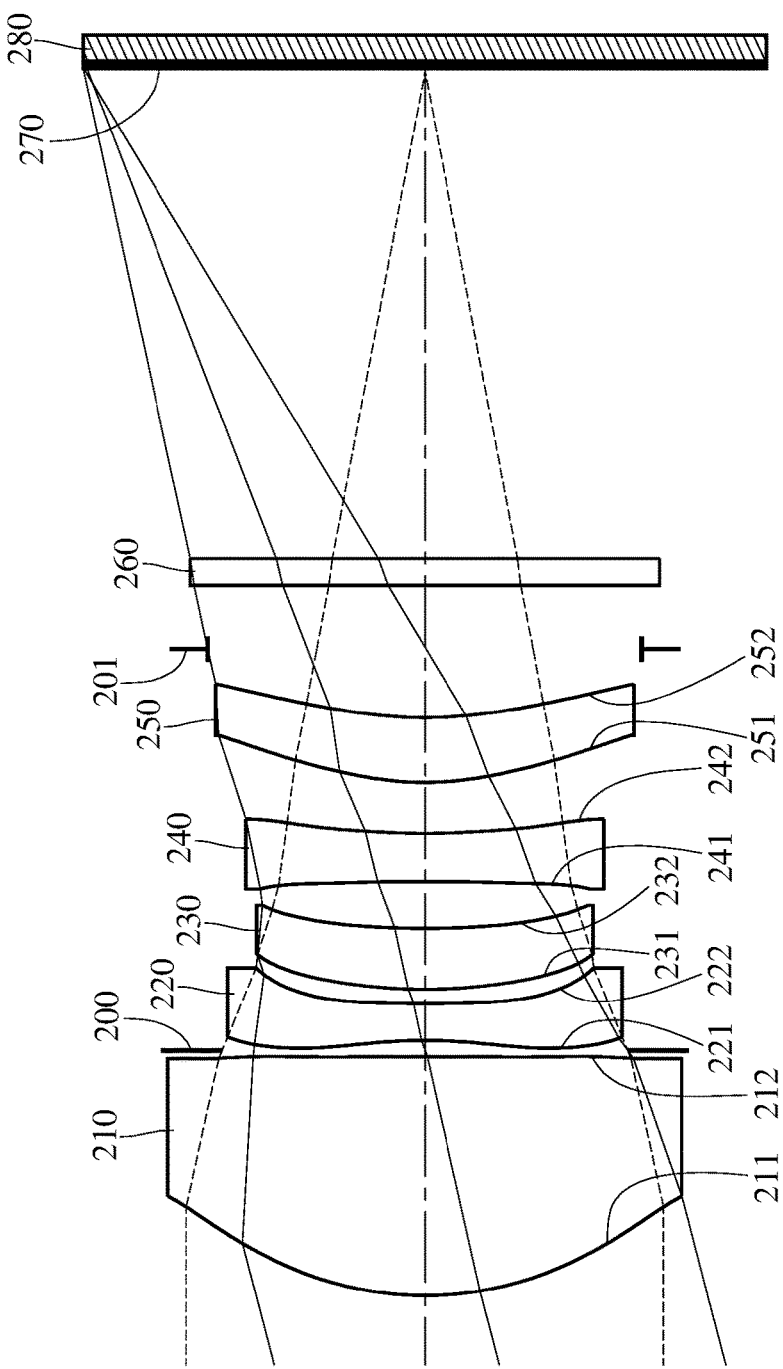
FIG. 3 is a schematic view of an image capturing unit according to the 2nd embodiment of the present disclosure.
Figure 4:
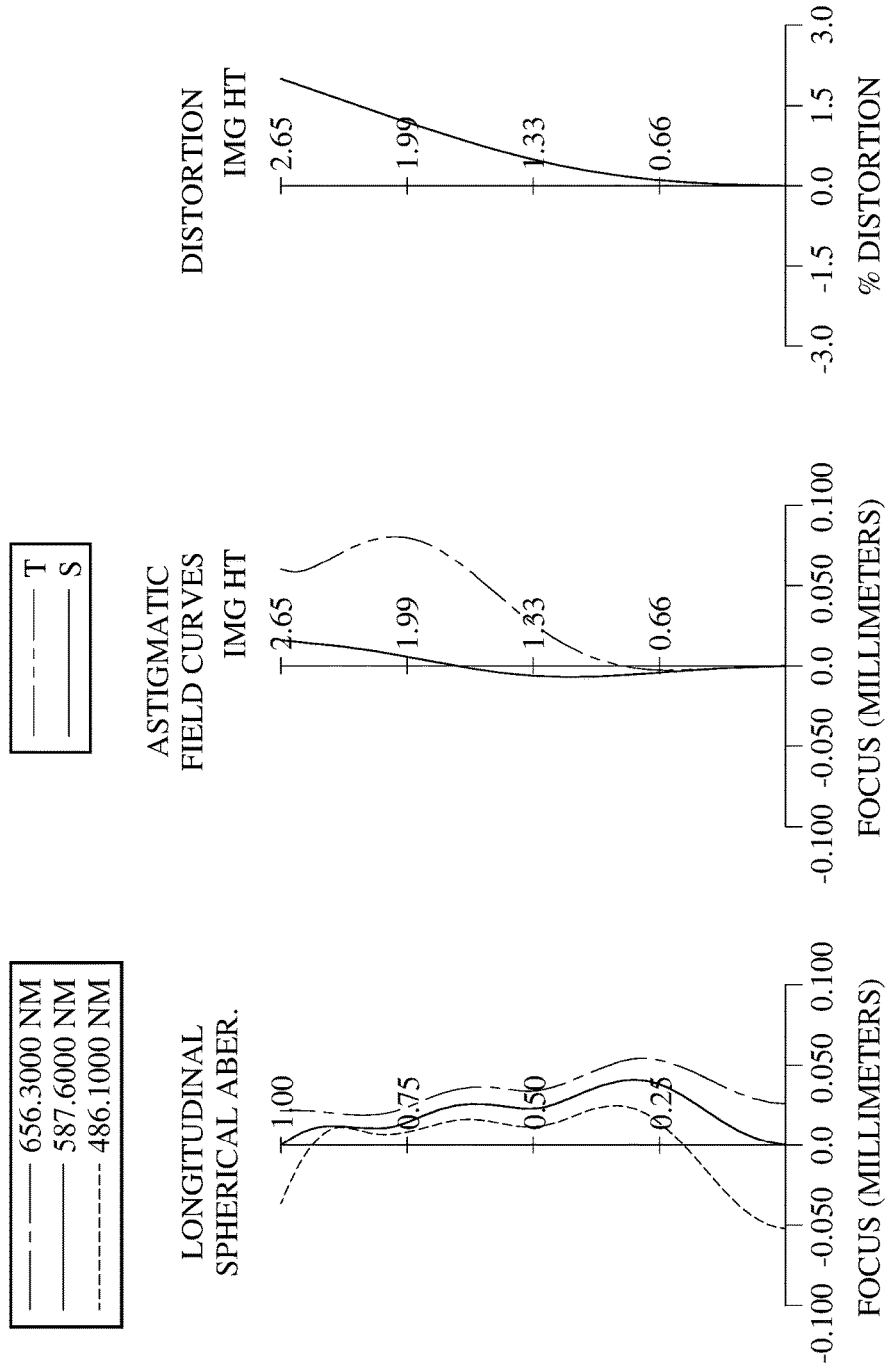
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the image capturing lens system (its reference numeral is omitted) of the present disclosure and an image sensor 280. The image capturing lens system includes, in order from an object side to an image side, a first lens element 210, an aperture stop 200, a second lens element 220, a third lens element 230, a fourth lens element 240, a fifth lens element 250, a stop 201, a filter 260 and an image surface 270. The image capturing lens system includes five single and non-cemented lens elements (210, 220, 230, 240 and 250) with no additional lens element disposed between the first lens element 210 and the fifth lens element 250, wherein there is an air gap in a paraxial region between each adjacent lens element.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has three inflection points. The image-side surface 242 of the fourth lens element 240 has one inflection point.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has one inflection point. The image-side surface 252 of the fifth lens element 250 has one inflection point.

The filter 260 is made of glass material and located between the fifth lens element 250 and the image surface 270, and will not affect the focal length of the image capturing lens system. The image sensor 280 is disposed on or near the image surface 270 of the image capturing lens system.

The detailed optical data of the 2nd embodiment are shown in Table 3 and the aspheric surface data are shown in Table 4 below.

TABLE 3

2nd Embodiment
f = 10.02 mm, Fno = 2.68, HFOV = 14.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.597 | (ASP) | 1.874 | Plastic | 1.545 | 56.0 | 4.95 |
| 2 | | 53.838 | (ASP) | 0.050 | | | | |
| 3 | Ape. Stop | Plano | | 0.080 | | | | |
| 4 | Lens 2 | −3.926 | (ASP) | 0.291 | Plastic | 1.634 | 23.8 | −5.43 |
| 5 | | 28.648 | (ASP) | 0.110 | | | | |
| 6 | Lens 3 | 4.084 | (ASP) | 0.481 | Plastic | 1.544 | 56.0 | 19.95 |
| 7 | | 6.276 | (ASP) | 0.365 | | | | |
| 8 | Lens 4 | 48.175 | (ASP) | 0.378 | Plastic | 1.544 | 56.0 | −8.61 |
| 9 | | 4.257 | (ASP) | 0.401 | | | | |
| 10 | Lens 5 | 2.254 | (ASP) | 0.509 | Plastic | 1.660 | 20.4 | 9.86 |
| 11 | | 3.139 | (ASP) | 0.540 | | | | |
| 12 | Stop | Plano | | 0.500 | | | | |
| 13 | IR-filter | Plano | | 0.210 | Glass | 1.517 | 64.2 | — |
| 14 | | Plano | | 3.846 | | | | |
| 15 | Image | Plano | | — | | | | |

Note:
Reference wavelength is 587.6 nm (d-line).
An effective radius of the stop 201 (Surface 12) is 1.700 mm.

TABLE 4

Aspheric Coefficients

| Surface # | | | | | |
|---|---|---|---|---|---|
| | 1 | 2 | 4 | 5 | 6 |
| k = | −2.2387E−01 | −9.9000E+01 | −3.4292E+01 | 2.6466E+01 | 4.1079E+00 |
| A4 = | −1.1844E−03 | −5.5147E−02 | −2.2394E−02 | 1.4965E−01 | 6.2194E−02 |
| A6 = | 8.9650E−04 | 1.0353E−01 | 1.1436E−01 | −3.8202E−01 | −4.3677E−01 |
| A8 = | −9.9354E−04 | −8.4575E−02 | −8.3448E−02 | 7.6172E−01 | 9.6167E−01 |
| A10 = | 2.7945E−04 | 3.5312E−02 | 2.3983E−02 | −7.6231E−01 | −1.0252E+00 |
| A12 = | −4.3200E−05 | −8.0573E−03 | −3.1632E−04 | 4.0631E−01 | 5.7965E−01 |
| A14 = | −3.2271E−06 | 9.7954E−04 | −1.0612E−03 | −1.0981E−01 | −1.6583E−01 |
| A16 = | 7.4228E−07 | −5.3400E−05 | 1.4247E−04 | 1.1993E−02 | 1.8990E−02 |

| Surface # | | | | | |
|---|---|---|---|---|---|
| | 7 | 8 | 9 | 10 | 11 |
| k = | 8.9670E+00 | −8.1833E+01 | −7.6867E+01 | −8.9795E+00 | −2.4990E+00 |
| A4 = | −5.2803E−02 | −2.5325E−01 | −1.9064E−01 | −6.1526E−02 | −6.8085E−02 |
| A6 = | 6.5043E−02 | 7.1744E−01 | 6.4713E−01 | 1.8007E−01 | 1.0010E−01 |
| A8 = | 1.6198E−01 | −9.5997E−01 | −9.5878E−01 | −2.4061E−01 | −1.2215E−01 |
| A10 = | −3.9344E−01 | 6.8505E−01 | 7.9449E−01 | 1.8256E−01 | 9.2765E−02 |
| A12 = | 3.2123E−01 | −2.6653E−01 | −3.7686E−01 | −7.8712E−02 | −4.0429E−02 |
| A14 = | −1.1418E−01 | 5.2346E−02 | 9.4400E−02 | 1.7851E−02 | 9.2428E−03 |
| A16 = | 1.4912E−02 | −4.2258E−03 | −9.6228E−03 | −1.6526E−03 | −8.5972E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 10.02 | (R3 + R4)/(R3 − R4) | −0.76 |
| Fno | 2.68 | (R7 + R8)/(R7 − R8) | 1.19 |
| HFOV [deg.] | 14.5 | |f2/f1| | 1.10 |
| V5 | 20.4 | (f/f1) − (f/f2) | 3.87 |
| V2 + V5 | 44.2 | |f/f4| + |f/f5| | 2.18 |
| T23/T12 | 0.85 | tan(HFOV) | 0.26 |
| T23/T45 | 0.27 | Y11/Y52 | 1.23 |
| (T23/T12) + (T34/T45) | 1.76 | Yc21/CT5 | 1.93 |
| (T23 + T34)/CT1 | 0.25 | Dsr3/Dsr4 | 0.22 |
| CT2/CT5 | 0.57 | SD/TD | 0.58 |
| CT3/CT5 | 0.94 | BL/TD | 1.12 |
| (CT2 + CT3 + CT4 + CT5)/CT1 | 0.89 | TL/f | 0.96 |
| f/R8 | 2.35 | TL/ImgH | 3.63 |
| |f/R5| + |f/R6| | 4.05 | — | — |

3rd Embodiment

Figure 5:
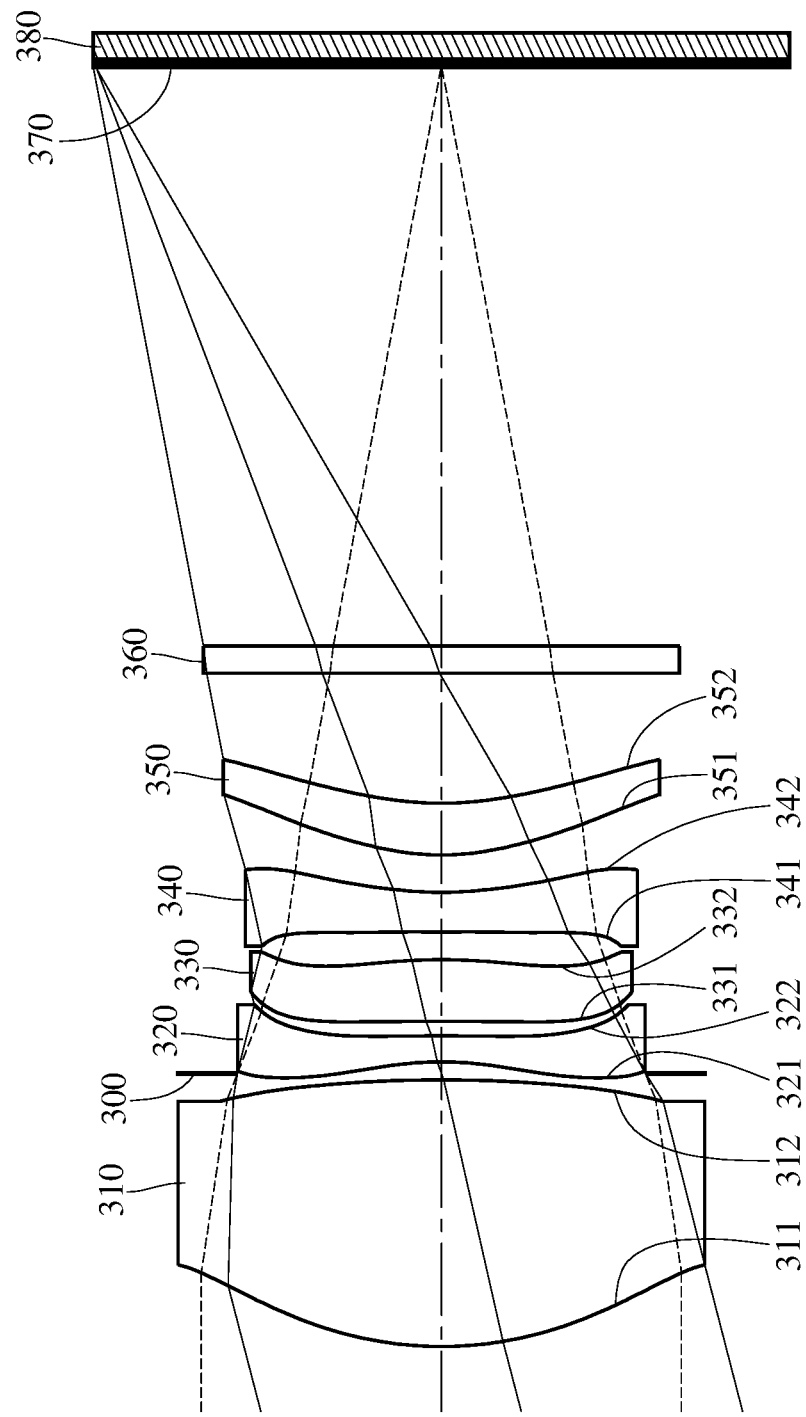
FIG. 5 is a schematic view of an image capturing unit according to the 3rd embodiment of the present disclosure.
Figure 6:
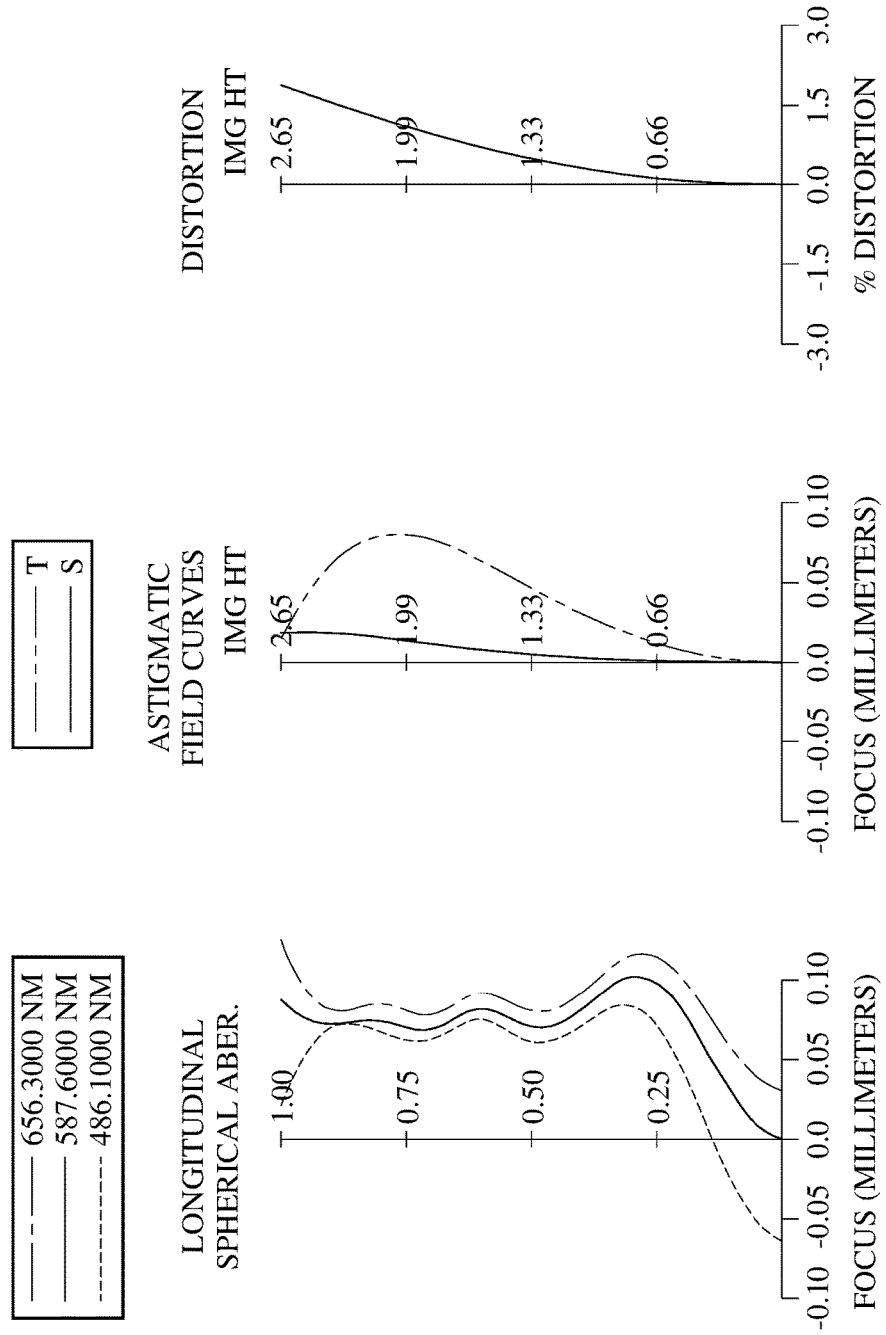
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the image capturing lens system (its reference numeral is omitted) of the present disclosure and an image sensor 380. The image capturing lens system includes, in order from an object side to an image side, a first lens element 310, an aperture stop 300, a second lens element 320, a third lens element 330, a fourth lens element 340, a fifth lens element 350, a filter 360 and an image surface 370. The image capturing lens system includes five single and non-cemented lens elements (310, 320, 330, 340 and 350) with no additional lens element disposed between the first lens element 310 and the fifth lens element 350, wherein there is an air gap in a paraxial region between each adjacent lens element.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has three inflection points. The image-side surface 342 of the fourth lens element 340 has one inflection point.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has three inflection points. The image-side surface 352 of the fifth lens element 350 has one inflection point.

The filter 360 is made of glass material and located between the fifth lens element 350 and the image surface 370, and will not affect the focal length of the image capturing lens system. The image sensor 380 is disposed on or near the image surface 370 of the image capturing lens system.

The detailed optical data of the 3rd embodiment are shown in Table 5 and the aspheric surface data are shown in Table 6 below.

TABLE 5

3rd Embodiment
f = 9.96 mm, Fno = 2.70, HFOV = 14.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.833 | (ASP) | 2.050 | Plastic | 1.545 | 56.0 | 4.54 |
| 2 | | −14.540 | (ASP) | 0.050 | | | | |
| 3 | Ape. Stop | Plano | | 0.089 | | | | |
| 4 | Lens 2 | −2.532 | (ASP) | 0.200 | Plastic | 1.639 | 23.5 | −4.79 |
| 5 | | −15.148 | (ASP) | 0.111 | | | | |
| 6 | Lens 3 | 45.249 | (ASP) | 0.475 | Plastic | 1.544 | 56.0 | 8.48 |
| 7 | | −4.204 | (ASP) | 0.213 | | | | |
| 8 | Lens 4 | 26.159 | (ASP) | 0.304 | Plastic | 1.544 | 56.0 | −4.80 |
| 9 | | 2.365 | (ASP) | 0.287 | | | | |
| 10 | Lens 5 | 1.808 | (ASP) | 0.399 | Plastic | 1.660 | 20.4 | 7.84 |
| 11 | | 2.536 | (ASP) | 1.000 | | | | |
| 12 | IR-filter | Plano | | 0.210 | Glass | 1.517 | 64.2 | — |
| 13 | | Plano | | 4.449 | | | | |
| 14 | Image | Plano | | — | | | | |

Note:
Reference wavelength is 587.6 nm (d-line).

TABLE 6

Aspheric Coefficients

| | Surface # | | | | |
|---|---|---|---|---|---|
| | 1 | 2 | 4 | 5 | 6 |
| k = | −3.2788E−01 | 5.0595E+01 | −1.3255E+01 | 9.6438E+01 | −9.9000E+01 |
| A4 = | −2.5156E−03 | −5.8974E−02 | −2.2158E−02 | 1.4604E−01 | 7.5186E−02 |
| A6= | 1.2240E−03 | 1.0371E−01 | 1.1471E−01 | −3.8691E−01 | −4.2318E−01 |

TABLE 6-continued

Aspheric Coefficients

| A8 =  | −1.3065E−03 | −8.3913E−02 | −8.3980E−02 | 7.6593E−01  | 9.6027E−01  |
|-------|-------------|-------------|-------------|-------------|-------------|
| A10 = | 3.0142E−04  | 3.5429E−02  | 2.3826E−02  | −7.6422E−01 | −1.0254E+00 |
| A12 = | −2.7710E−05 | −8.0948E−03 | −1.6780E−04 | 4.0635E−01  | 5.7957E−01  |
| A14 = | −9.7674E−06 | 9.4924E−04  | −1.0688E−03 | −1.0980E−01 | −1.6584E−01 |
| A16 = | 1.6222E−06  | −4.4518E−05 | 1.4283E−04  | 1.2000E−02  | 1.8988E−02  |

Surface #

|       | 7           | 8           | 9           | 10          | 11          |
|-------|-------------|-------------|-------------|-------------|-------------|
| k =   | −3.5075E+01 | 9.7932E+01  | −2.3559E+01 | −7.5492E+00 | −2.9221E+00 |
| A4 =  | −2.3318E−02 | −2.4528E−01 | −1.8725E−01 | −5.0673E−02 | −6.9852E−02 |
| A6 =  | 7.2253E−02  | 7.1603E−01  | 6.4872E−01  | 1.7629E−01  | 1.0104E−01  |
| A8 =  | 1.6734E−01  | −9.6228E−01 | −9.6420E−01 | −2.4029E−01 | −1.2065E−01 |
| A10 = | −3.9661E−01 | 6.8401E−01  | 7.9355E−01  | 1.8285E−01  | 9.2243E−02  |
| A12 = | 3.2106E−01  | −2.6658E−01 | −3.7594E−01 | −7.8855E−02 | −4.0645E−02 |
| A14 = | −1.1422E−01 | 5.2904E−02  | 9.4745E−02  | 1.7769E−02  | 9.3068E−03  |
| A16 = | 1.4913E−02  | −4.4593E−03 | −9.7800E−03 | −1.6187E−03 | −8.5584E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| f [mm]              | 9.96 | (R3 + R4)/(R3 − R4) | −1.40 |
|---------------------|------|---------------------|-------|
| Fno                 | 2.70 | (R7 + R8)/(R7 − R8) | 1.20  |
| HFOV [deg.]         | 14.5 | \|f2/f1\|           | 1.05  |
| V5                  | 20.4 | (f/f1) − (f/f2)     | 4.27  |
| V2 + V5             | 43.9 | \|f/f4\| + \|f/f5\| | 3.34  |
| T23/T12             | 0.80 | tan(HFOV)           | 0.26  |
| T23/T45             | 0.39 | Y11/Y52             | 1.21  |
| (T23/T12) + (T34/T45) | 1.54 | Yc21/CT5          | 3.03  |
| (T23 + T34)/CT1     | 0.16 | Dsr3/Dsr4           | 0.31  |
| CT2/CT5             | 0.50 | SD/TD               | 0.50  |
| CT3/CT5             | 1.19 | BL/TD               | 1.35  |
| (CT2 + CT3 + CT4 + CT5)/CT1 | 0.67 | TL/f         | 0.99  |
|                     |      | TL/ImgH             | 3.71  |
| f/R8                | 4.21 |                     |       |
| \|f/R5\| + \|f/R6\| | 2.59 |                     |       |

4th Embodiment

Figure 7:
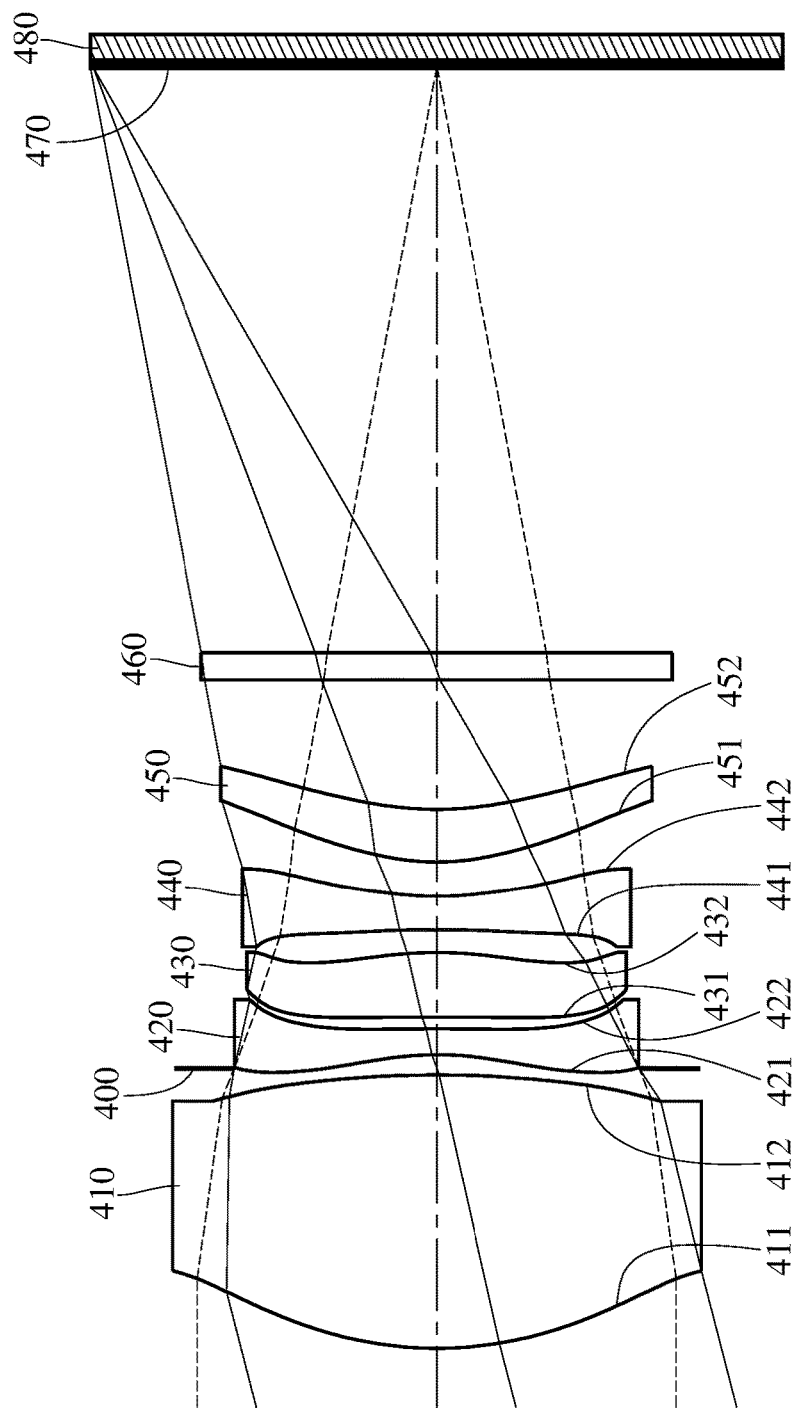
FIG. 7 is a schematic view of an image capturing unit according to the 4th embodiment of the present disclosure.
Figure 8:
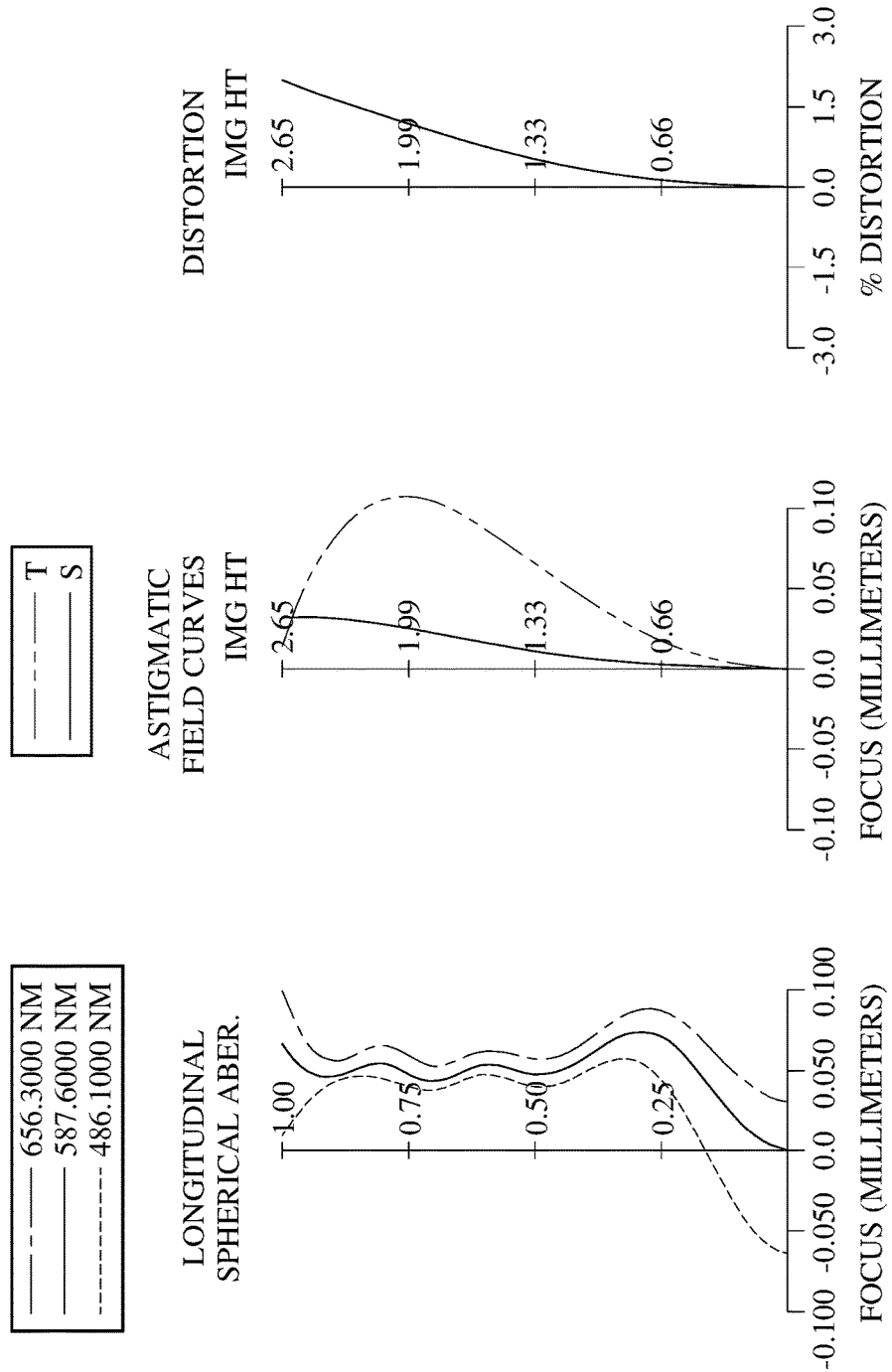
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the image capturing lens system (its reference numeral is omitted) of the present disclosure and an image sensor 480. The image capturing lens system includes, in order from an object side to an image side, a first lens element 410, an aperture stop 400, a second lens element 420, a third lens element 430, a fourth lens element 440, a fifth lens element 450, a filter 460 and an image surface 470. The image capturing lens system includes five single and non-cemented lens elements (410, 420, 430, 440 and 450) with no additional lens element disposed between the first lens element 410 and the fifth lens element 450, wherein there is an air gap in a paraxial region between each adjacent lens element.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has two inflection points. The image-side surface 442 of the fourth lens element 440 has one inflection point.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has three inflection points. The image-side surface 452 of the fifth lens element 450 has one inflection point.

The filter 460 is made of glass material and located between the fifth lens element 450 and the image surface 470, and will not affect the focal length of the image capturing lens system. The image sensor 480 is disposed on or near the image surface 470 of the image capturing lens system.

The detailed optical data of the 4th embodiment are shown in Table 7 and the aspheric surface data are shown in Table 8 below.

TABLE 7

4th Embodiment
f = 9.98 mm, Fno = 2.70, HFOV = 14.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.949 | (ASP) | 2.116 | Plastic | 1.545 | 56.0 | 4.48 |
| 2 | | −10.598 | (ASP) | 0.050 | | | | |
| 3 | Ape. Stop | Plano | | 0.107 | | | | |
| 4 | Lens 2 | −2.403 | (ASP) | 0.200 | Plastic | 1.639 | 23.5 | −4.49 |
| 5 | | −15.370 | (ASP) | 0.089 | | | | |
| 6 | Lens 3 | −56.459 | (ASP) | 0.498 | Plastic | 1.544 | 56.0 | 6.03 |
| 7 | | −3.112 | (ASP) | 0.175 | | | | |
| 8 | Lens 4 | −23.142 | (ASP) | 0.262 | Plastic | 1.544 | 56.0 | −3.87 |
| 9 | | 2.323 | (ASP) | 0.268 | | | | |
| 10 | Lens 5 | 1.768 | (ASP) | 0.406 | Plastic | 1.660 | 20.4 | 7.31 |
| 11 | | 2.537 | (ASP) | 1.000 | | | | |
| 12 | IR-filter | Plano | | 0.210 | Glass | 1.517 | 64.2 | — |
| 13 | | Plano | | 4.519 | | | | |
| 14 | Image | Plano | | | | | | |

Note:
Reference wavelength is 587.6 nm (d-line).

TABLE 8

Aspheric Coefficients

| Surface # | 1 | 2 | 4 | 5 | 6 |
|---|---|---|---|---|---|
| k = | −3.6612E−01 | 2.3445E+01 | −1.1676E+01 | 9.7346E+01 | 9.9000E+01 |
| A4 = | −2.9657E−03 | −5.6473E−02 | −2.2821E−02 | 1.4273E−01 | 7.4833E−02 |
| A6 = | 1.4642E−03 | 1.0361E−01 | 1.1435E−01 | −3.8781E−01 | −4.2321E−01 |
| A8 = | −1.3584E−03 | −8.4153E−02 | −8.3867E−02 | 7.6676E−01 | 9.5935E−01 |
| A10 = | 2.9140E−04 | 3.5480E−02 | 2.3893E−02 | −7.6468E−01 | −1.0253E+00 |
| A12 = | −1.9457E−05 | −8.0682E−03 | −2.2457E−04 | 4.0635E−01 | 5.7957E−01 |
| A14 = | −1.0220E−05 | 9.2956E−04 | −1.0618E−03 | −1.0979E−01 | −1.6584E−01 |
| A16 = | 1.5438E−06 | −4.1348E−05 | 1.4196E−04 | 1.1998E−02 | 1.8989E−02 |

| Surface # | 7 | 8 | 9 | 10 | 11 |
|---|---|---|---|---|---|
| k = | −1.8308E+01 | −9.9000E+01 | −2.2617E+01 | −7.0914E+00 | −2.2231E+00 |
| A4 = | −2.3988E−02 | −2.3233E−01 | −1.8730E−01 | −4.7426E−02 | −7.0313E−02 |
| A6 = | 7.2454E−02 | 7.1637E−01 | 6.5260E−01 | 1.7447E−01 | 9.8804E−02 |
| A8 = | 1.6796E−01 | −9.6179E−01 | −9.6398E−01 | −2.4064E−01 | −1.2037E−01 |
| A10 = | −3.9712E−01 | 6.8437E−01 | 7.9329E−01 | 1.8303E−01 | 9.2238E−02 |
| A12 = | 3.2106E−01 | −2.6672E−01 | −3.7600E−01 | −7.8800E−02 | −4.0626E−02 |
| A14 = | −1.1422E−01 | 5.2866E−02 | 9.4805E−02 | 1.7755E−02 | 9.3174E−03 |
| A16 = | 1.4916E−02 | −4.3834E−03 | −9.7913E−03 | −1.6196E−03 | −8.5964E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 9.98 | (R3 + R4)/(R3 − R4) | −1.37 |
| Fno | 2.70 | (R7 + R8)/(R7 − R8) | 0.82 |
| HFOV [deg.] | 14.5 | |f2/f1| | 1.00 |
| V5 | 20.4 | (f/f1) − (f/f2) | 4.45 |

-continued

| 4th Embodiment | | | |
|---|---|---|---|
| V2 + V5 | 43.9 | |f/f4| + |f/f5| | 3.95 |
| T23/T12 | 0.57 | tan(HFOV) | 0.26 |
| T23/T45 | 0.33 | Y11/Y52 | 1.23 |
| (T23/T12) + (T34/T45) | 1.22 | Yc21/CT5 | 3.10 |
| (T23 + T34)/CT1 | 0.12 | Dsr3/Dsr4 | 0.35 |
| CT2/CT5 | 0.49 | SD/TD | 0.48 |
| CT3/CT5 | 1.23 | BL/TD | 1.37 |
| (CT2 + CT3 + CT4 + CT5)/CT1 | 0.65 | TL/f | 0.99 |
| f/R8 | 4.30 | TL/ImgH | 3.73 |
| |f/R5| + |f/R6| | 3.38 | — | — |

5th Embodiment

Figure 9:
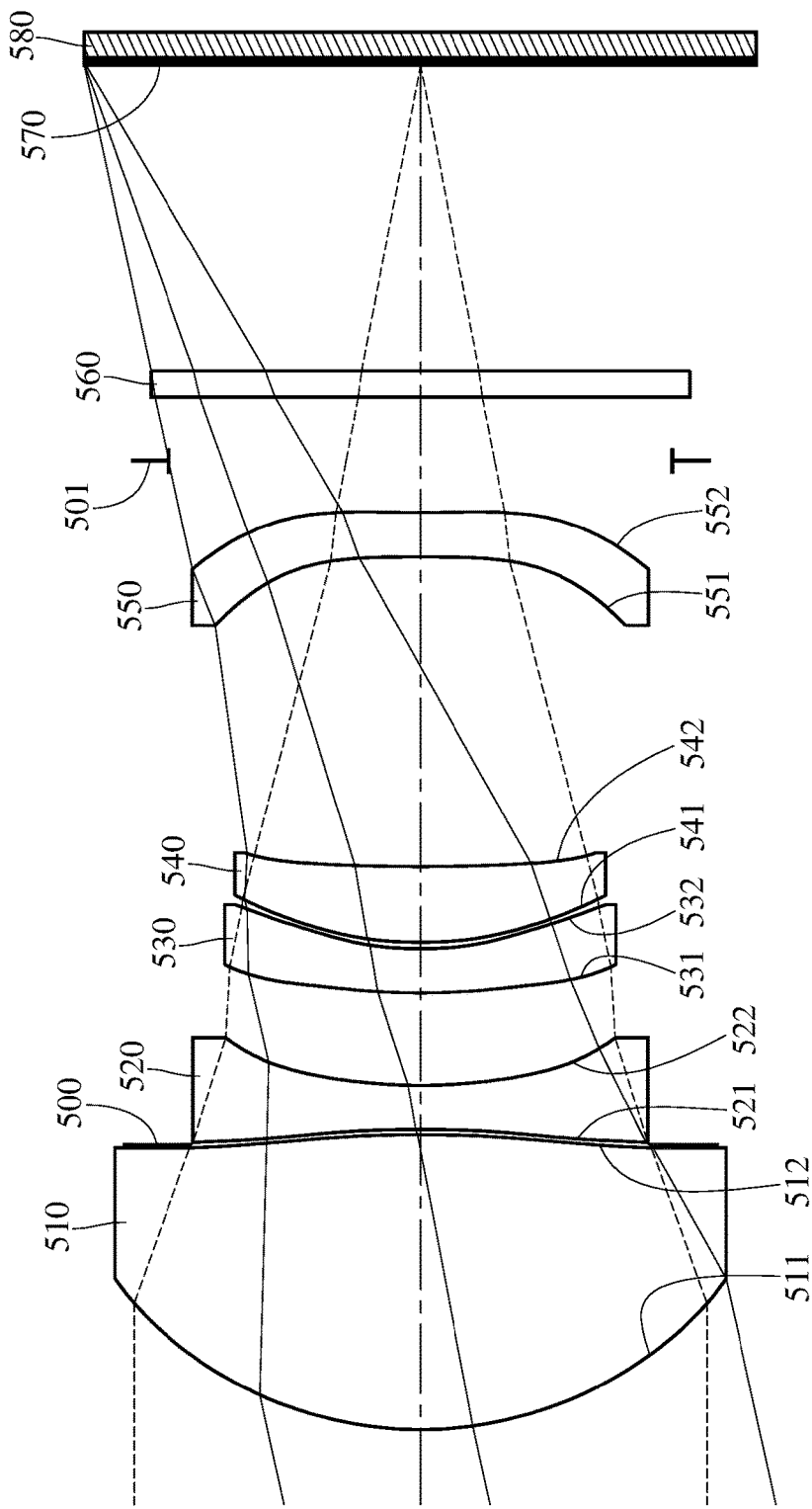
FIG. 9 is a schematic view of an image capturing unit according to the 5th embodiment of the present disclosure.
Figure 10:
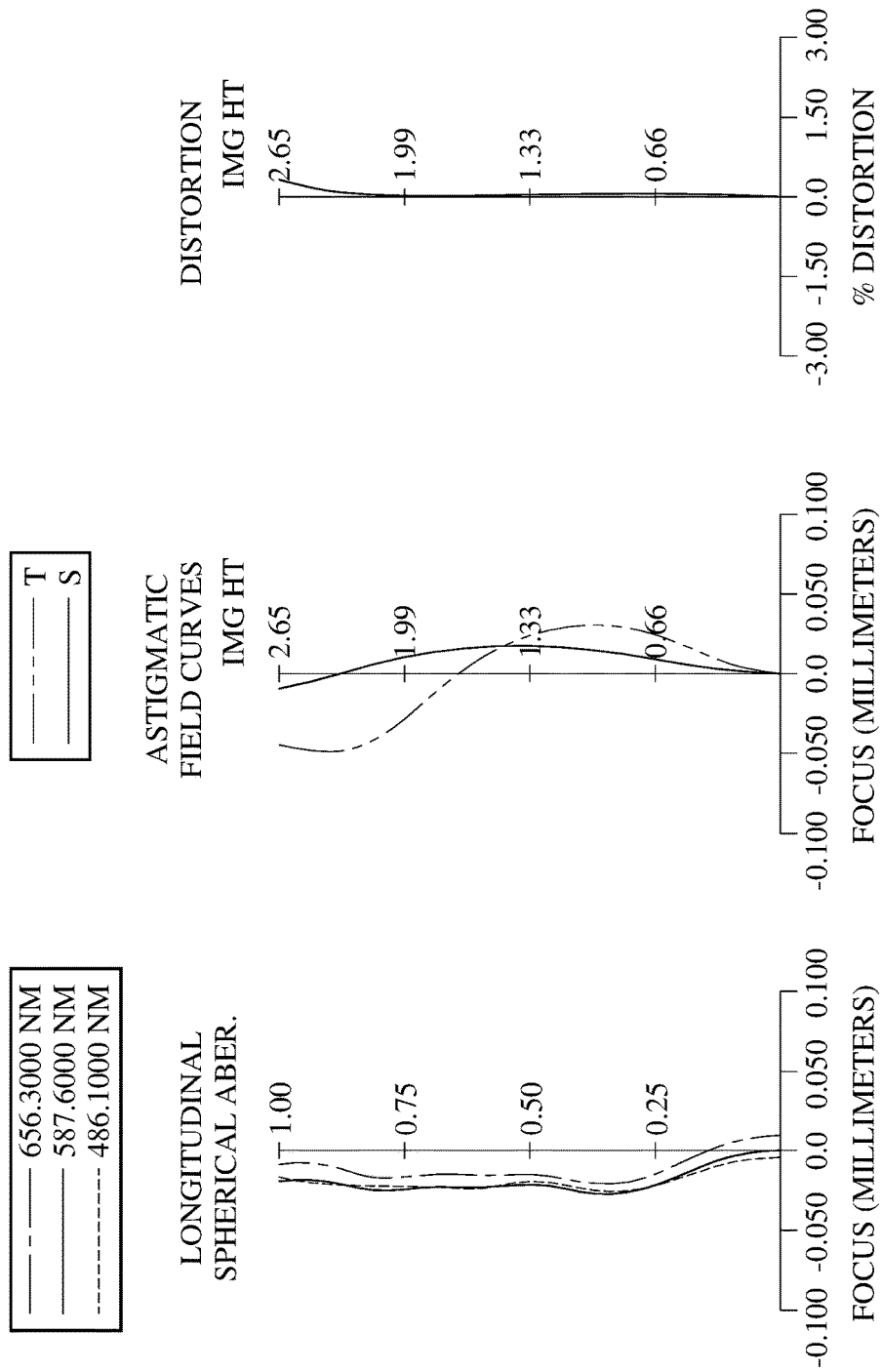
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the image capturing lens system (its reference numeral is omitted) of the present disclosure and an image sensor 580. The image capturing lens system includes, in order from an object side to an image side, a first lens element 510, an aperture stop 500, a second lens element 520, a third lens element 530, a fourth lens element 540, a fifth lens element 550, a stop 501, a filter 560 and an image surface 570. The image capturing lens system includes five single and non-cemented lens elements (510, 520, 530, 540 and 550) with no additional lens element disposed between the first lens element 510 and the fifth lens element 550, wherein there is an air gap in a paraxial region between each adjacent lens element.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has one inflection point and one critical point.

The filter 560 is made of glass material and located between the fifth lens element 550 and the image surface 570, and will not affect the focal length of the image capturing lens system. The image sensor 580 is disposed on or near the image surface 570 of the image capturing lens system.

The detailed optical data of the 5th embodiment are shown in Table 9 and the aspheric surface data are shown in Table 10 below.

TABLE 9

5th Embodiment
f = 11.99 mm, Fno = 2.65, HFOV = 12.5 deg.

| Surface # |         | Curvature Radius |       | Thickness | Material | Index | Abbe # | Focal Length |
|-----------|---------|------------------|-------|-----------|----------|-------|--------|--------------|
| 0         | Object  | Plano            |       | Infinity  |          |       |        |              |
| 1         | Lens 1  | 3.057            | (ASP) | 2.332     | Plastic  | 1.545 | 56.0   | 4.80         |
| 2         |         | −13.270          | (ASP) | −0.084    |          |       |        |              |
| 3         | Ape. Stop | Plano          |       | 0.125     |          |       |        |              |
| 4         | Lens 2  | −12.741          | (ASP) | 0.350     | Plastic  | 1.639 | 23.3   | −4.88        |
| 5         |         | 4.175            | (ASP) | 0.731     |          |       |        |              |
| 6         | Lens 3  | 5.980            | (ASP) | 0.350     | Plastic  | 1.614 | 26.0   | −14.15       |
| 7         |         | 3.462            | (ASP) | 0.050     |          |       |        |              |
| 8         | Lens 4  | 3.894            | (ASP) | 0.597     | Plastic  | 1.660 | 20.4   | 7.93         |
| 9         |         | 14.301           | (ASP) | 2.449     |          |       |        |              |
| 10        | Lens 5  | −30.646          | (ASP) | 0.353     | Plastic  | 1.544 | 56.0   | −16.32       |
| 11        |         | 12.556           | (ASP) | 0.410     |          |       |        |              |
| 12        | Stop    | Plano            |       | 0.500     |          |       |        |              |
| 13        | IR-filter | Plano          |       | 0.210     | Glass    | 1.517 | 64.2   | —            |
| 14        |         | Plano            |       | 2.413     |          |       |        |              |
| 15        | Image   | Plano            |       | —         |          |       |        |              |

Note:
Reference wavelength is 587.6 nm (d-line).
An effective radius of the stop 501 (Surface 12) is 1.988 mm.

TABLE 10

Aspheric Coefficients

| | Surface # | | | | |
|---|---|---|---|---|---|
| | 1 | 2 | 4 | 5 | 6 |
| k = | −4.3780E−02 | 1.9154E+01 | 3.7439E+01 | −1.8439E+01 | −3.3519E+01 |
| A4 = | 1.8620E−04 | −4.5821E−02 | −5.0241E−02 | 2.2395E−02 | 6.3100E−02 |
| A6 = | −4.2563E−04 | 5.5819E−02 | 5.9235E−02 | −1.1786E−02 | −1.4043E−01 |

TABLE 10-continued

| Aspheric Coefficients | | | | | |
|---|---|---|---|---|---|
| A8 = | 2.8222E−04 | −2.7034E−02 | −2.6277E−02 | 1.3927E−02 | 1.2697E−01 |
| A10 = | −7.3458E−05 | 6.3001E−03 | 5.7979E−03 | −3.5195E−03 | −5.4203E−02 |
| A12 = | 7.0575E−06 | −5.6754E−04 | −5.1388E−04 | 1.9193E−04 | 1.1726E−02 |
| A14 = | — | — | — | — | −1.0442E−03 |

| | Surface # | | | | |
|---|---|---|---|---|---|
| | 7 | 8 | 9 | 10 | 11 |
| k = | −1.2091E+01 | 3.6365E+00 | 6.9593E+01 | −5.5172E+01 | −8.2919E+01 |
| A4 = | 2.4386E−01 | 1.2969E−01 | −1.3360E−02 | −1.1708E−01 | −1.0385E−01 |
| A6 = | −3.4221E−01 | −1.5760E−01 | 7.5844E−03 | 3.9312E−02 | 4.0736E−02 |
| A8 = | 2.2569E−01 | 7.5901E−02 | 1.9334E−02 | −2.2597E−02 | −1.9638E−02 |
| A10 = | −7.4941E−02 | −1.4584E−02 | −2.8578E−02 | 1.0483E−02 | 7.3054E−03 |
| A12 = | 1.1702E−02 | 1.7694E−04 | 1.7221E−02 | −3.1906E−03 | −1.7224E−03 |
| A14 = | −6.7903E−04 | 1.0933E−04 | −4.6538E−03 | 5.9791E−04 | 2.2800E−04 |
| A16 = | — | — | 4.7496E−04 | −4.7577E−05 | −1.2212E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 11.99 | (R3 + R4)/(R3 − R4) | 0.51 |
| Fno | 2.65 | (R7 + R8)/(R7 − R8) | −1.75 |
| HFOV [deg.] | 12.5 | \|f2/f1\| | 1.02 |
| V5 | 56.0 | (f/f1) − (f/f2) | 4.95 |
| V2 + V5 | 79.3 | \|f/f4\| + \|f/f5\| | 2.25 |
| T23/T12 | 17.83 | tan(HFOV) | 0.22 |
| T23/T45 | 0.30 | Y11/Y52 | 1.34 |
| (T23/T12) + (T34/T45) | 17.85 | Yc21/CT5 | — |
| (T23 + T34)/CT1 | 0.33 | Dsr3/Dsr4 | 0.26 |
| CT2/CT5 | 0.99 | SD/TD | 0.69 |
| CT3/CT5 | 0.99 | BL/TD | 0.49 |
| (CT2 + CT3 + CT4 + CT5)/CT1 | 0.71 | TL/f | 0.90 |
| | | TL/ImgH | 4.07 |
| f/R8 | 0.84 | — | — |
| \|f/R5\| + \|f/R6\| | 5.47 | | |

6th Embodiment

Figure 11:
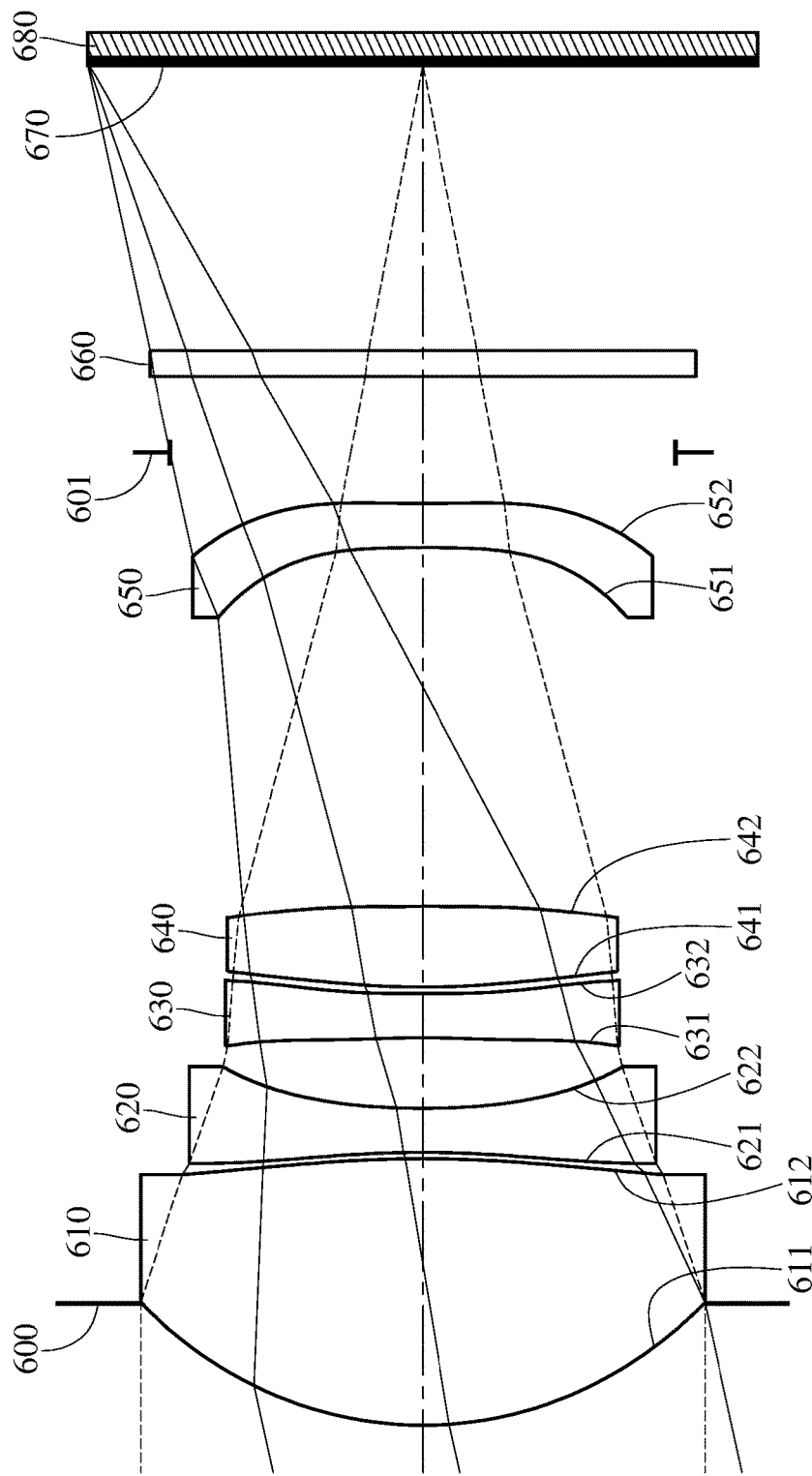
FIG. 11 is a schematic view of an image capturing unit according to the 6th embodiment of the present disclosure.
Figure 12:
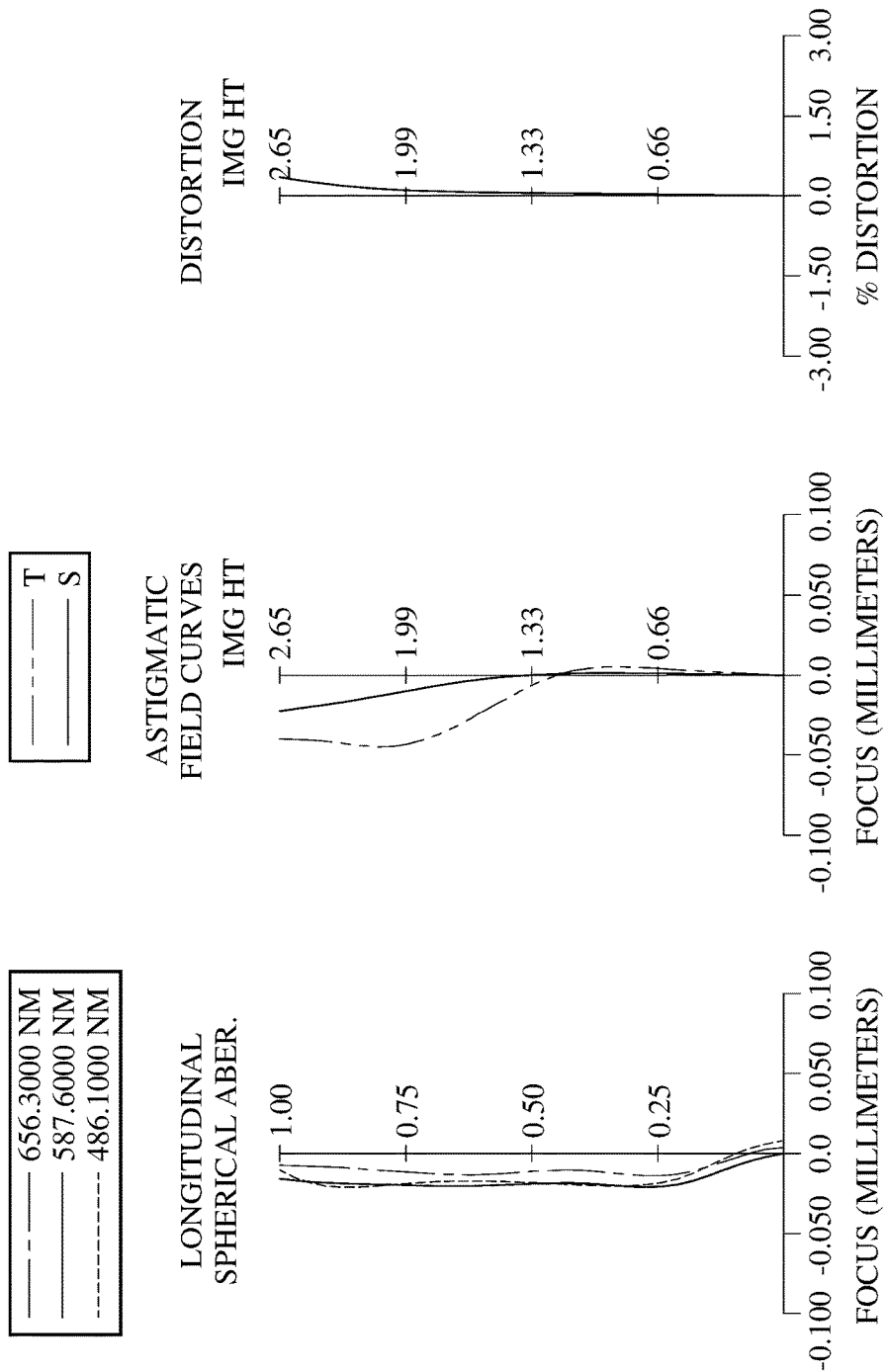
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the image capturing lens system (its reference numeral is omitted) of the present disclosure and an image sensor 680. The image capturing lens system includes, in order from an object side to an image side, an aperture stop 600, a first lens element 610, a second lens element 620, a third lens element 630, a fourth lens element 640, a fifth lens element 650, a stop 601, a filter 660 and an image surface 670. The image capturing lens system includes five single and non-cemented lens elements (610, 620, 630, 640 and 650) with no additional lens element disposed between the first lens element 610 and the fifth lens element 650, wherein there is an air gap in a paraxial region between each adjacent lens element.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has one inflection point.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has one inflection point and one critical point.

The filter 660 is made of glass material and located between the fifth lens element 650 and the image surface 670, and will not affect the focal length of the image capturing lens system. The image sensor 680 is disposed on or near the image surface 670 of the image capturing lens system.

The detailed optical data of the 6th embodiment are shown in Table 11 and the aspheric surface data are shown in Table 12 below.

TABLE 11

6th Embodiment
f = 11.99 mm, Fno = 2.68, HFOV = 12.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.962 | | | | |
| 2 | Lens 1 | 3.012 | (ASP) | 2.113 | Plastic | 1.545 | 56.0 | 4.41 |
| 3 | | −8.961 | (ASP) | 0.050 | | | | |
| 4 | Lens 2 | −7.745 | (ASP) | 0.350 | Plastic | 1.639 | 23.3 | −5.21 |
| 5 | | 5.941 | (ASP) | 0.559 | | | | |
| 6 | Lens 3 | −7.105 | (ASP) | 0.350 | Plastic | 1.614 | 26.0 | −12.48 |
| 7 | | −100.000 | (ASP) | 0.050 | | | | |
| 8 | Lens 4 | 6.913 | (ASP) | 0.645 | Plastic | 1.671 | 19.3 | 9.35 |
| 9 | | −65.172 | (ASP) | 2.845 | | | | |
| 10 | Lens 5 | −16.994 | (ASP) | 0.350 | Plastic | 1.544 | 56.0 | −13.06 |
| 11 | | 12.292 | (ASP) | 0.404 | | | | |
| 12 | Stop | Plano | | 0.600 | | | | |
| 13 | IR-filter | Plano | | 0.210 | Glass | 1.517 | 64.2 | — |
| 14 | | Plano | | 2.260 | | | | |
| 15 | Image | Plano | | — | | | | |

Note:
Reference wavelength is 587.6 nm (d-line).
An effective radius of the stop 601 (Surface 12) is 2.000 mm.

TABLE 12

Aspheric Coefficients

| | Surface # | | | | |
|---|---|---|---|---|---|
| | 2 | 3 | 4 | 5 | 6 |
| k = | −9.1621E−02 | −2.2512E+01 | 6.2189E+00 | −7.3235E+01 | 1.3443E+01 |
| A4 = | 3.3553E−04 | 9.2930E−03 | 2.1456E−02 | 6.4106E−02 | 1.2634E−01 |
| A6 = | 2.5711E−05 | −5.8522E−03 | −8.2987E−03 | −3.5309E−02 | −1.1371E−01 |
| A8 = | −1.1095E−05 | 2.5440E−03 | 4.1818E−03 | 1.7395E−02 | 6.1413E−02 |
| A10 = | −2.4628E−06 | −5.6052E−04 | −1.0208E−03 | −4.3830E−03 | −2.1637E−02 |
| A12 = | 1.4412E−07 | 4.8371E−05 | 9.3338E−05 | 4.3447E−04 | 4.4930E−03 |
| A14 = | — | — | — | — | −3.8668E−04 |

| | Surface # | | | | |
|---|---|---|---|---|---|
| | 7 | 8 | 9 | 10 | 11 |
| k = | −6.2824E+01 | 1.0998E+01 | 1.7735E+01 | 6.4461E+01 | 1.5093E+01 |
| A4 = | 1.5977E−01 | 1.1771E−02 | −3.5405E−02 | −1.0323E−01 | −1.0091E−01 |
| A6 = | −1.8641E−01 | −6.2227E−02 | 2.1613E−02 | 2.6523E−02 | 3.7037E−02 |
| A8 = | 1.2317E−01 | 5.6618E−02 | −1.3125E−02 | −2.2775E−03 | −1.4380E−02 |
| A10 = | −4.9907E−02 | −2.5519E−02 | 7.2243E−03 | −6.4700E−03 | 3.8297E−03 |
| A12 = | 1.1154E−02 | 5.7889E−03 | −2.4791E−03 | 4.6314E−03 | −5.0751E−04 |
| A14 = | −1.0313E−03 | −5.4531E−04 | 4.1723E−04 | −1.3596E−03 | −3.0080E−06 |
| A16 = | — | — | −2.7238E−05 | 1.5016E−04 | 5.6791E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 11.98 | (R3 + R4)/(R3 − R4) | 0.13 |
| Fno | 2.68 | (R7 + R8)/(R7 − R8) | −0.81 |
| HFOV [deg.] | 12.5 | |f2/f1| | 1.18 |
| V5 | 56.0 | (f/f1) − (f/f2) | 5.02 |
| V2 + V5 | 79.3 | |f/f4| + |f/f5| | 2.20 |
| T23/T12 | 11.18 | tan(HFOV) | 0.22 |
| T23/T45 | 0.20 | Y11/Y52 | 1.23 |
| (T23/T12) + (T34/T45) | 11.20 | Yc21/CT5 | 5.06 |
| (T23 + T34)/CT1 | 0.29 | Dsr3/Dsr4 | 0.77 |
| CT2/CT5 | 1.00 | SD/TD | 0.87 |
| CT3/CT5 | 1.00 | BL/TD | 0.48 |
| (CT2 + CT3 + CT4 + CT5)/CT1 | 0.80 | TL/f | 0.90 |
| f/R8 | −0.18 | TL/ImgH | 4.07 |
| |f/R5| + |f/R6| | 1.81 | — | — |

7th Embodiment

Figure 13:
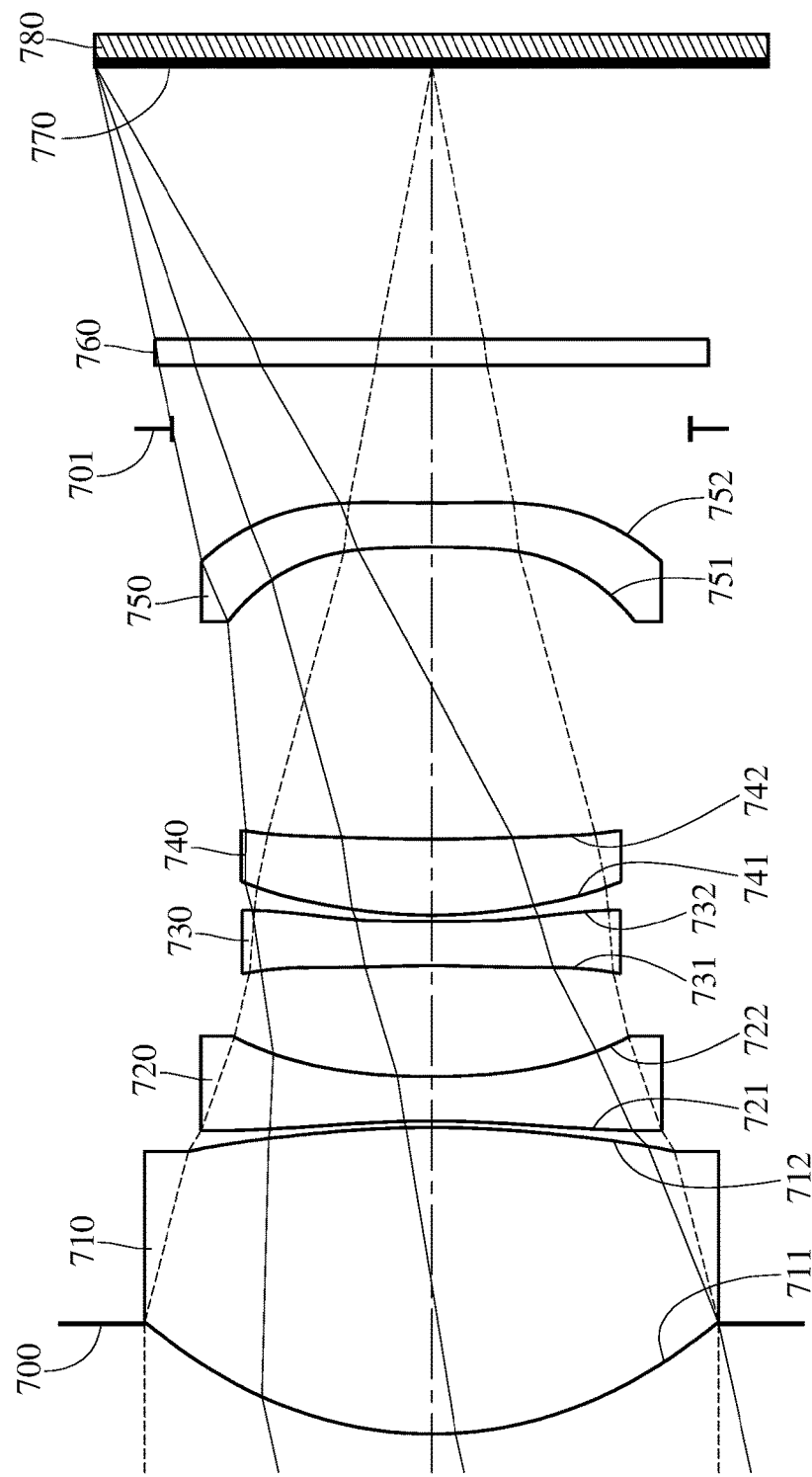
FIG. 13 is a schematic view of an image capturing unit according to the 7th embodiment of the present disclosure.
Figure 14:
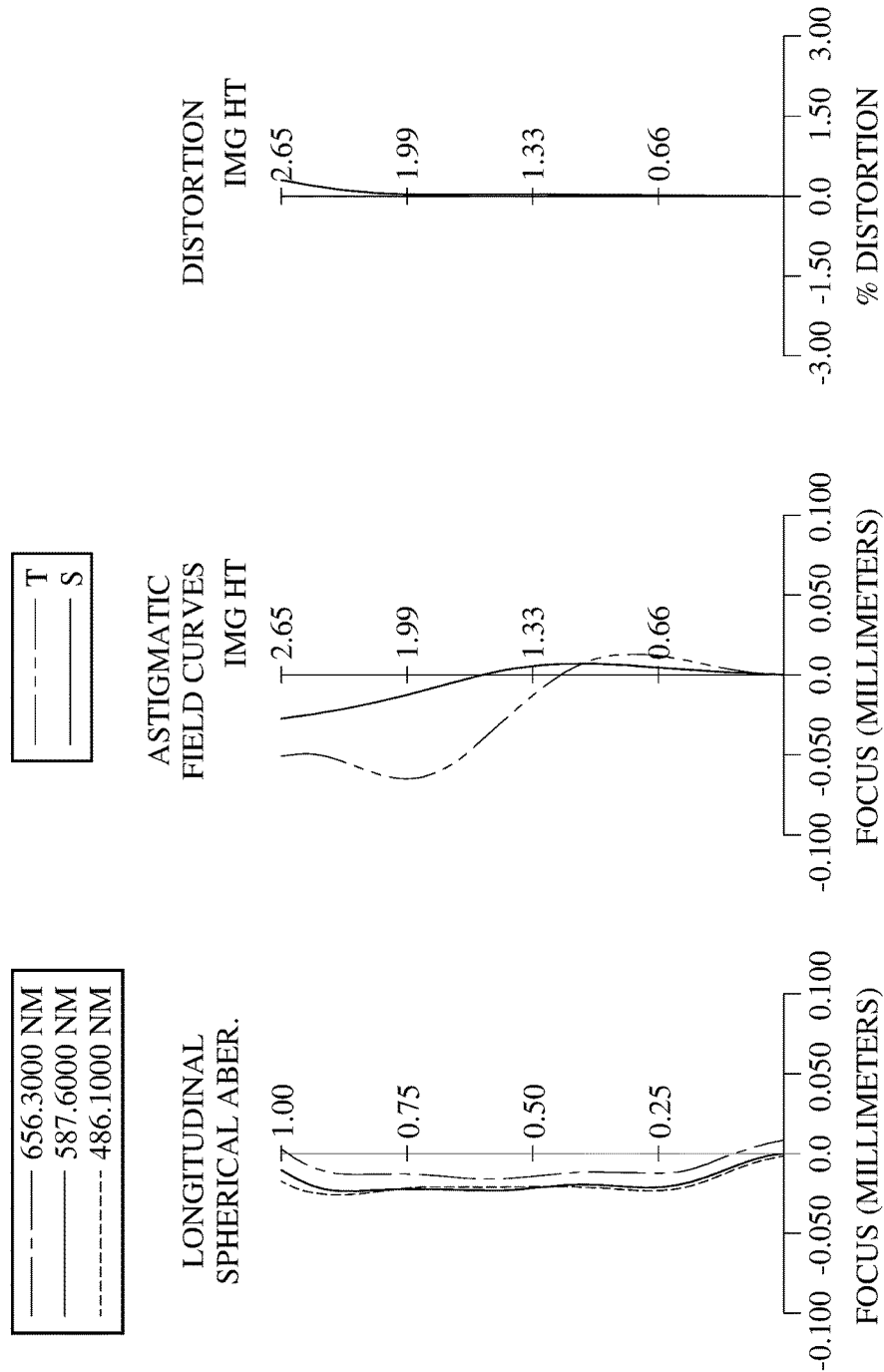
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the image capturing lens system (its reference numeral is omitted) of the present disclosure and an image sensor 780. The image capturing lens system includes, in order from an object side to an image side, an aperture stop 700, a first lens element 710, a second lens element 720, a third lens element 730, a fourth lens element 740, a fifth lens element 750, a stop 701, a filter 760 and an image surface 770. The image capturing lens system includes five single and non-cemented lens elements (710, 720, 730, 740 and 750) with no additional lens element disposed between the first lens element 710 and the fifth lens element 750, wherein there is an air gap in a paraxial region between each adjacent lens element.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The image-side surface 742 of the fourth lens element 740 has two inflection points.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has one inflection point and one critical point.

The filter 760 is made of glass material and located between the fifth lens element 750 and the image surface 770, and will not affect the focal length of the image capturing lens system. The image sensor 780 is disposed on or near the image surface 770 of the image capturing lens system.

The detailed optical data of the 7th embodiment are shown in Table 13 and the aspheric surface data are shown in Table 14 below.

TABLE 13

7th Embodiment
f = 11.99 mm, Fno = 2.65, HFOV = 12.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.868 | | | | |
| 2 | Lens 1 | 3.158 | (ASP) | 2.419 | Plastic | 1.545 | 56.0 | 4.59 |
| 3 | | −8.724 | (ASP) | 0.050 | | | | |
| 4 | Lens 2 | −7.901 | (ASP) | 0.350 | Plastic | 1.639 | 23.3 | −5.43 |
| 5 | | 6.287 | (ASP) | 0.875 | | | | |
| 6 | Lens 3 | −7.169 | (ASP) | 0.350 | Plastic | 1.614 | 26.0 | −12.60 |
| 7 | | −100.000 | (ASP) | 0.050 | | | | |
| 8 | Lens 4 | 4.157 | (ASP) | 0.599 | Plastic | 1.671 | 19.3 | 9.63 |
| 9 | | 10.971 | (ASP) | 2.305 | | | | |
| 10 | Lens 5 | −19.432 | (ASP) | 0.350 | Plastic | 1.544 | 56.0 | −13.54 |
| 11 | | 11.943 | (ASP) | 0.584 | | | | |
| 12 | Stop | Plano | | 0.500 | | | | |
| 13 | IR-filter | Plano | | 0.210 | Glass | 1.517 | 64.2 | — |
| 14 | | Plano | | 2.144 | | | | |
| 15 | Image | Plano | | — | | | | |

Note:
Reference wavelength is 587.6 nm (d-line).
An effective radius of the stop 701 (Surface 12) is 2.041 mm.

TABLE 14

Aspheric Coefficients

| | Surface # | | | | |
|---|---|---|---|---|---|
| | 2 | 3 | 4 | 5 | 6 |
| k = | −2.0497E−01 | −7.6350E+00 | 4.5647E+00 | −8.4617E+01 | 1.1656E+01 |
| A4 = | −2.3163E−04 | −2.3388E−03 | 2.5381E−02 | 7.7248E−02 | 1.3984E−01 |
| A6 = | 1.3299E−04 | 4.4812E−03 | −8.2169E−03 | −4.0452E−02 | −1.2489E−01 |

TABLE 14-continued

| Aspheric Coefficients | | | | |
|---|---|---|---|---|
| A8 = | −1.2260E−04 | −1.8423E−03 | 2.5528E−03 | 1.5026E−02 | 5.9050E−02 |
| A10 = | 2.8417E−05 | 2.8068E−04 | −4.6718E−04 | −3.1587E−03 | −1.8803E−02 |
| A12 = | −3.5195E−06 | −1.5199E−05 | 4.0948E−05 | 3.5156E−04 | 4.0940E−03 |
| A14 = | — | — | — | — | −4.2394E−04 |

| | Surface # | | | | |
|---|---|---|---|---|---|
| | 7 | 8 | 9 | 10 | 11 |
| k = | 9.9000E+01 | 3.8365E+00 | 3.7413E+01 | 1.0202E+01 | −9.2216E+01 |
| A4 = | 1.8735E−01 | 1.6616E−02 | −4.6476E−02 | −1.2104E−01 | −1.0754E−01 |
| A6 = | −2.1946E−01 | −7.7502E−02 | 3.2623E−02 | 3.5279E−02 | 4.5420E−02 |
| A8 = | 1.3386E−01 | 7.1079E−02 | −2.1183E−02 | −8.7582E−03 | −2.1198E−02 |
| A10 = | −4.8671E−02 | −3.0758E−02 | 1.5394E−02 | −3.2975E−03 | 7.5233E−03 |
| A12 = | 9.8759E−03 | 6.5637E−03 | −7.0767E−03 | 3.9263E−03 | −1.6959E−03 |
| A14 = | −8.6269E−04 | −5.8280E−04 | 1.6485E−03 | −1.3808E−03 | 1.9830E−04 |
| A16 = | — | — | −1.5751E−04 | 1.7146E−04 | −8.0242E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 11.99 | (R3 + R4)/(R3 − R4) | 0.11 |
| Fno | 2.65 | (R7 + R8)/(R7 − R8) | −2.22 |
| HFOV [deg.] | 12.5 | \|f2/f1\| | 1.18 |
| V5 | 56.0 | (f/f1) − (f/f2) | 4.82 |
| V2 + V5 | 79.3 | \|f/f4\| + \|f/f5\| | 2.13 |
| T23/T12 | 17.50 | tan(HFOV) | 0.22 |
| T23/T45 | 0.38 | Y11/Y52 | 1.25 |
| (T23/T12) + (T34/T45) | 17.52 | Yc21/CT5 | 4.83 |
| (T23 + T34)/CT1 | 0.38 | Dsr3/Dsr4 | 0.82 |
| CT2/CT5 | 1.00 | SD/TD | 0.88 |
| CT3/CT5 | 1.00 | BL/TD | 0.47 |
| (CT2 + CT3 + CT4 + CT5)/CT1 | 0.68 | TL/f | 0.90 |
| f/R8 | 1.09 | TL/ImgH | 4.07 |
| \|f/R5\| + \|f/R6\| | 1.79 | — | — |

8th Embodiment

Figure 15:
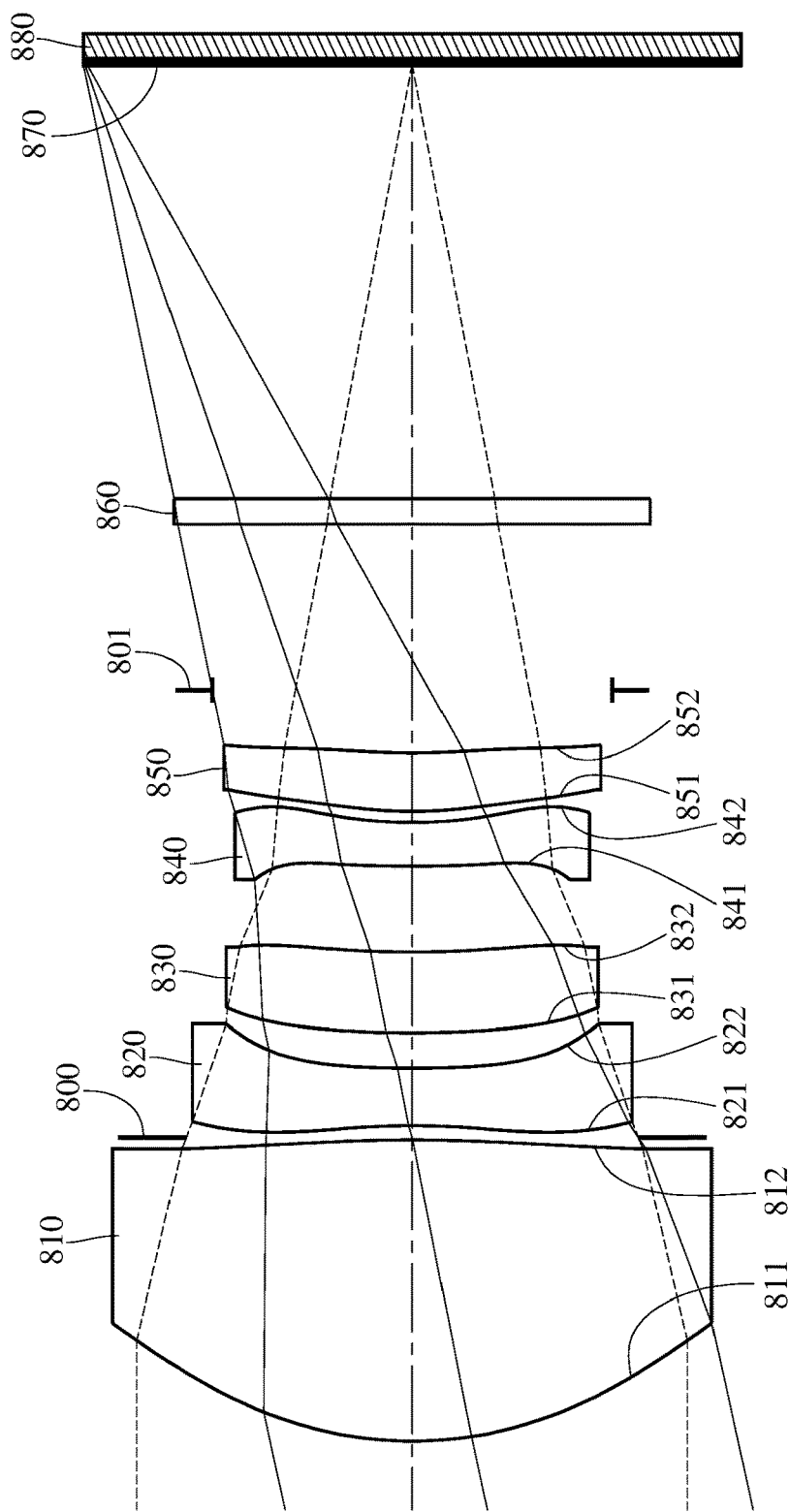
FIG. 15 is a schematic view of an image capturing unit according to the 8th embodiment of the present disclosure.
Figure 16:
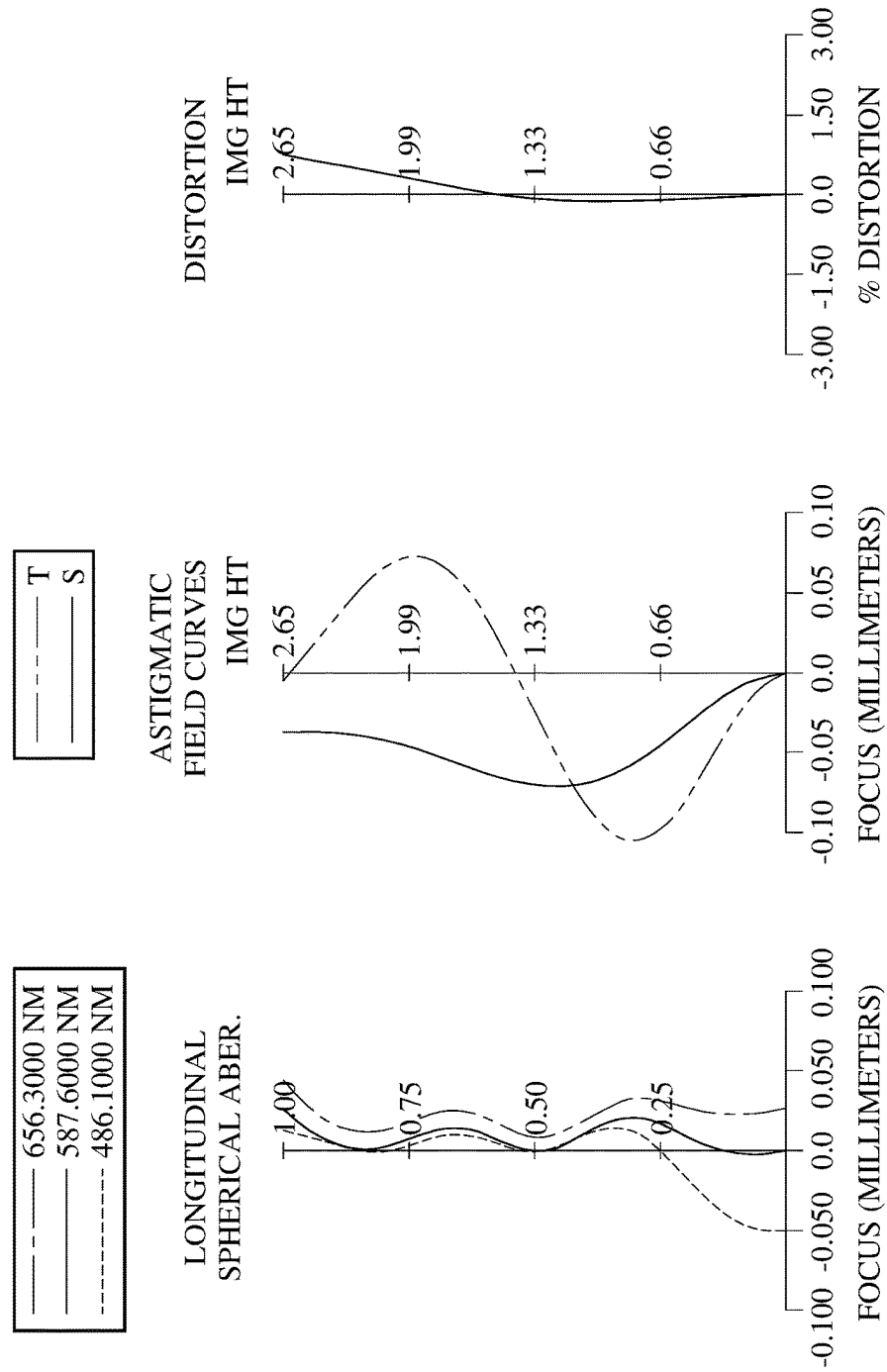
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the image capturing lens system (its reference numeral is omitted) of the present disclosure and an image sensor 880. The image capturing lens system includes, in order from an object side to an image side, a first lens element 810, an aperture stop 800, a second lens element 820, a third lens element 830, a fourth lens element 840, a fifth lens element 850, a stop 801, a filter 860 and an image surface 870. The image capturing lens system includes five single and non-cemented lens elements (810, 820, 830, 840 and 850) with no additional lens element disposed between the first lens element 810 and the fifth lens element 850, wherein there is an air gap in a paraxial region between each adjacent lens element.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has one inflection point. The image-side surface 842 of the fourth lens element 840 has one inflection point.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has two inflection points.

The filter 860 is made of glass material and located between the fifth lens element 850 and the image surface 870, and will not affect the focal length of the image capturing lens system. The image sensor 880 is disposed on or near the image surface 870 of the image capturing lens system.

The detailed optical data of the 8th embodiment are shown in Table 15 and the aspheric surface data are shown in Table 16 below.

TABLE 15

8th Embodiment
f = 12.02 mm, Fno = 2.69, HFOV = 12.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.118 | (ASP) | 2.447 | Plastic | 1.545 | 56.0 | 5.07 |
| 2 | | −17.338 | (ASP) | 0.020 | | | | |
| 3 | Ape. Stop | Plano | | 0.096 | | | | |
| 4 | Lens 2 | −5.941 | (ASP) | 0.469 | Plastic | 1.639 | 23.3 | −6.20 |
| 5 | | 12.268 | (ASP) | 0.285 | | | | |
| 6 | Lens 3 | 8.925 | (ASP) | 0.654 | Plastic | 1.544 | 56.0 | −774.43 |
| 7 | | 8.514 | (ASP) | 0.700 | | | | |
| 8 | Lens 4 | 17.686 | (ASP) | 0.357 | Plastic | 1.544 | 56.0 | −8.69 |
| 9 | | 3.704 | (ASP) | 0.088 | | | | |
| 10 | Lens 5 | 3.024 | (ASP) | 0.473 | Plastic | 1.660 | 20.4 | 9.85 |
| 11 | | 5.303 | (ASP) | 0.509 | | | | |
| 12 | Stop | Plano | | 1.351 | | | | |
| 13 | IR-filter | Plano | | 0.210 | Glass | 1.517 | 64.2 | — |
| 14 | | Plano | | 3.509 | | | | |
| 15 | Image | Plano | | — | | | | |

Note:
Reference wavelength is 587.6 nm (d-line).
An effective radius of the stop 801 (Surface 12) is 1.623 mm.

TABLE 16

Aspheric Coefficients

| Surface # | 1 | 2 | 4 | 5 | 6 |
|---|---|---|---|---|---|
| k = | −2.2805E−01 | −4.2129E+01 | −5.5991E+01 | 5.4100E+01 | 2.7844E+01 |
| A4 = | −2.1759E−03 | −4.1099E−02 | −2.9294E−02 | 4.8671E−02 | 1.0590E−02 |
| A6 = | 1.1582E−03 | 7.2897E−02 | 9.0755E−02 | −3.7416E−02 | −3.9419E−02 |
| A8 = | −8.0724E−04 | −5.6410E−02 | −7.3614E−02 | 7.8475E−02 | 6.6101E−02 |
| A10 = | 2.5241E−04 | 2.4265E−02 | 3.2535E−02 | −7.7424E−02 | −5.6024E−02 |
| A12 = | −4.8519E−05 | −6.0008E−03 | −8.1845E−03 | 3.9572E−02 | 2.6178E−02 |
| A14 = | 4.8038E−06 | 8.0195E−04 | 1.1018E−03 | −9.9573E−03 | −6.0835E−03 |
| A16 = | −1.8695E−07 | −4.4915E−05 | −6.1790E−05 | 9.4771E−04 | 5.1095E−04 |

| Surface # | 7 | 8 | 9 | 10 | 11 |
|---|---|---|---|---|---|
| k = | 2.1514E+01 | −5.8887E+01 | −9.9000E+01 | −4.1140E+01 | −2.4760E+01 |
| A4 = | 1.4863E−02 | 7.3739E−02 | 1.4606E−01 | −4.6721E−03 | −7.3756E−02 |
| A6 = | −4.1448E−02 | −5.2504E−02 | −6.6229E−02 | 2.8891E−02 | 6.0096E−02 |
| A8 = | 2.4269E−02 | −1.1048E−01 | −1.3132E−01 | −7.2926E−02 | −6.1936E−02 |
| A10 = | −1.6405E−02 | 1.2973E−01 | 1.6310E−01 | 8.1012E−02 | 5.6112E−02 |
| A12 = | 9.2486E−03 | −7.2776E−02 | −8.5846E−02 | −4.5100E−02 | −2.8133E−02 |
| A14 = | −2.9626E−03 | 2.1744E−02 | 2.3013E−02 | 1.2573E−02 | 7.0181E−03 |
| A16 = | 3.6827E−04 | −2.6333E−03 | −2.5294E−03 | −1.4021E−03 | −6.9344E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 12.02 | (R3 + R4)/(R3 − R4) | −0.35 |
| Fno | 2.69 | (R7 + R8)/(R7 − R8) | 1.53 |
| HFOV [deg.] | 12.3 | |f2/f1| | 1.22 |
| V5 | 20.4 | (f/f1) − (f/f2) | 4.31 |
| V2 + V5 | 43.7 | |f/f4| + |f/f5| | 2.60 |

-continued

| 8th Embodiment | | | |
|---|---|---|---|
| T23/T12 | 2.46 | tan(HFOV) | 0.22 |
| T23/T45 | 3.24 | Y11/Y52 | 1.59 |
| (T23/T12) + (T34/T45) | 10.41 | Yc21/CT5 | 2.33 |
| (T23 + T34)/CT1 | 0.40 | Dsr3/Dsr4 | 0.17 |
| CT2/CT5 | 0.99 | SD/TD | 0.56 |
| CT3/CT5 | 1.38 | BL/TD | 1.00 |
| (CT2 + CT3 + CT4 + CT5)/CT1 | 0.80 | TL/f | 0.93 |
| f/R8 | 3.24 | TL/ImgH | 4.21 |
| |f/R5| + |f/R6| | 2.76 | — | |

9th Embodiment

Figure 17:
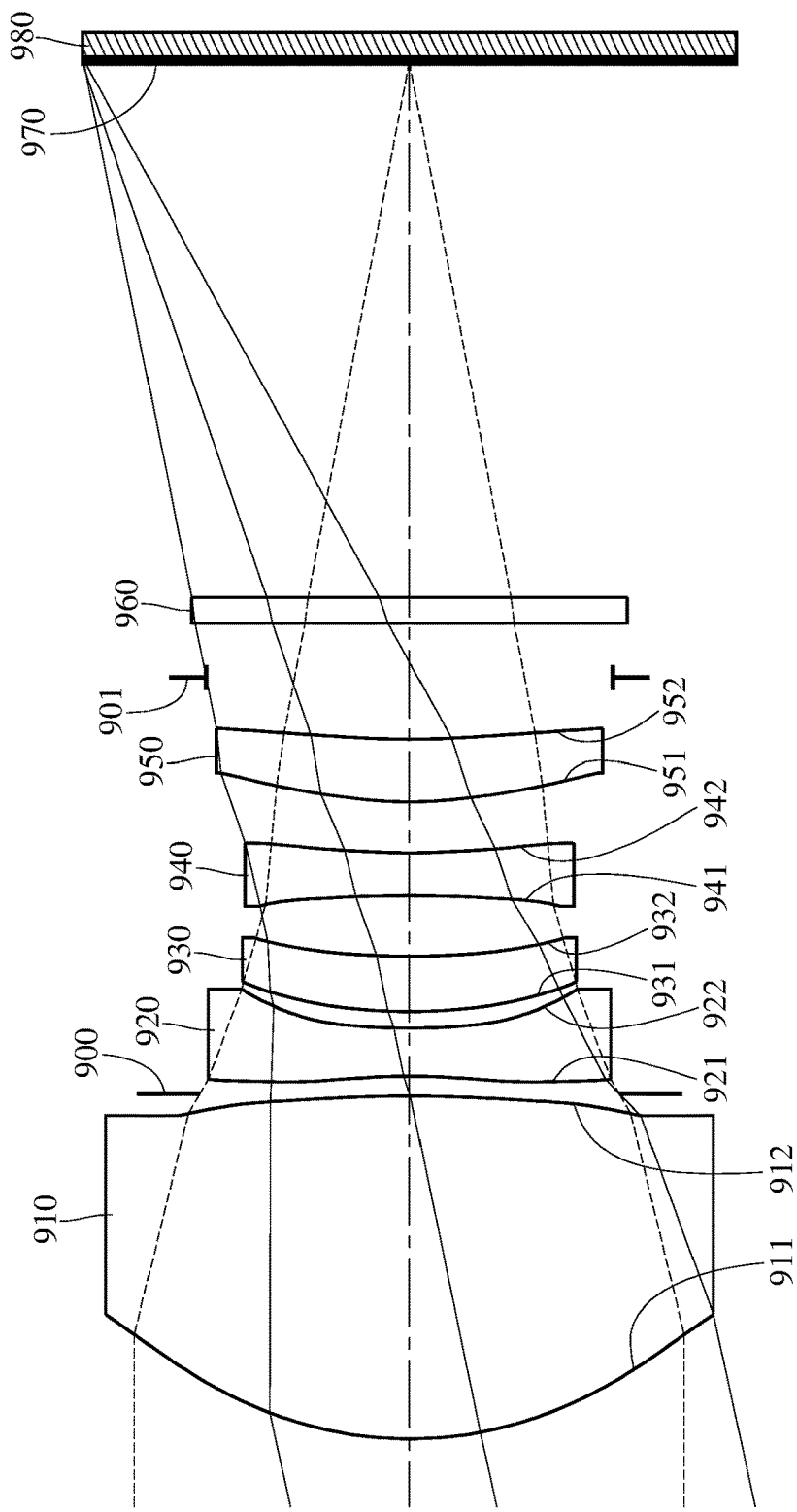
FIG. 17 is a schematic view of an image capturing unit according to the 9th embodiment of the present disclosure.
Figure 18:
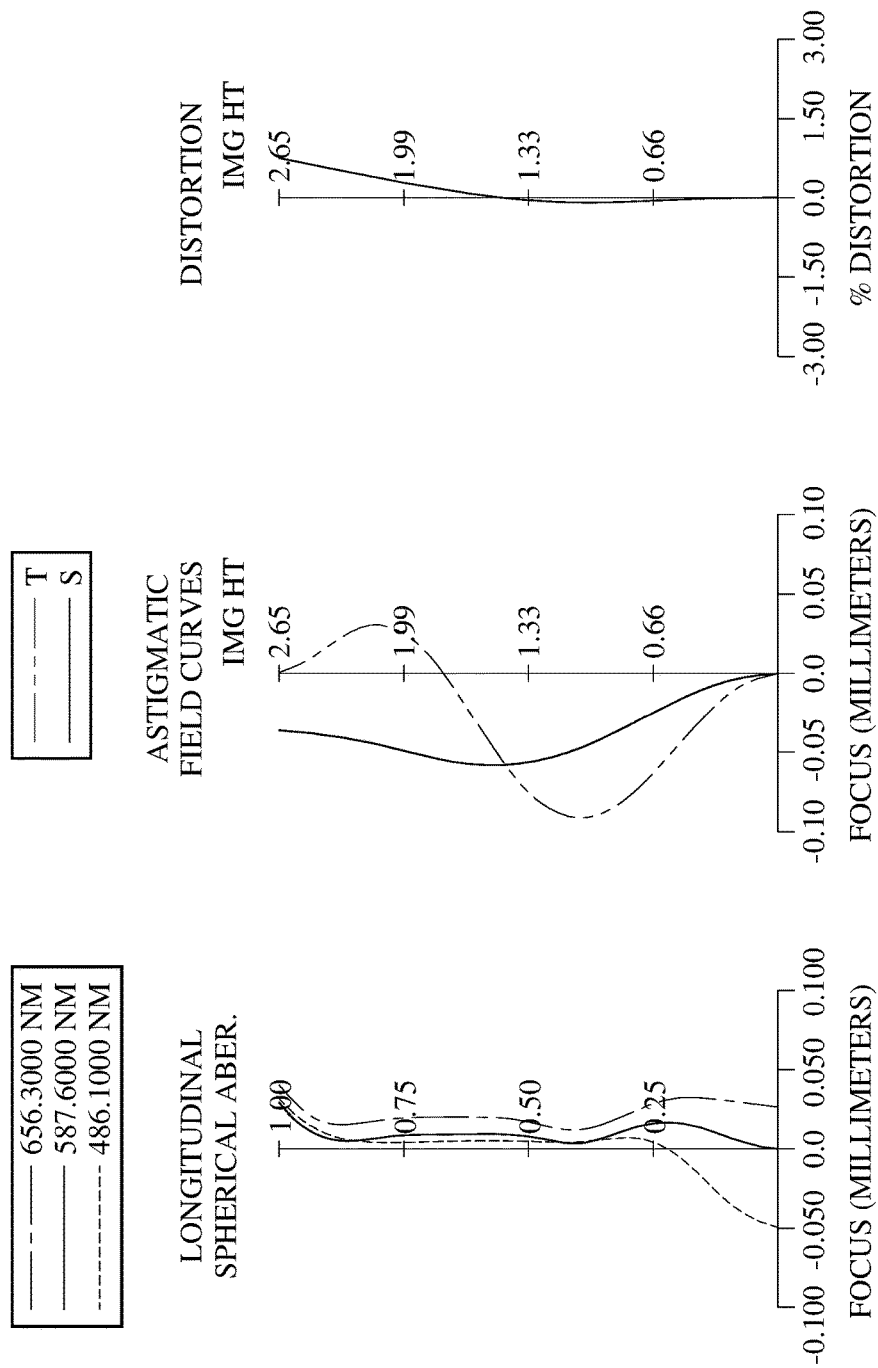
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the image capturing lens system (its reference numeral is omitted) of the present disclosure and an image sensor 980. The image capturing lens system includes, in order from an object side to an image side, a first lens element 910, an aperture stop 900, a second lens element 920, a third lens element 930, a fourth lens element 940, a fifth lens element 950, a stop 901, a filter 960 and an image surface 970. The image capturing lens system includes five single and non-cemented lens elements (910, 920, 930, 940 and 950) with no additional lens element disposed between the first lens element 910 and the fifth lens element 950, wherein there is an air gap in a paraxial region between each adjacent lens element.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with negative refractive power has an object-side surface 941 being concave in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has two inflection points. The image-side surface 942 of the fourth lens element 940 has one inflection point.

The fifth lens element 950 with positive refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The object-side surface 951 of the fifth lens element 950 has one inflection point. The image-side surface 952 of the fifth lens element 950 has three inflection points.

The filter 960 is made of glass material and located between the fifth lens element 950 and the image surface 970, and will not affect the focal length of the image capturing lens system. The image sensor 980 is disposed on or near the image surface 970 of the image capturing lens system.

The detailed optical data of the 9th embodiment are shown in Table 17 and the aspheric surface data are shown in Table 18 below.

TABLE 17

9th Embodiment
f = 12.01 mm, Fno = 2.69, HFOV = 12.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.088 | (ASP) | 2.787 | Plastic | 1.545 | 56.0 | 4.91 |
| 2 | | −13.611 | (ASP) | 0.020 | | | | |
| 3 | Ape. Stop | Plano | | 0.142 | | | | |
| 4 | Lens 2 | −5.281 | (ASP) | 0.388 | Plastic | 1.639 | 23.3 | −4.90 |
| 5 | | 7.901 | (ASP) | 0.134 | | | | |
| 6 | Lens 3 | 4.784 | (ASP) | 0.451 | Plastic | 1.544 | 56.0 | 32.20 |
| 7 | | 6.363 | (ASP) | 0.491 | | | | |
| 8 | Lens 4 | −41.154 | (ASP) | 0.350 | Plastic | 1.544 | 56.0 | −6.98 |
| 9 | | 4.194 | (ASP) | 0.415 | | | | |
| 10 | Lens 5 | 3.044 | (ASP) | 0.506 | Plastic | 1.660 | 20.4 | 8.41 |
| 11 | | 6.297 | (ASP) | 0.501 | | | | |
| 12 | Stop | Plano | | 0.443 | | | | |
| 13 | IR-filter | Plano | | 0.210 | Glass | 1.517 | 64.2 | — |
| 14 | | Plano | | 4.329 | | | | |
| 15 | Image | Plano | | — | | | | |

Note:
Reference wavelength is 587.6 nm (d-line).
An effective radius of the stop 901 (Surface 12) is 1.653 mm.

TABLE 18

Aspheric Coefficients

| Surface # | 1 | 2 | 4 | 5 | 6 |
|---|---|---|---|---|---|
| k = | −1.9631E−01 | 2.4276E+01 | −4.8192E+01 | 2.5761E+01 | 8.5475E+00 |
| A4 = | −2.1080E−03 | −4.8908E−02 | −2.3973E−02 | 1.4715E−01 | 8.1353E−02 |
| A6 = | 1.2796E−03 | 1.0424E−01 | 1.1157E−01 | −3.8678E−01 | −4.4011E−01 |
| A8 = | −7.8379E−04 | −8.4639E−02 | −8.5009E−02 | 7.5848E−01 | 9.5465E−01 |
| A10 = | 2.3389E−04 | 3.5185E−02 | 2.3782E−02 | −7.6490E−01 | −1.0261E+00 |

TABLE 18-continued

| Aspheric Coefficients | | | | | |
|---|---|---|---|---|---|
| A12 = | −4.0508E−05 | −8.1139E−03 | −2.1216E−04 | 4.0631E−01 | 5.7965E−01 |
| A14 = | 3.2449E−06 | 9.9552E−04 | −1.0584E−03 | −1.0981E−01 | −1.6583E−01 |
| A16 = | −9.5691E−08 | −5.0952E−05 | 1.4245E−04 | 1.1993E−02 | 1.8990E−02 |
| Surface # | 7 | 8 | 9 | 10 | 11 |
| k = | 1.8668E+01 | 3.6503E+01 | −9.9000E+01 | −1.8572E+01 | −3.6560E+00 |
| A4 = | −5.4431E−02 | −2.5223E−01 | −1.8854E−01 | −6.8027E−02 | −6.7956E−02 |
| A6 = | 5.9959E−02 | 7.1721E−01 | 6.4059E−01 | 1.8202E−01 | 1.0103E−01 |
| A8 = | 1.6415E−01 | −9.6372E−01 | −9.6017E−01 | −2.4060E−01 | −1.2335E−01 |
| A10 = | −3.9746E−01 | 6.8611E−01 | 7.9414E−01 | 1.8266E−01 | 9.3423E−02 |
| A12 = | 3.2123E−01 | −2.6629E−01 | −3.7614E−01 | −7.8682E−02 | −4.0380E−02 |
| A14 = | −1.1418E−01 | 5.1417E−02 | 9.4925E−02 | 1.7836E−02 | 9.1829E−03 |
| A16 = | 1.4912E−02 | −3.8397E−03 | −9.9040E−03 | −1.6583E−03 | −8.5745E−04 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 12.01 | (R3 + R4)/(R3 − R4) | −0.20 |
| Fno | 2.69 | (R7 + R8)/(R7 − R8) | 0.82 |
| HFOV [deg.] | 12.3 | |f2/f1| | 1.00 |
| V5 | 20.4 | (f/f1) − (f/f2) | 4.90 |
| V2 + V5 | 43.7 | |f/f4| + |f/f5| | 3.15 |
| T23/T12 | 0.83 | tan(HFOV) | 0.22 |
| T23/T45 | 0.32 | Y11/Y52 | 1.57 |
| (T23/T12) + (T34/T45) | 2.01 | Yc21/CT5 | 1.97 |
| (T23 + T34)/CT1 | 0.22 | Dsr3/Dsr4 | 0.27 |
| CT2/CT5 | 0.77 | SD/TD | 0.51 |
| CT3/CT5 | 0.89 | BL/TD | 0.96 |
| (CT2 + CT3 + CT4 + CT5)/CT1 | 0.61 | TL/f | 0.93 |
| f/R8 | 2.86 | TL/ImgH | 4.21 |
| |f/R5| + |f/R6| | 4.40 | — | — |

10th Embodiment

Figure 19:
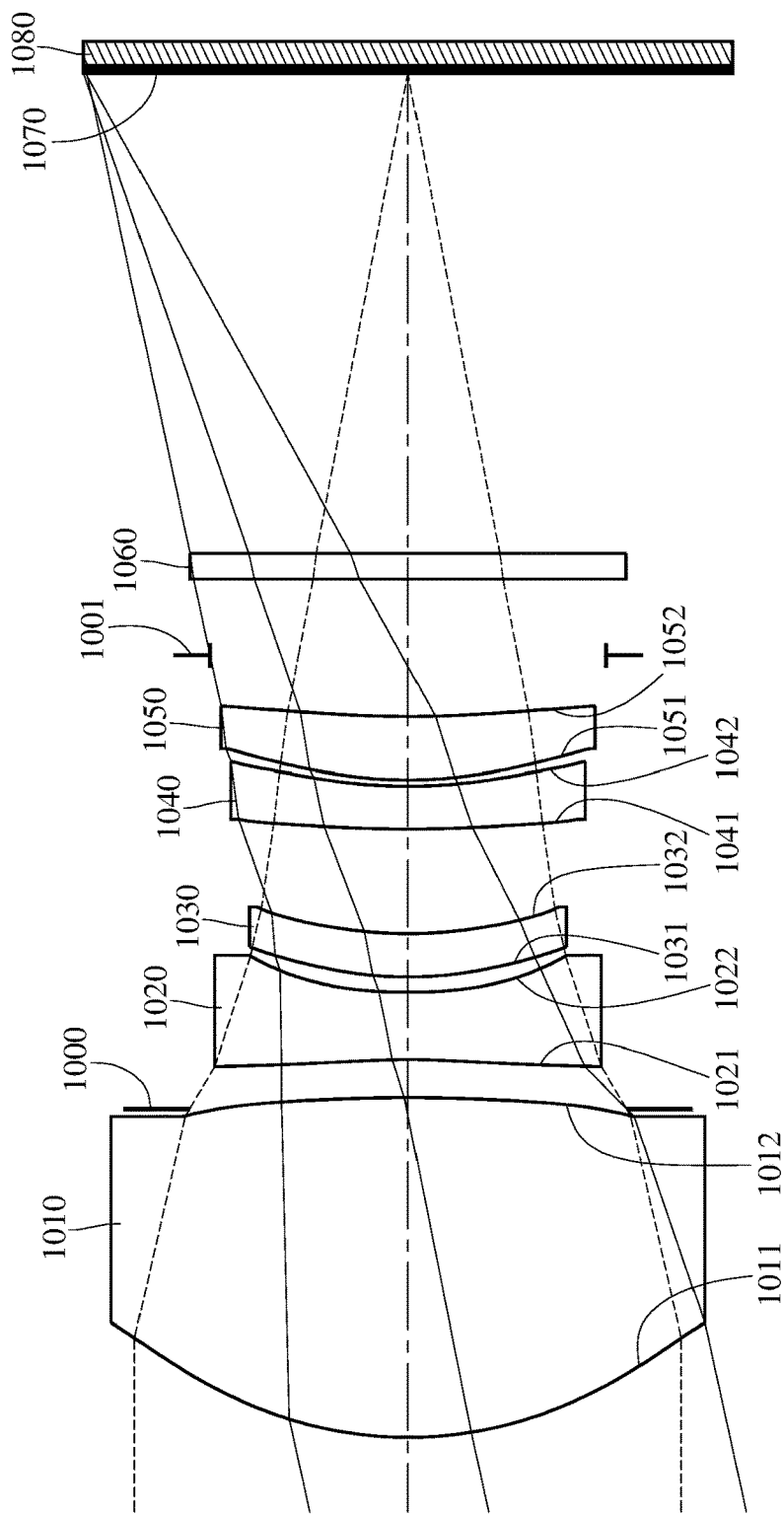
FIG. 19 is a schematic view of an image capturing unit according to the 10th embodiment of the present disclosure.
Figure 20:
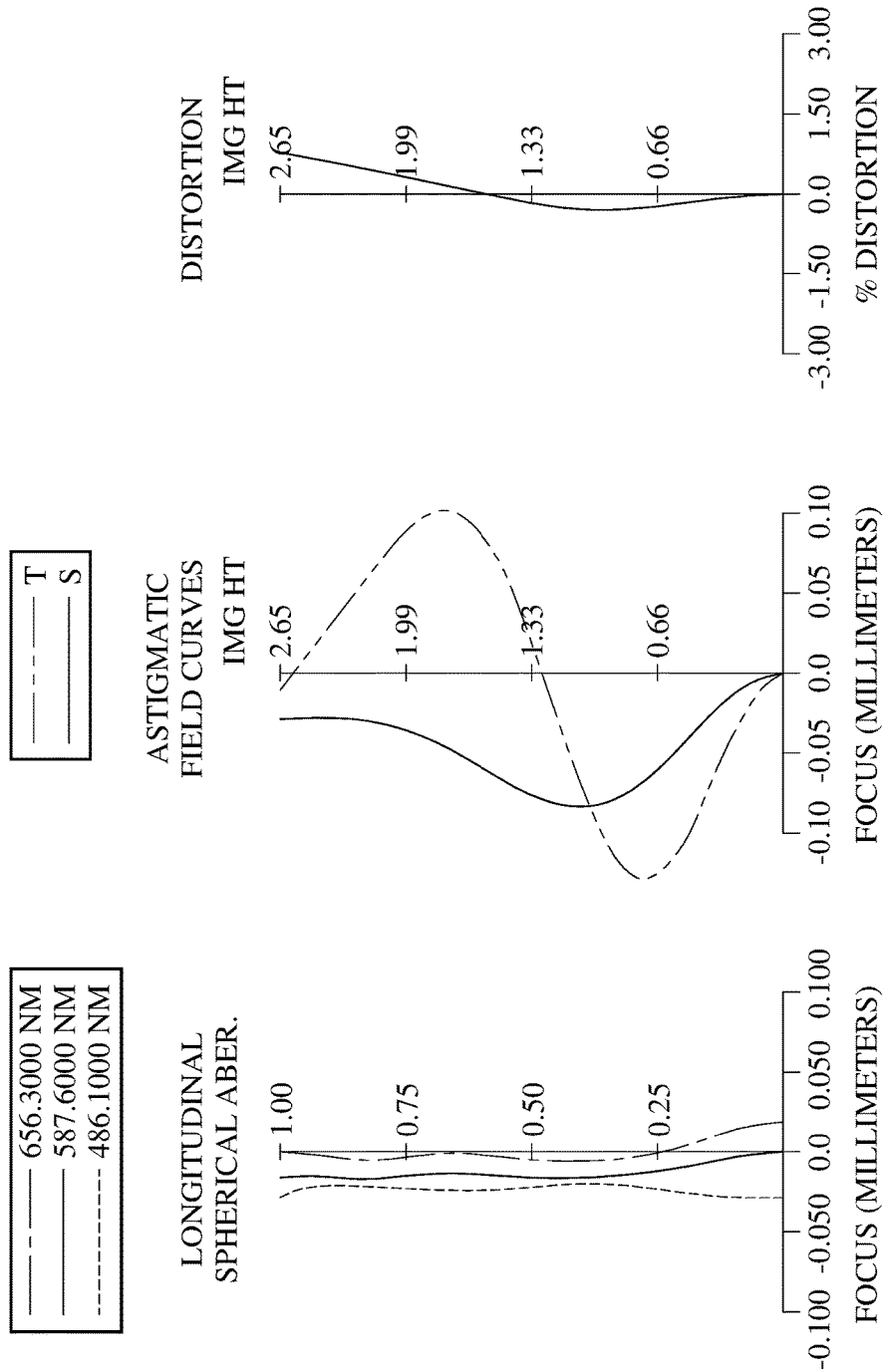
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the image capturing lens system (its reference numeral is omitted) of the present disclosure and an image sensor 1080. The image capturing lens system includes, in order from an object side to an image side, a first lens element 1010, an aperture stop 1000, a second lens element 1020, a third lens element 1030, a fourth lens element 1040, a fifth lens element 1050, a stop 1001, a filter 1060 and an image surface 1070. The image capturing lens system includes five single and non-cemented lens elements (1010, 1020, 1030, 1040 and 1050) with no additional lens element disposed between the first lens element 1010 and the fifth lens element 1050, wherein there is an air gap in a paraxial region between each adjacent lens element.

The first lens element 1010 with positive refractive power has an object-side surface 1011 being convex in a paraxial region thereof and an image-side surface 1012 being convex in a paraxial region thereof. The first lens element 1010 is made of plastic material and has the object-side surface 1011 and the image-side surface 1012 being both aspheric.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has two inflection points. The image-side surface 1042 of the fourth lens element 1040 has three inflection points.

The fifth lens element 1050 with positive refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The object-side surface 1051 of the fifth lens element 1050 has one inflection point. The image-side surface 1052 of the fifth lens element 1050 has one inflection point.

The filter 1060 is made of glass material and located between the fifth lens element 1050 and the image surface 1070, and will not affect the focal length of the image capturing lens system. The image sensor 1080 is disposed on or near the image surface 1070 of the image capturing lens system.

The detailed optical data of the 10th embodiment are shown in Table 19 and the aspheric surface data are shown in Table 20 below.

TABLE 19

10th embodiment
f = 12.02 mm, Fno = 2.69, HFOV = 12.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.201 | (ASP) | 2.779 | Plastic | 1.545 | 56.0 | 4.91 |
| 2 | | −11.286 | (ASP) | −0.094 | | | | |
| 3 | Ape. Stop | Plano | | 0.406 | | | | |
| 4 | Lens 2 | −5.181 | (ASP) | 0.546 | Plastic | 1.639 | 23.3 | −4.18 |
| 5 | | 5.746 | (ASP) | 0.127 | | | | |
| 6 | Lens 3 | 3.714 | (ASP) | 0.355 | Plastic | 1.544 | 56.0 | 219.12 |
| 7 | | 3.704 | (ASP) | 0.856 | | | | |
| 8 | Lens 4 | 11.584 | (ASP) | 0.350 | Plastic | 1.544 | 56.0 | −11.61 |
| 9 | | 4.045 | (ASP) | 0.050 | | | | |
| 10 | Lens 5 | 3.280 | (ASP) | 0.518 | Plastic | 1.660 | 20.4 | 8.15 |
| 11 | | 7.880 | (ASP) | 0.501 | | | | |
| 12 | Stop | Plano | | 0.625 | | | | |
| 13 | IR-filter | Plano | | 0.210 | Glass | 1.517 | 64.2 | — |
| 14 | | Plano | | 3.925 | | | | |
| 15 | Image | Plano | | — | | | | |

Note:
Reference wavelength is 587.6 nm (d-line).
An effective radius of the stop 1001 (Surface 12) is 1.619 mm.

TABLE 20

Aspheric Coefficients

| Surface # | 1 | 2 | 4 | 5 | 6 |
|---|---|---|---|---|---|
| k = | −1.8130E−01 | 1.5392E+01 | −3.5754E+01 | 1.2164E+01 | 3.8422E+00 |
| A4 = | −2.3867E−03 | 3.1567E−02 | 1.0538E−01 | 2.2118E−01 | 1.3176E−01 |
| A6 = | 2.0484E−03 | −3.1388E−02 | −1.4999E−01 | −3.4195E−01 | −2.9368E−01 |
| A8 = | −1.4140E−03 | 1.8302E−02 | 1.3466E−01 | 1.9975E−01 | 1.2595E−01 |
| A10 = | 4.9329E−04 | −7.1343E−03 | −7.5189E−02 | 1.0446E−01 | 2.1841E−01 |
| A12 = | −9.9942E−05 | 1.6891E−03 | 2.4822E−02 | −2.0247E−01 | −2.9513E−01 |
| A14 = | 1.0550E−05 | −2.1334E−04 | −4.3855E−03 | 9.7864E−02 | 1.3432E−01 |
| A16 = | −4.7026E−07 | 1.0766E−05 | 3.1758E−04 | −1.6066E−02 | −2.1632E−02 |

| Surface # | 7 | 8 | 9 | 10 | 11 |
|---|---|---|---|---|---|
| k = | 4.7569E+00 | 5.0690E+01 | −9.9000E+01 | −1.0695E+01 | 1.1094E+01 |
| A4 = | 6.3969E−03 | 6.0327E−03 | 1.1967E−01 | −8.8665E−03 | −2.3080E−02 |
| A6 = | −6.9677E−02 | −2.2023E−02 | −2.1124E−01 | −6.7117E−03 | −8.1652E−03 |
| A8 = | 1.6208E−01 | 1.5812E−02 | 3.1214E−01 | 7.3613E−02 | 2.5926E−02 |
| A10 = | 1.0956E−01 | −1.7281E−02 | −3.1057E−01 | −1.0490E−01 | −2.2684E−02 |
| A12 = | −1.3726E−01 | 1.3330E−02 | 1.7498E−01 | 6.4105E−02 | 9.5249E−03 |
| A14 = | 6.5935E−02 | −4.3317E−03 | −5.0071E−02 | −1.8042E−02 | −1.7772E−03 |
| A16 = | −1.1542E−02 | 4.8393E−04 | 5.6626E−03 | 1.8883E−03 | 8.6478E−05 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 12.02 | (R3 + R4)/(R3 − R4) | −0.05 |
| Fno | 2.69 | (R7 + R8)/(R7 − R8) | 2.07 |
| HFOV [deg.] | 12.4 | \|f2/f1\| | 0.85 |
| V5 | 20.4 | (f/f1) − (f/f2) | 5.32 |
| V2 + V5 | 43.7 | \|f/f4\| + \|f/f5\| | 2.51 |

-continued

| 10th Embodiment | | | |
|---|---|---|---|
| T23/T12 | 0.41 | tan(HFOV) | 0.22 |
| T23/T45 | 2.54 | Y11/Y52 | 1.58 |
| (T23/T12) + (T34/T45) | 17.53 | Yc21/CT5 | — |
| (T23 + T34)/CT1 | 0.35 | Dsr3/Dsr4 | 0.43 |
| CT2/CT5 | 1.05 | SD/TD | 0.54 |
| CT3/CT5 | 0.69 | BL/TD | 0.89 |
| (CT2 + CT3 + CT4 + CT5)/CT1 | 0.64 | TL/f | 0.93 |
| f/R8 | 2.97 | TL/Img H | 4.21 |
| \|f/R5\| + \|f/R6\| | 6.48 | — | |

11th Embodiment

Figure 21:
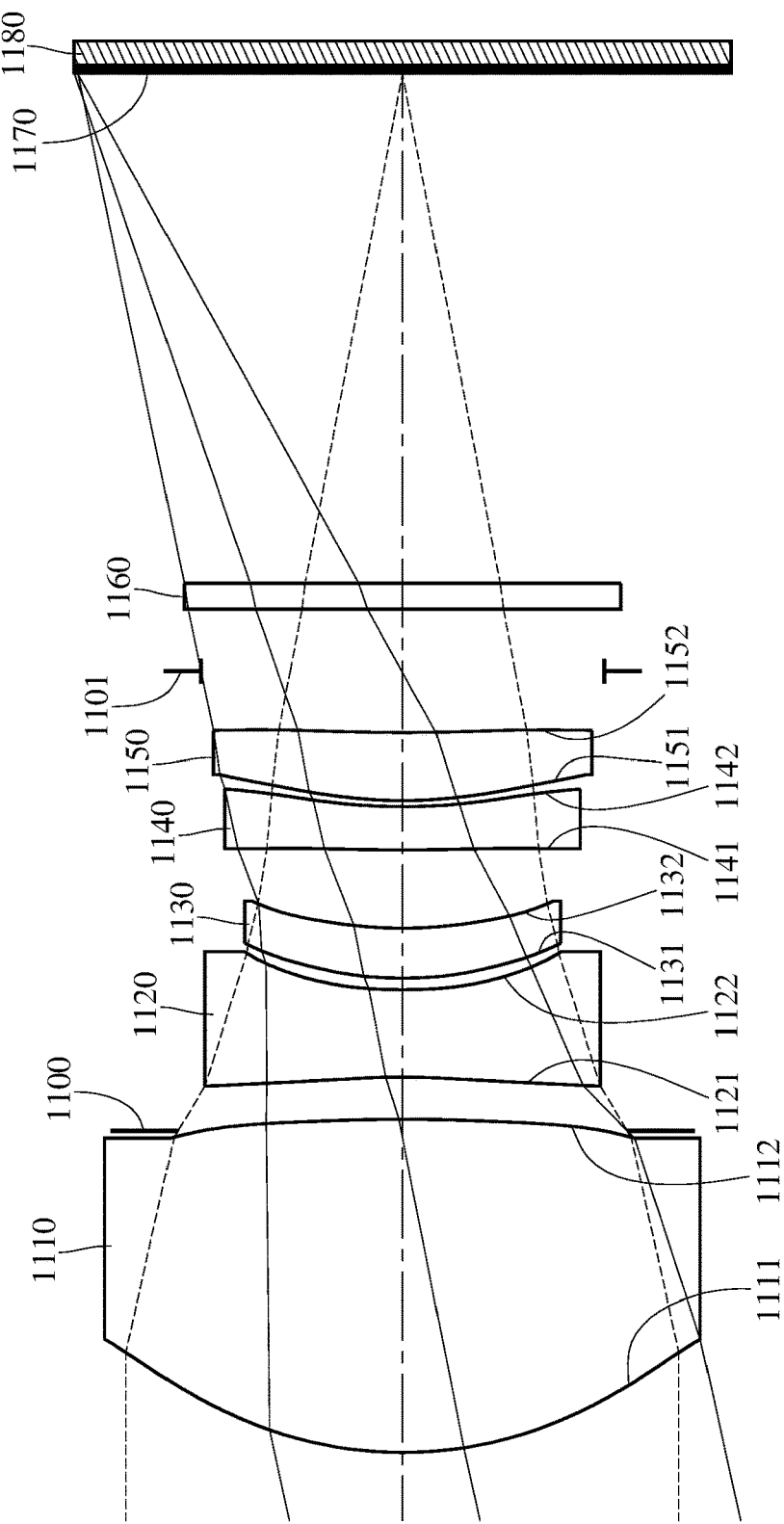
FIG. 21 is a schematic view of an image capturing unit according to the 11th embodiment of the present disclosure.
Figure 22:
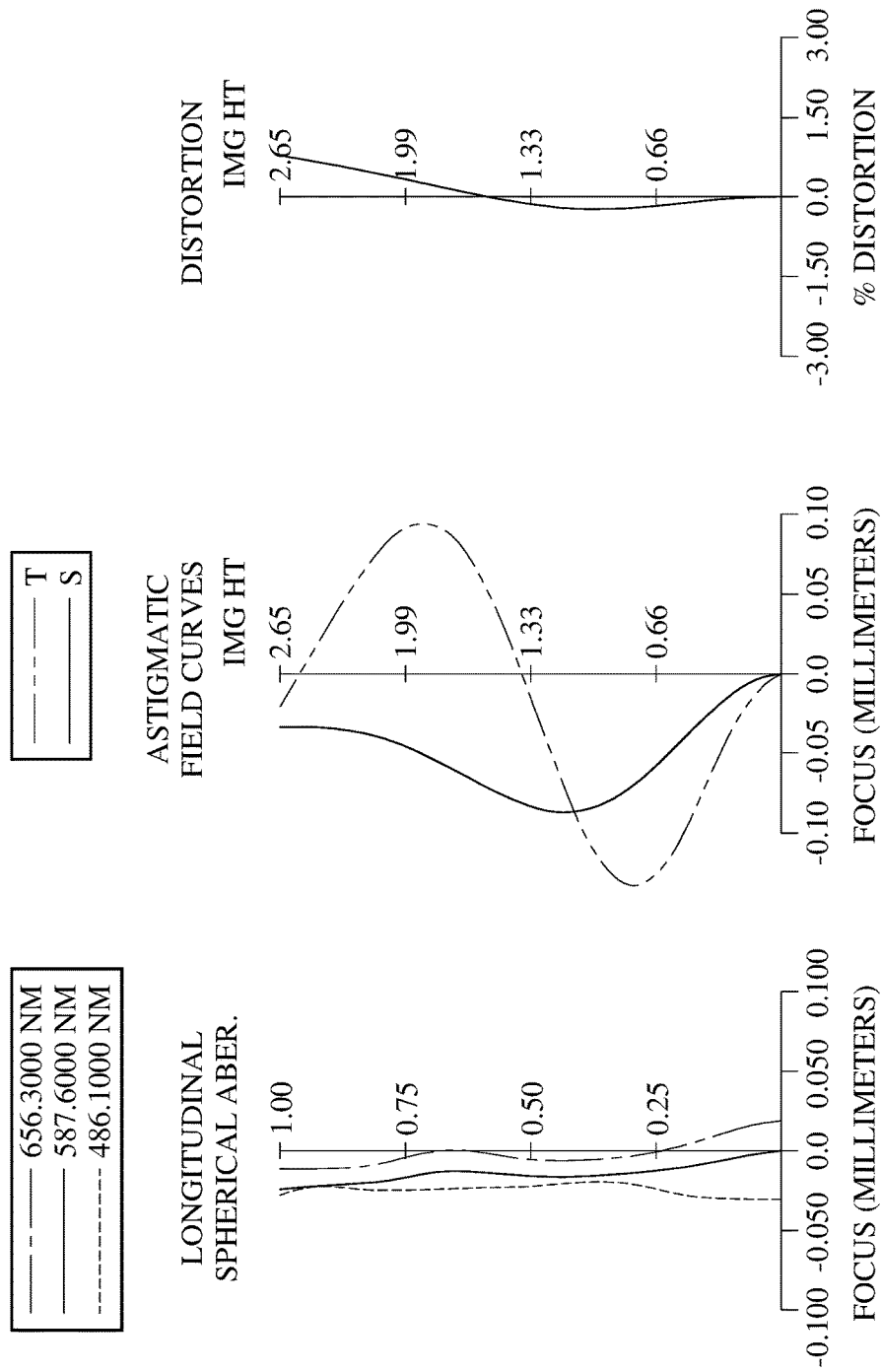
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the image capturing lens system (its reference numeral is omitted) of the present disclosure and an image sensor 1180. The image capturing lens system includes, in order from an object side to an image side, a first lens element 1110, an aperture stop 1100, a second lens element 1120, a third lens element 1130, a fourth lens element 1140, a fifth lens element 1150, a stop 1101, a filter 1160 and an image surface 1170. The image capturing lens system includes five single and non-cemented lens elements (1110, 1120, 1130, 1140 and 1150) with no additional lens element disposed between the first lens element 1110 and the fifth lens element 1150, wherein there is an air gap in a paraxial region between each adjacent lens element.

The first lens element 1110 with positive refractive power has an object-side surface 1111 being convex in a paraxial region thereof and an image-side surface 1112 being convex in a paraxial region thereof. The first lens element 1110 is made of plastic material and has the object-side surface 1111 and the image-side surface 1112 being both aspheric.

The second lens element 1120 with negative refractive power has an object-side surface 1121 being concave in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with negative refractive power has an object-side surface 1141 being convex in a paraxial region thereof and an image-side surface 1142 being concave in a paraxial region thereof. The fourth lens element 1140 is made of plastic material and has the object-side surface 1141 and the image-side surface 1142 being both aspheric. The object-side surface 1141 of the fourth lens element 1140 has two inflection points. The image-side surface 1142 of the fourth lens element 1140 has one inflection point.

The fifth lens element 1150 with positive refractive power has an object-side surface 1151 being convex in a paraxial region thereof and an image-side surface 1152 being concave in a paraxial region thereof. The fifth lens element 1150 is made of plastic material and has the object-side surface 1151 and the image-side surface 1152 being both aspheric. The object-side surface 1151 of the fifth lens element 1150 has three inflection points. The image-side surface 1152 of the fifth lens element 1150 has one inflection point and one critical point.

The filter 1160 is made of glass material and located between the fifth lens element 1150 and the image surface 1170, and will not affect the focal length of the image capturing lens system. The image sensor 1180 is disposed on or near the image surface 1170 of the image capturing lens system.

The detailed optical data of the 11th embodiment are shown in Table 21 and the aspheric surface data are shown in Table 22 below.

TABLE 21

11th embodiment
f = 12.01 mm, Fno = 2.69, HFOV = 12.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.191 | (ASP) | 2.695 | Plastic | 1.545 | 56.0 | 4.95 |
| 2 | | −12.183 | (ASP) | −0.095 | | | | |
| 3 | Ape. Stop | Plano | | 0.435 | | | | |
| 4 | Lens 2 | −5.279 | (ASP) | 0.705 | Plastic | 1.639 | 23.3 | −4.01 |
| 5 | | 5.235 | (ASP) | 0.092 | | | | |
| 6 | Lens 3 | 3.395 | (ASP) | 0.405 | Plastic | 1.544 | 56.0 | 59.98 |
| 7 | | 3.630 | (ASP) | 0.634 | | | | |
| 8 | Lens 4 | 15.871 | (ASP) | 0.350 | Plastic | 1.544 | 56.0 | −10.15 |
| 9 | | 4.064 | (ASP) | 0.050 | | | | |
| 10 | Lens 5 | 3.649 | (ASP) | 0.545 | Plastic | 1.660 | 20.4 | 7.51 |
| 11 | | 13.031 | (ASP) | 0.499 | | | | |
| 12 | Stop | Plano | | 0.500 | | | | |
| 13 | IR-filter | Plano | | 0.210 | Glass | 1.517 | 64.2 | — |
| 14 | | Plano | | 4.122 | | | | |
| 15 | Image | Plano | | — | | | | |

Note:
Reference wavelength is 587.6 nm (d-line).
An effective radius of the stop 1101 (Surface 12) is 1.630 mm.

TABLE 22

| | Aspheric Coefficients | | | | |
|---|---|---|---|---|---|
| Surface # | 1 | 2 | 4 | 5 | 6 |
| k = | −1.9599E−01 | 1.7468E+01 | −3.0780E+01 | 1.0783E+01 | 3.7985E+00 |
| A4 = | −2.6802E−03 | 2.7225E−02 | 8.1656E−02 | 2.0891E−01 | 1.3316E−01 |
| A6 = | 2.5687E−03 | −1.9850E−02 | −9.4165E−02 | −3.2159E−01 | −2.9248E−01 |
| A8 = | −1.7762E−03 | 7.7616E−03 | 7.2158E−02 | 1.8200E−01 | 1.2596E−01 |

TABLE 22-continued

| Aspheric Coefficients | | | | | |
|---|---|---|---|---|---|
| A10 = | 6.3572E−04 | −2.2047E−03 | −3.6594E−02 | 1.0569E−01 | 2.1795E−01 |
| A12 = | −1.3185E−04 | 3.8167E−04 | 1.1255E−02 | −1.9606E−01 | −2.9513E−01 |
| A14 = | 1.4273E−05 | −2.7327E−05 | −1.8460E−03 | 9.4506E−02 | 1.3432E−01 |
| A16 = | −6.5183E−07 | −2.1807E−07 | 1.2166E−04 | −1.5470E−02 | −2.1632E−02 |
| Surface # | 7 | 8 | 9 | 10 | 11 |
| k = | 4.8309E+00 | −2.3229E+01 | −9.9000E+01 | −1.2420E+01 | 1.2765E+01 |
| A4 = | −2.0964E−02 | −2.5060E−02 | 1.0126E−01 | −8.3408E−04 | −1.6554E−02 |
| A6 = | 1.3009E−03 | 1.6788E−02 | −2.3031E−01 | −5.4117E−02 | −1.5910E−02 |
| A8 = | −8.9680E−02 | −1.7816E−02 | 3.8674E−01 | 1.5845E−01 | 2.9718E−02 |
| A10 = | 2.2193E−01 | 7.7995E−03 | −3.9845E−01 | −1.8646E−01 | −2.1882E−02 |
| A12 = | −2.1163E−01 | −1.8301E−03 | 2.2421E−01 | 1.0641E−01 | 7.5676E−03 |
| A14 = | 9.2997E−02 | 1.6261E−03 | −6.3451E−02 | −2.9226E−02 | −9.2294E−04 |
| A16 = | −1.5774E−02 | −5.2514E−04 | 7.0542E−03 | 3.0774E−03 | −2.8623E−05 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 12.01 | (R3 + R4)/(R3 − R4) | 0.0042 |
| Fno | 2.69 | (R7 + R8)/(R7 − R8) | 1.69 |
| HFOV [deg.] | 12.4 | |f2/f1| | 0.81 |
| V5 | 20.4 | (f/f1) − (f/f2) | 5.42 |
| V2 + V5 | 43.7 | |f/f4| + |f/f5| | 2.78 |
| T23/T12 | 0.27 | tan(HFOV) | 0.22 |
| T23/T45 | 1.84 | Y11/Y52 | 1.57 |
| (T23/T12) + (T34/T45) | 12.95 | Yc21/CT5 | — |
| (T23 + T34)/CT1 | 0.27 | Dsr3/Dsr4 | 0.38 |
| CT2/CT5 | 1.29 | SD/TD | 0.55 |
| CT3/CT5 | 0.74 | BL/TD | 0.92 |
| (CT2 + CT3 + CT4 + CT5)/CT1 | 0.74 | TL/f | 0.93 |
| f/R8 | 2.96 | TL/ImgH | 4.20 |
| |f/R5| + |f/R6| | 6.85 | — | — |

12th Embodiment

Figure 23:
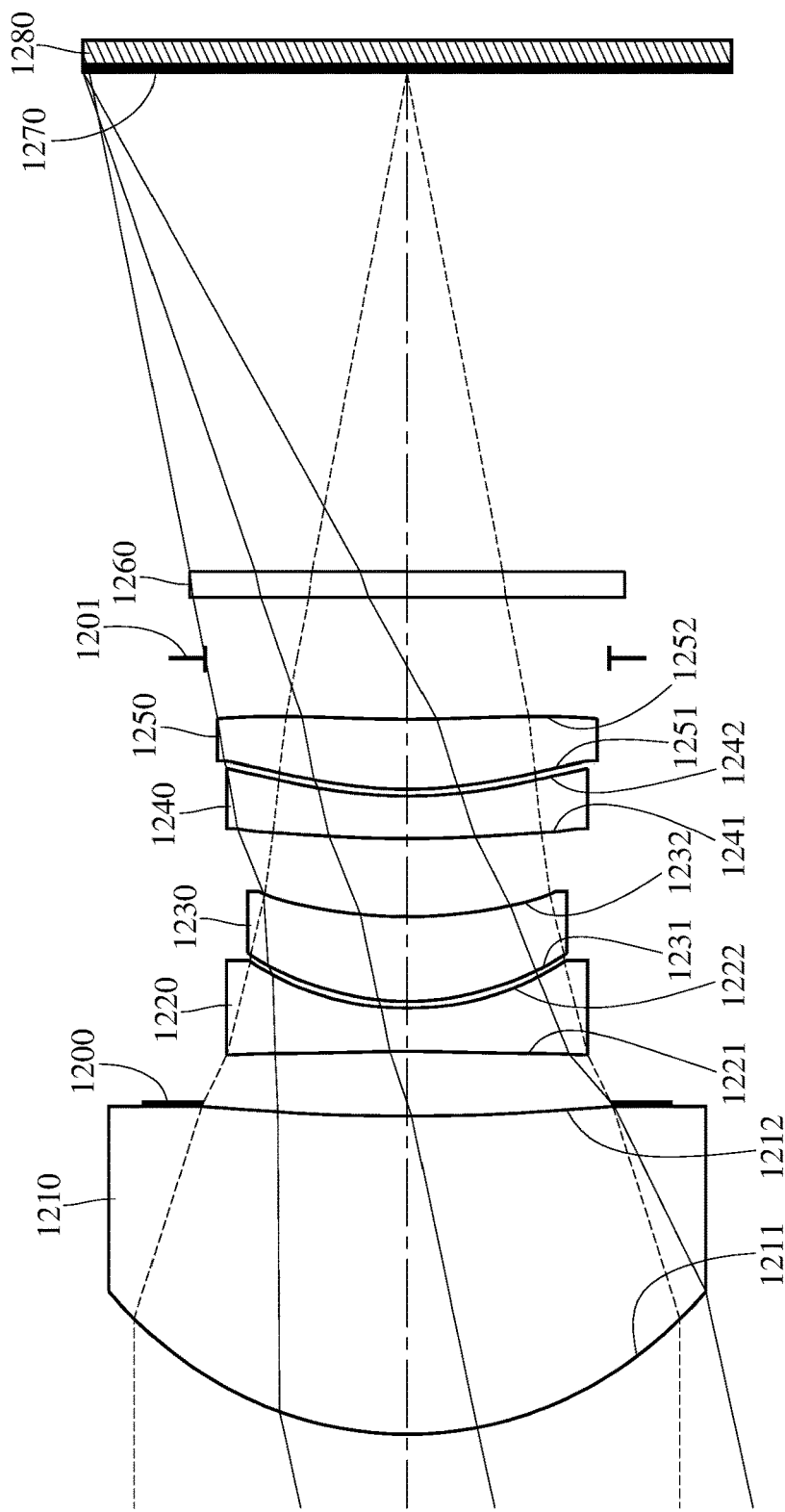
FIG. 23 is a schematic view of an image capturing unit according to the 12th embodiment of the present disclosure.
Figure 24:
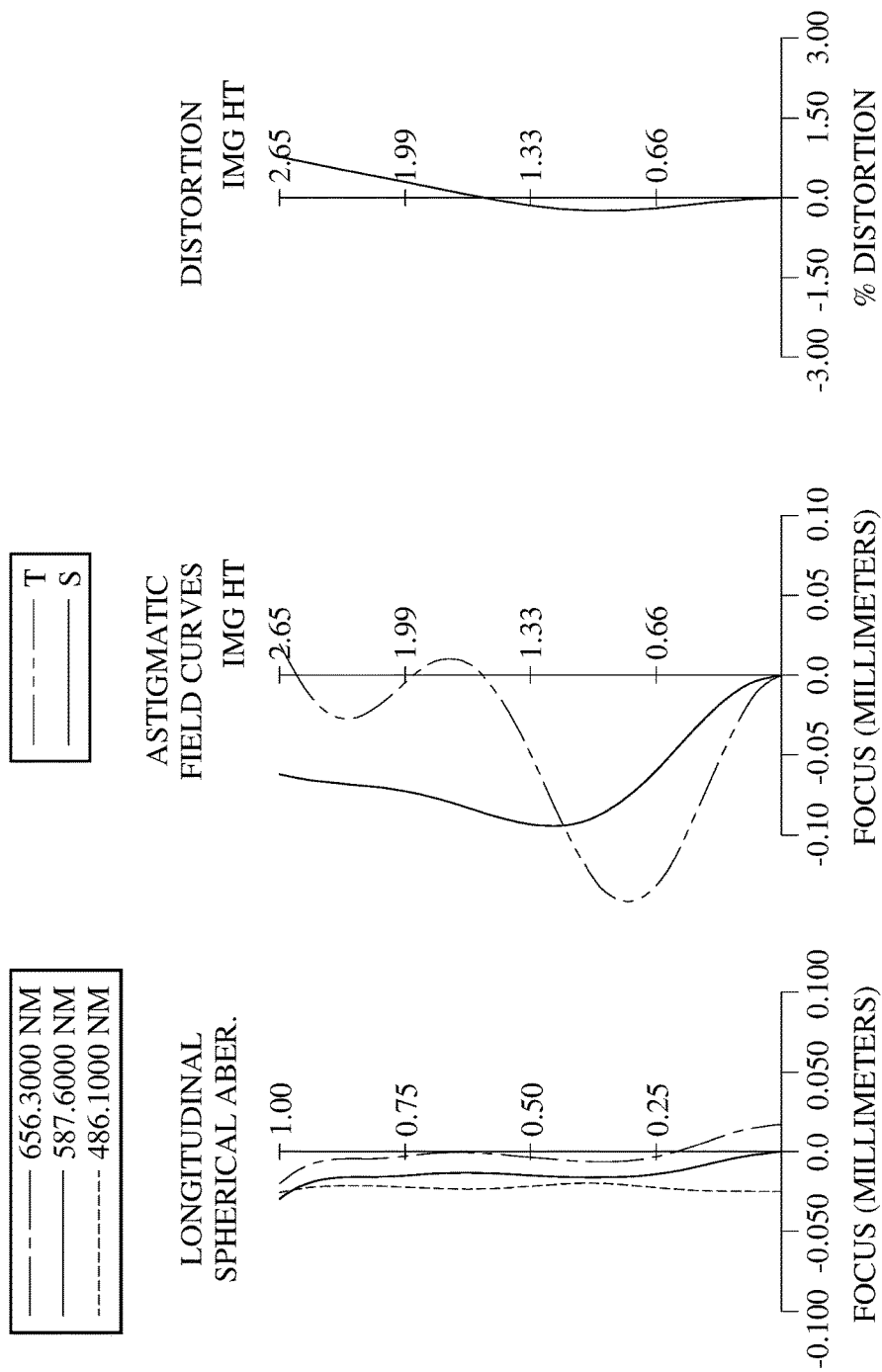
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the image capturing lens system (its reference numeral is omitted) of the present disclosure and an image sensor 1280. The image capturing lens system includes, in order from an object side to an image side, a first lens element 1210, an aperture stop 1200, a second lens element 1220, a third lens element 1230, a fourth lens element 1240, a fifth lens element 1250, a stop 1201, a filter 1260 and an image surface 1270. The image capturing lens system includes five single and non-cemented lens elements (1210, 1220, 1230, 1240 and 1250) with no additional lens element disposed between the first lens element 1210 and the fifth lens element 1250, wherein there is an air gap in a paraxial region between each adjacent lens element.

The first lens element 1210 with positive refractive power has an object-side surface 1211 being convex in a paraxial region thereof and an image-side surface 1212 being concave in a paraxial region thereof. The first lens element 1210 is made of plastic material and has the object-side surface 1211 and the image-side surface 1212 being both aspheric.

The second lens element 1220 with negative refractive power has an object-side surface 1221 being concave in a paraxial region thereof and an image-side surface 1222 being concave in a paraxial region thereof. The second lens element 1220 is made of plastic material and has the object-side surface 1221 and the image-side surface 1222 being both aspheric.

The third lens element 1230 with positive refractive power has an object-side surface 1231 being convex in a paraxial region thereof and an image-side surface 1232 being concave in a paraxial region thereof. The third lens element 1230 is made of plastic material and has the object-side surface 1231 and the image-side surface 1232 being both aspheric.

The fourth lens element 1240 with negative refractive power has an object-side surface 1241 being convex in a paraxial region thereof and an image-side surface 1242 being concave in a paraxial region thereof. The fourth lens element 1240 is made of plastic material and has the object-side surface 1241 and the image-side surface 1242 being both aspheric. The object-side surface 1241 of the fourth lens element 1240 has two inflection points. The image-side surface 1242 of the fourth lens element 1240 has three inflection points.

The fifth lens element 1250 with positive refractive power has an object-side surface 1251 being convex in a paraxial region thereof and an image-side surface 1252 being concave in a paraxial region thereof. The fifth lens element 1250 is made of plastic material and has the object-side surface 1251 and the image-side surface 1252 being both aspheric. The object-side surface 1251 of the fifth lens element 1250 has three inflection points. The image-side surface 1252 of the fifth lens element 1250 has one inflection point and one critical point.

The filter 1260 is made of glass material and located between the fifth lens element 1250 and the image surface 1270, and will not affect the focal length of the image capturing lens system. The image sensor 1280 is disposed on or near the image surface 1270 of the image capturing lens system The detailed optical data of the 12th embodiment are shown in Table 23 and the aspheric surface data are shown in Table 24 below.

TABLE 23

12th embodiment
f = 12.01 mm, Fno = 2.69, HFOV = 12.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.030 | (ASP) | 2.605 | Plastic | 1.545 | 56.0 | 6.24 |
| 2 | | 19.365 | (ASP) | 0.109 | | | | |
| 3 | Ape. Stop | Plano | | 0.423 | | | | |
| 4 | Lens 2 | -9.028 | (ASP) | 0.350 | Plastic | 1.639 | 23.5 | -3.60 |
| 5 | | 3.128 | (ASP) | 0.055 | | | | |
| 6 | Lens 3 | 2.367 | (ASP) | 0.695 | Plastic | 1.544 | 56.0 | 10.17 |
| 7 | | 3.711 | (ASP) | 0.640 | | | | |
| 8 | Lens 4 | 10.648 | (ASP) | 0.350 | Plastic | 1.544 | 56.0 | -12.28 |
| 9 | | 4.058 | (ASP) | 0.055 | | | | |
| 10 | Lens 5 | 3.415 | (ASP) | 0.570 | Plastic | 1.660 | 20.4 | 7.10 |
| 11 | | 11.771 | (ASP) | 0.500 | | | | |
| 12 | Stop | Plano | | 0.500 | | | | |
| 13 | IR-filter | Plano | | 0.210 | Glass | 1.517 | 64.2 | — |
| 14 | | Plano | | 4.089 | | | | |
| 15 | Image | Plano | | — | | | | |

Note:
Reference wavelength is 587.6 nm (d-line).
An effective radius of the stop 1201 (Surface 12) is 1.654 mm.

TABLE 24

Aspheric Coefficients

| Surface # | 1 | 2 | 4 | 5 | 6 |
|---|---|---|---|---|---|
| k = | 4.9950E-02 | -7.8340E+01 | -2.4110E+01 | 3.4274E+00 | 1.2797E+00 |
| A4 = | -2.1814E-03 | 1.0433E-02 | 1.1185E-01 | 2.3544E-01 | 1.0866E-01 |
| A6 = | 1.5059E-03 | -9.6042E-03 | -1.8461E-01 | -4.8788E-01 | -2.8762E-01 |
| A8 = | -1.0183E-03 | 7.3861E-03 | 1.9878E-01 | 4.0983E-01 | 1.2848E-01 |
| A10 = | 3.5772E-04 | -3.2606E-03 | -1.3187E-01 | -3.4629E-02 | 2.1795E-01 |
| A12 = | -7.1581E-05 | 5.8648E-04 | 5.0356E-02 | -1.7027E-01 | -2.9585E-01 |
| A14 = | 7.4335E-06 | -4.4300E-06 | -1.0117E-02 | 1.0308E-01 | 1.3476E-01 |
| A16 = | -3.2276E-07 | -6.8985E-06 | 8.2823E-04 | -1.8752E-02 | -2.1849E-02 |

| Surface # | 7 | 8 | 9 | 10 | 11 |
|---|---|---|---|---|---|
| k = | 5.0535E+00 | 2.6949E+01 | -9.9000E+01 | -1.0408E+01 | 1.2689E+01 |
| A4 = | -5.2529E-02 | 3.9894E-03 | 1.9600E-01 | 3.7393E-02 | -2.2869E-02 |
| A6 = | 1.0339E-01 | -2.8544E-02 | -4.2936E-01 | -1.4159E-01 | 2.0879E-03 |
| A8 = | -2.5957E-01 | 2.4999E-02 | 5.6055E-01 | 1.8405E-01 | -1.5495E-02 |
| A10 = | 3.6489E-01 | -1.0139E-02 | -3.9955E-01 | -9.1397E-02 | 2.9991E-02 |
| A12 = | -2.7572E-01 | -2.7687E-03 | 1.4493E-01 | 1.6231E-03 | -2.2304E-02 |
| A14 = | 1.0898E-01 | 4.4349E-03 | -2.2300E-02 | 1.1822E-02 | 7.4559E-03 |
| A16 = | -1.7686E-02 | -1.0912E-03 | 5.8897E-04 | -2.5916E-03 | -9.3914E-04 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 12.01 | (R3 + R4)/(R3 − R4) | 0.49 |
| Fno | 2.69 | (R7 + R8)/(R7 − R8) | 2.23 |
| HFOV [deg.] | 12.4 | \|f2/f1\| | 0.58 |
| V5 | 20.4 | (f/f1) − (f/f2) | 5.26 |
| V2 + V5 | 43.9 | \|f/f4\| + \|f/f5\| | 2.67 |

-continued

| 12th Embodiment | | | |
|---|---|---|---|
| T23/T12 | 0.10 | tan(HFOV) | 0.22 |
| T23/T45 | 1.00 | Y11/Y52 | 1.57 |
| (T23/T12) + (T34/T45) | 11.74 | Yc21/CT5 | — |
| (T23 + T34)/CT1 | 0.27 | Dsr3/Dsr4 | 0.55 |
| CT2/CT5 | 0.61 | SD/TD | 0.54 |
| CT3/CT5 | 1.22 | BL/TD | 0.91 |
| (CT2 + CT3 + CT4 + CT5)/CT1 | 0.75 | TL/f | 0.93 |
| f/R8 | 2.96 | TL/ImgH | 4.21 |
| \|f/R5\| + \|f/R6\| | 8.31 | — | — |

13th Embodiment

Figure 25:
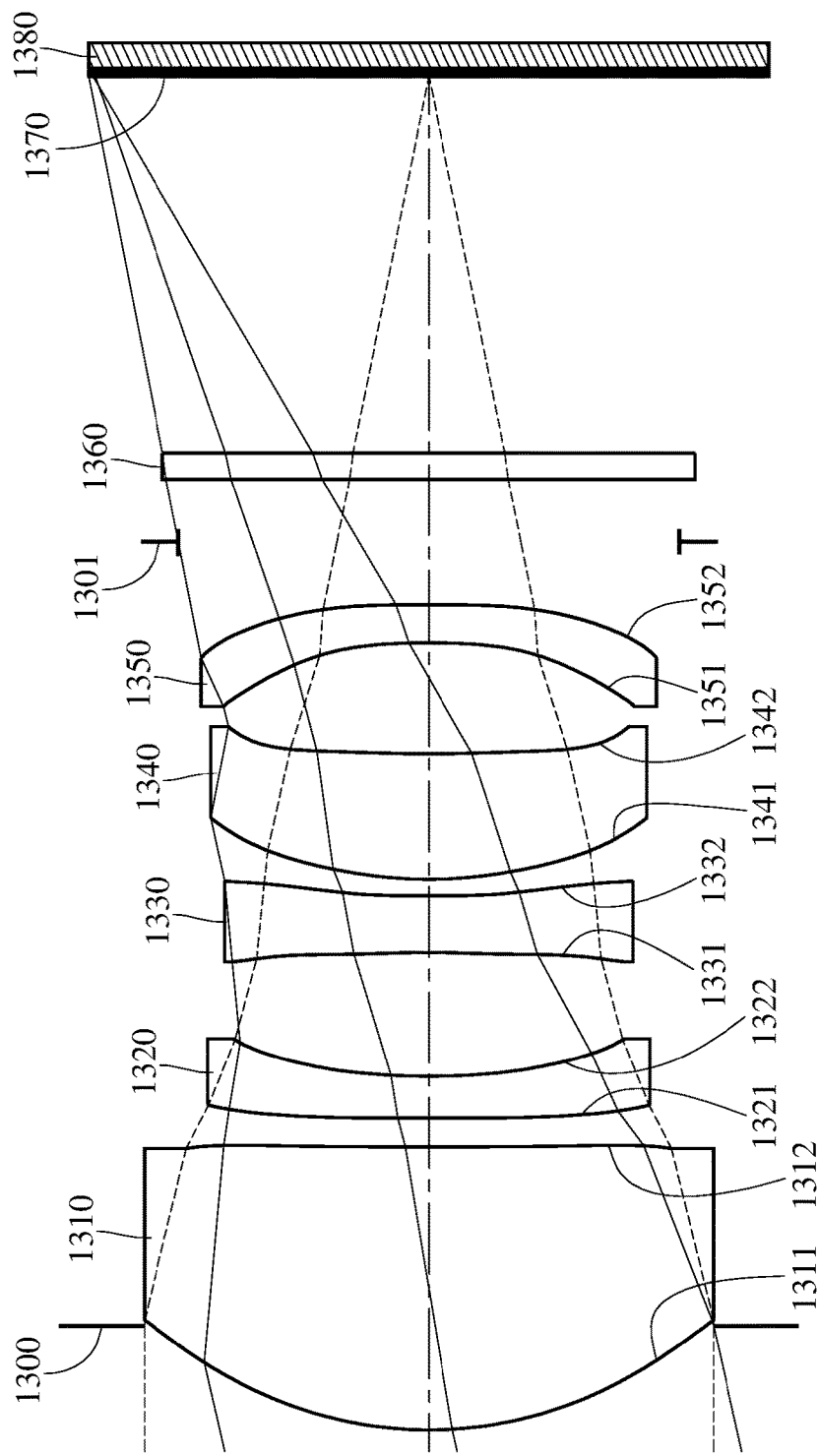
FIG. 25 is a schematic view of an image capturing unit according to the 13th embodiment of the present disclosure.
Figure 26:
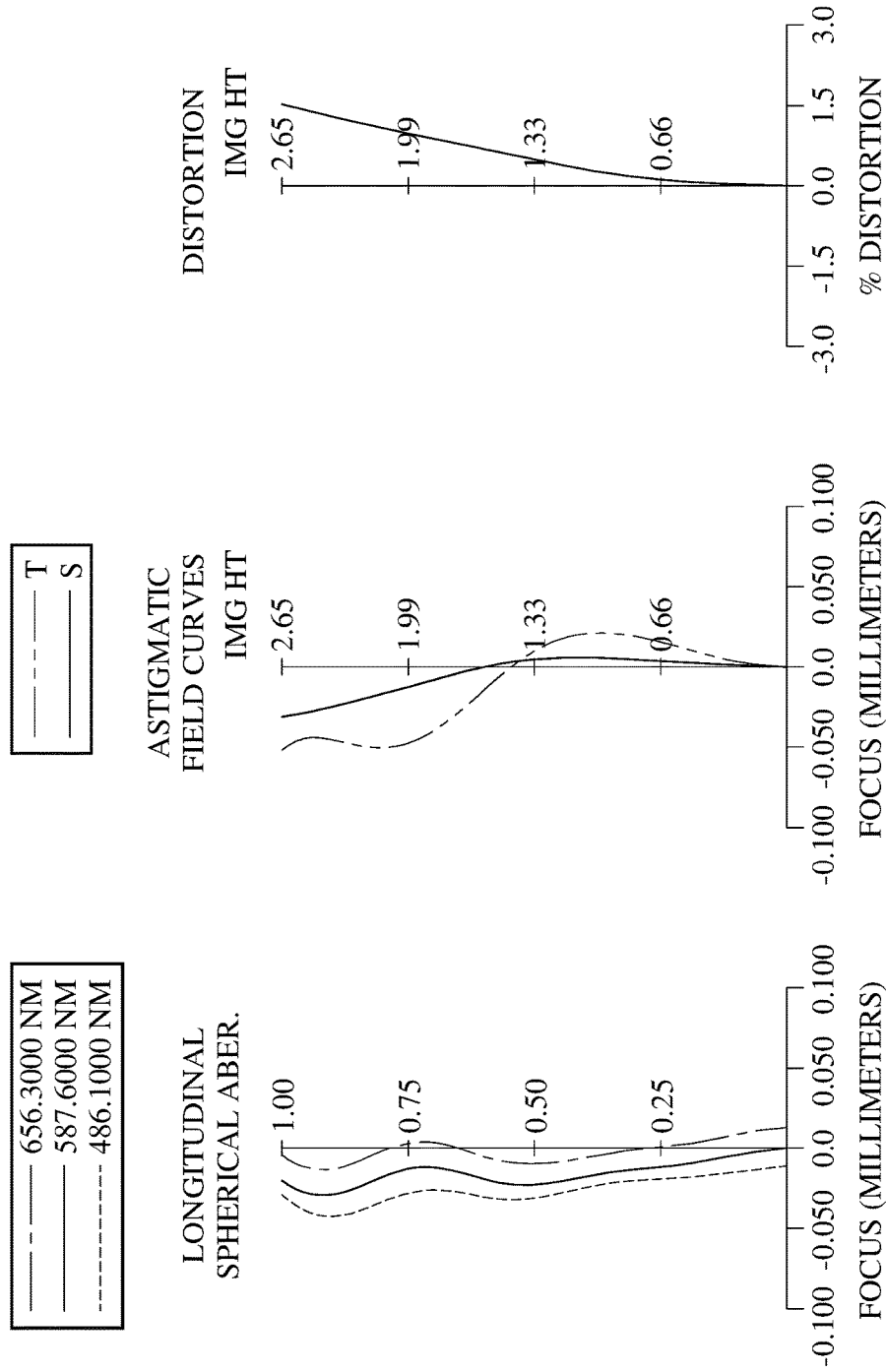
FIG. 26 shows spherical aberration curves, astigmatic field curves and a distortion curve of the image capturing unit according to the 13th embodiment.

FIG. 25 is a schematic view of an image capturing unit according to the 13th embodiment of the present disclosure. FIG. 26 shows, in order from left to right, spherical aberration curves, astigmatic field curves and a distortion curve of the image capturing unit according to the 13th embodiment. In FIG. 25, the image capturing unit includes the image capturing lens system (its reference numeral is omitted) of the present disclosure and an image sensor 1380. The image capturing lens system includes, in order from an object side to an image side, an aperture stop 1300, a first lens element 1310, a second lens element 1320, a third lens element 1330, a fourth lens element 1340, a fifth lens element 1350, a stop 1301, a filter 1360 and an image surface 1370. The image capturing lens system includes five single and non-cemented lens elements (1310, 1320, 1330, 1340 and 1350) with no additional lens element disposed between the first lens element 1310 and the fifth lens element 1350, wherein there is an air gap in a paraxial region between each adjacent lens element.

The first lens element 1310 with positive refractive power has an object-side surface 1311 being convex in a paraxial region thereof and an image-side surface 1312 being concave in a paraxial region thereof. The first lens element 1310 is made of plastic material and has the object-side surface 1311 and the image-side surface 1312 being both aspheric.

The second lens element 1320 with negative refractive power has an object-side surface 1321 being concave in a paraxial region thereof and an image-side surface 1322 being concave in a paraxial region thereof. The second lens element 1320 is made of plastic material and has the object-side surface 1321 and the image-side surface 1322 being both aspheric.

The third lens element 1330 with negative refractive power has an object-side surface 1331 being concave in a paraxial region thereof and an image-side surface 1332 being concave in a paraxial region thereof. The third lens element 1330 is made of plastic material and has the object-side surface 1331 and the image-side surface 1332 being both aspheric.

The fourth lens element 1340 with positive refractive power has an object-side surface 1341 being convex in a paraxial region thereof and an image-side surface 1342 being concave in a paraxial region thereof. The fourth lens element 1340 is made of plastic material and has the object-side surface 1341 and the image-side surface 1342 being both aspheric.

The fifth lens element 1350 with negative refractive power has an object-side surface 1351 being concave in a paraxial region thereof and an image-side surface 1352 being convex in a paraxial region thereof. The fifth lens element 1350 is made of plastic material and has the object-side surface 1351 and the image-side surface 1352 being both aspheric.

The filter 1360 is made of glass material and located between the fifth lens element 1350 and the image surface 1370, and will not affect the focal length of the image capturing lens system. The image sensor 1380 is disposed on or near the image surface 1370 of the image capturing lens system.

The detailed optical data of the 13th embodiment are shown in Table 25 and the aspheric surface data are shown in Table 26 below.

TABLE 25

13th embodiment
f = 11.50 mm, Fno = 2.65, HFOV = 12.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.831 | | | | |
| 2 | Lens 1 | 3.141 | (ASP) | 2.257 | Plastic | 1.545 | 56.0 | 5.88 |
| 3 | | 124.053 | (ASP) | 0.228 | | | | |
| 4 | Lens 2 | −131.058 | (ASP) | 0.335 | Plastic | 1.671 | 19.3 | −9.24 |
| 5 | | 6.517 | (ASP) | 0.987 | | | | |
| 6 | Lens 3 | −7.180 | (ASP) | 0.450 | Plastic | 1.671 | 19.3 | −9.54 |
| 7 | | 60.501 | (ASP) | 0.131 | | | | |
| 8 | Lens 4 | 3.586 | (ASP) | 1.004 | Plastic | 1.671 | 19.3 | 7.58 |
| 9 | | 10.785 | (ASP) | 0.882 | | | | |
| 10 | Lens 5 | −6.967 | (ASP) | 0.304 | Plastic | 1.544 | 56.0 | −15.10 |
| 11 | | −46.512 | (ASP) | 0.500 | | | | |
| 12 | Stop | Plano | | 0.500 | | | | |
| 13 | IR-filter | Plano | | 0.210 | Glass | 1.517 | 64.2 | — |
| 14 | | Plano | | 2.999 | | | | |
| 15 | Image | Plano | | — | | | | |

Note:
Reference wavelength is 587.6 nm (d-line).
An effective radius of the aperture stop 1300 (Surface 1) is 2.262 mm.
An effective radius of the stop 1301 (Surface 12) is 1.991 mm.

TABLE 26

Aspheric Coefficients

| Surface # | 2 | 3 | 4 | 5 | 6 |
|---|---|---|---|---|---|
| k = | −2.0465E−01 | −9.9000E+01 | 9.9000E+01 | −9.9000E+01 | 1.0736E+01 |
| A4 = | −3.7153E−04 | −1.1738E−03 | 2.6179E−02 | 8.3676E−02 | 1.4383E−01 |
| A6 = | 1.6410E−04 | 4.2343E−03 | −1.3145E−02 | −5.7829E−02 | −1.4839E−01 |
| A8 = | −1.1085E−04 | −1.9994E−03 | 4.5348E−03 | 2.5640E−02 | 8.5070E−02 |
| A10 = | 2.7014E−05 | 2.4212E−04 | −6.9219E−04 | −6.1403E−03 | −3.1839E−02 |

TABLE 26-continued

| Aspheric Coefficients | | | | |
|---|---|---|---|---|
| A12 = | −4.1834E−06 | −7.1362E−06 | 4.0785E−05 | 7.8269E−04 | 7.2324E−03 |
| A14 = | — | — | — | — | −6.9795E−04 |

| Surface # | 7 | 8 | 9 | 10 | 11 |
|---|---|---|---|---|---|
| k = | 9.9000E+01 | 2.4607E+00 | 2.5526E+01 | 1.6210E+01 | −9.9000E+01 |
| A4 = | 1.7605E−01 | 1.7759E−02 | −4.4855E−02 | −1.0220E−01 | −8.4882E−02 |
| A6 = | −2.2593E−01 | −7.7333E−02 | 3.3506E−02 | 4.2439E−02 | 4.5469E−02 |
| A8 = | 1.5322E−01 | 7.1251E−02 | −2.0559E−02 | −6.8850E−03 | −2.3982E−02 |
| A10 = | −6.0942E−02 | −3.0705E−02 | 1.5927E−02 | −3.2846E−03 | 1.1195E−02 |
| A12 = | 1.3044E−02 | 6.5606E−03 | −6.8386E−03 | 3.7871E−03 | −3.7954E−03 |
| A14 = | −1.1400E−03 | −5.7494E−04 | 1.6941E−03 | −1.3151E−03 | 7.5551E−04 |
| A16 = | — | — | −1.9241E−04 | 1.6298E−04 | −6.8348E−05 |

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 11.50 | (R3 + R4)/(R3 − R4) | 0.91 |
| Fno | 2.65 | (R7 + R8)/(R7 − R8) | −2.00 |
| HFOV [deg.] | 12.8 | |f2/f1| | 1.57 |
| V5 | 56.0 | (f/f1) − (f/f2) | 3.20 |
| V2 + V5 | 75.3 | |f/f4| + |f/f5| | 2.28 |
| T23/T12 | 4.33 | tan(HFOV) | 0.23 |
| T23/T45 | 1.12 | Y11/Y52 | 1.25 |
| (T23/T12) + (T34/T45) | 4.48 | Yc21/CT5 | 0.92 |
| (T23 + T34)/CT1 | 0.50 | Dsr3/Dsr4 | 0.83 |
| CT2/CT5 | 1.10 | SD/TD | 0.87 |
| CT3/CT5 | 1.48 | BL/TD | 0.64 |
| (CT2 + CT3 + CT4 + CT5)/CT1 | 0.93 | TL/f | 0.94 |
| f/R8 | 1.07 | TL/ImgH | 4.07 |
| |f/R5| + |f/R6| | 1.79 | — | — |

14th Embodiment

Figure 27:
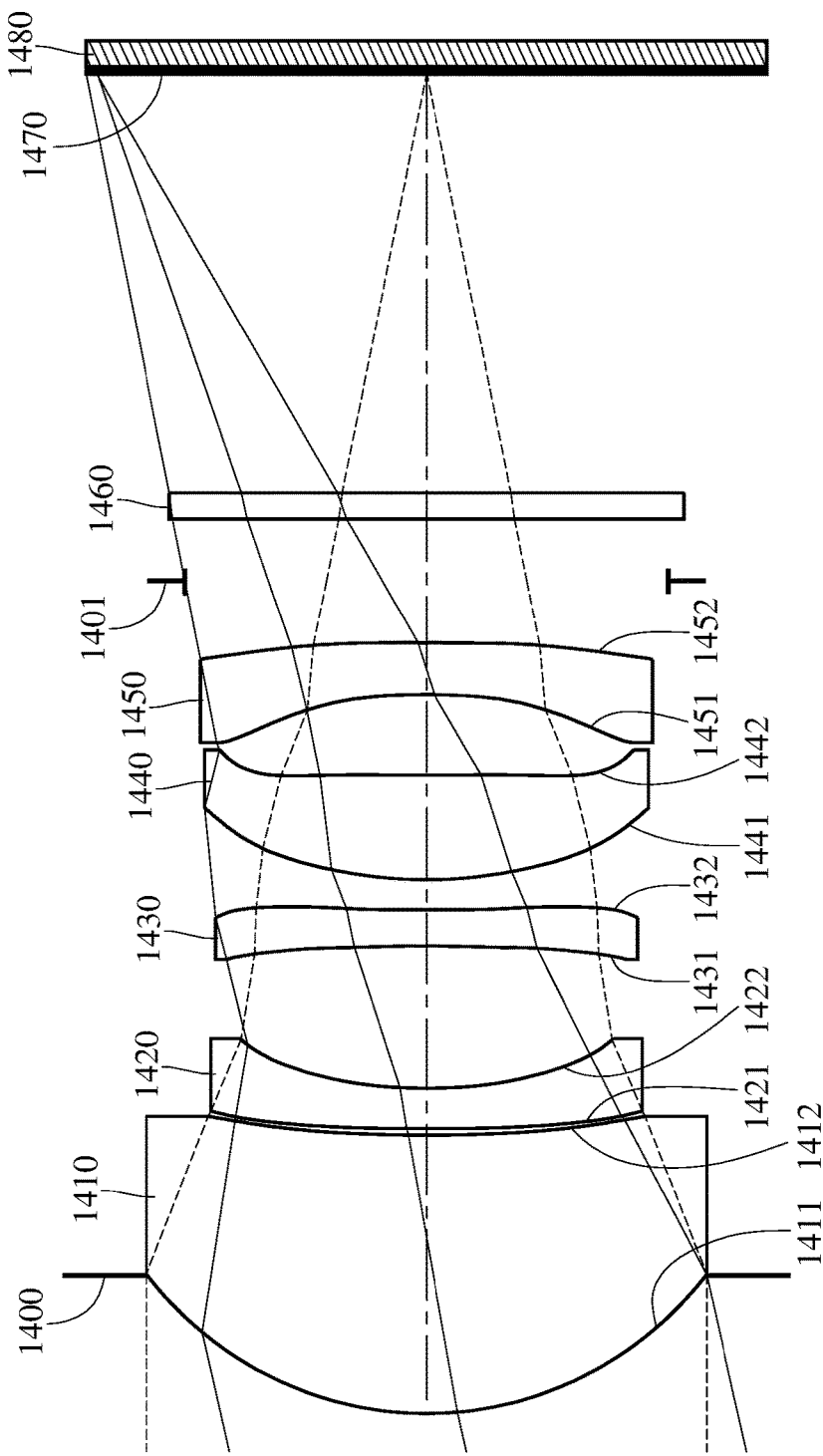
FIG. 27 is a schematic view of an image capturing unit according to the 14th embodiment of the present disclosure.
Figure 28:
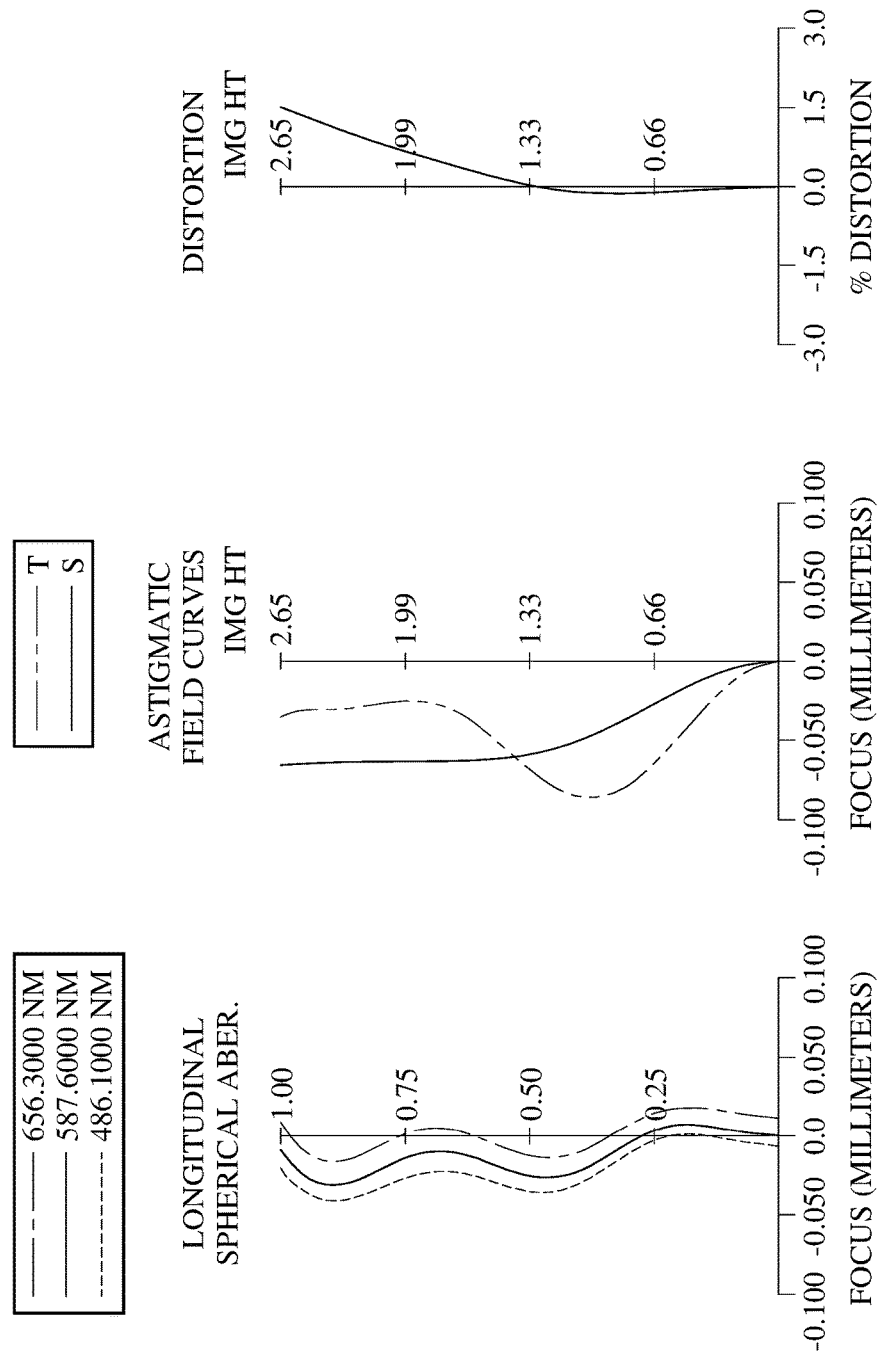
FIG. 28 shows spherical aberration curves, astigmatic field curves and a distortion curve of the image capturing unit according to the 14th embodiment.

FIG. 27 is a schematic view of an image capturing unit according to the 14th embodiment of the present disclosure. FIG. 28 shows, in order from left to right, spherical aberration curves, astigmatic field curves and a distortion curve of the image capturing unit according to the 14th embodiment. In FIG. 27, the image capturing unit includes the image capturing lens system (its reference numeral is omitted) of the present disclosure and an image sensor 1480. The image capturing lens system includes, in order from an object side to an image side, an aperture stop 1400, a first lens element 1410, a second lens element 1420, a third lens element 1430, a fourth lens element 1440, a fifth lens element 1450, a stop 1401, a filter 1460 and an image surface 1470. The image capturing lens system includes five single and non-cemented lens elements (1410, 1420, 1430, 1440 and 1450) with no additional lens element disposed between the first lens element 1410 and the fifth lens element 1450, wherein there is an air gap in a paraxial region between each adjacent lens element.

The first lens element 1410 with positive refractive power has an object-side surface 1411 being convex in a paraxial region thereof and an image-side surface 1412 being concave in a paraxial region thereof. The first lens element 1410 is made of plastic material and has the object-side surface 1411 and the image-side surface 1412 being both aspheric.

The second lens element 1420 with negative refractive power has an object-side surface 1421 being convex in a paraxial region thereof and an image-side surface 1422 being concave in a paraxial region thereof. The second lens element 1420 is made of plastic material and has the object-side surface 1421 and the image-side surface 1422 being both aspheric.

The third lens element 1430 with negative refractive power has an object-side surface 1431 being concave in a paraxial region thereof and an image-side surface 1432 being convex in a paraxial region thereof. The third lens element 1430 is made of plastic material and has the object-side surface 1431 and the image-side surface 1432 being both aspheric.

The fourth lens element 1440 with positive refractive power has an object-side surface 1441 being convex in a paraxial region thereof and an image-side surface 1442 being concave in a paraxial region thereof. The fourth lens element 1440 is made of plastic material and has the object-side surface 1441 and the image-side surface 1442 being both aspheric. The object-side surface 1441 of the fourth lens element 1440 has one inflection point. The image-side surface 1442 of the fourth lens element 1440 has two inflection points.

The fifth lens element 1450 with negative refractive power has an object-side surface 1451 being concave in a paraxial region thereof and an image-side surface 1452 being concave in a paraxial region thereof. The fifth lens element 1450 is made of plastic material and has the object-side surface 1451 and the image-side surface 1452 being both aspheric. The object-side surface 1451 of the fifth lens element 1450 has one inflection point and one critical point. The image-side surface 1452 of the fifth lens element 1450 has one inflection point and one critical point.

The filter 1460 is made of glass material and located between the fifth lens element 1450 and the image surface 1470, and will not affect the focal length of the image capturing lens system. The image sensor 1480 is disposed on or near the image surface 1470 of the image capturing lens system.

The detailed optical data of the 14th embodiment are shown in Table 27 and the aspheric surface data are shown in Table 28 below.

TABLE 27

14th embodiment
f = 11.51 mm, Fno = 2.55, HFOV = 12.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.110 | | | | |
| 2 | Lens 1 | 2.804 | (ASP) | 2.246 | Plastic | 1.545 | 56.0 | 6.05 |
| 3 | | 13.497 | (ASP) | 0.052 | | | | |
| 4 | Lens 2 | 53.703 | (ASP) | 0.325 | Plastic | 1.671 | 19.3 | −7.76 |
| 5 | | 4.736 | (ASP) | 1.146 | | | | |
| 6 | Lens 3 | −7.161 | (ASP) | 0.289 | Plastic | 1.660 | 20.4 | −13.25 |
| 7 | | −40.226 | (ASP) | 0.247 | | | | |
| 8 | Lens 4 | 3.571 | (ASP) | 0.841 | Plastic | 1.671 | 19.3 | 6.02 |
| 9 | | 27.845 | (ASP) | 0.648 | | | | |
| 10 | Lens 5 | −7.064 | (ASP) | 0.419 | Plastic | 1.650 | 21.5 | −9.69 |
| 11 | | 59.771 | (ASP) | 0.500 | | | | |
| 12 | Stop | Plano | | 0.500 | | | | |
| 13 | IR-filter | Plano | | 0.210 | Glass | 1.517 | 64.2 | — |
| 14 | | Plano | | 3.373 | | | | |
| 15 | Image | Plano | | — | | | | |

Note:
Reference wavelength is 587.6 nm (d-line).
An effective radius of the stop 1401 (Surface 12) is 1.946 mm.

TABLE 28

Aspheric Coefficients

| Surface # | 2 | 3 | 4 | 5 | 6 |
|---|---|---|---|---|---|
| k = | −1.0799E−01 | 2.0252E+01 | −8.0340E+01 | −4.1945E+01 | 1.2247E+01 |
| A4 = | −5.7613E−04 | 1.1991E−04 | 4.1935E−02 | 1.1295E−01 | 1.7225E−01 |
| A6 = | 5.0481E−04 | 4.7394E−03 | −3.4361E−02 | −8.6655E−02 | −2.3059E−01 |
| A8 = | −8.8827E−05 | −1.9780E−03 | 1.5574E−02 | 4.2502E−02 | 1.5004E−01 |
| A10 = | 1.5921E−05 | 2.0858E−04 | −3.2841E−03 | −1.0039E−02 | −5.0878E−02 |
| A12 = | −1.5293E−06 | 3.5783E−06 | 2.7237E−04 | 1.2014E−03 | 8.5971E−03 |
| A14 = | — | — | — | — | −5.7152E−04 |

| Surface # | 7 | 8 | 9 | 10 | 11 |
|---|---|---|---|---|---|
| k = | 9.9000E+01 | 2.1313E+00 | 9.9000E+01 | 1.0486E+01 | −9.9000E+01 |
| A4 = | 1.9043E−01 | 1.7786E−02 | −4.4982E−02 | −9.4701E−02 | −6.8194E−02 |
| A6 = | −3.0358E−01 | −7.6797E−02 | 3.1568E−02 | 4.4275E−02 | 5.5374E−02 |
| A8 = | 2.2140E−01 | 7.1756E−02 | −1.9789E−02 | −7.2973E−03 | −3.8734E−02 |
| A10 = | −8.4951E−02 | −3.0517E−02 | 1.5993E−02 | −3.5145E−03 | 2.1228E−02 |
| A12 = | 1.6303E−02 | 6.5808E−03 | −6.9533E−03 | 3.6712E−03 | −7.3834E−03 |
| A14 = | −1.2505E−03 | −5.9644E−04 | 1.6955E−03 | −1.3052E−03 | 1.3909E−03 |
| A16 = | — | — | −1.7419E−04 | 1.7957E−04 | −1.0774E−04 |

In the 14th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 14th embodiment, so an explanation in this regard will not be provided again.

Moreover, these parameters can be calculated from Table 27 and Table 28 as the following values and satisfy the following conditions:

| 14th Embodiment | | | |
|---|---|---|---|
| f [mm] | 11.51 | (R3 + R4)/(R3 − R4) | 1.19 |
| Fno | 2.55 | (R7 + R8)/(R7 − R8) | −1.29 |
| HFOV [deg.] | 12.8 | \|f2/f1\| | 1.28 |
| V5 | 21.5 | (f/f1) − (f/f2) | 3.38 |
| V2 + V5 | 40.8 | \|f/f4\| + \|f/f5\| | 3.10 |
| T23/T12 | 22.04 | tan(HFOV) | 0.23 |

-continued

| 14th Embodiment | | | |
|---|---|---|---|
| T23/T45 | 1.77 | Y11/Y52 | 1.24 |
| (T23/T12) + (T34/T45) | 22.42 | Yc21/CT5 | — |
| (T23 + T34)/CT1 | 0.62 | Dsr3/Dsr4 | 0.79 |
| CT2/CT5 | 0.78 | SD/TD | 0.82 |
| CT3/CT5 | 0.69 | BL/TD | 0.74 |
| (CT2 + CT3 + CT4 + CT5)/CT1 | 0.83 | TL/f | 0.94 |
| f/R8 | 0.41 | TL/ImgH | 4.07 |
| \|f/R5\| + \|f/R6\| | 1.89 | — | — |

15th Embodiment

Figure 29:
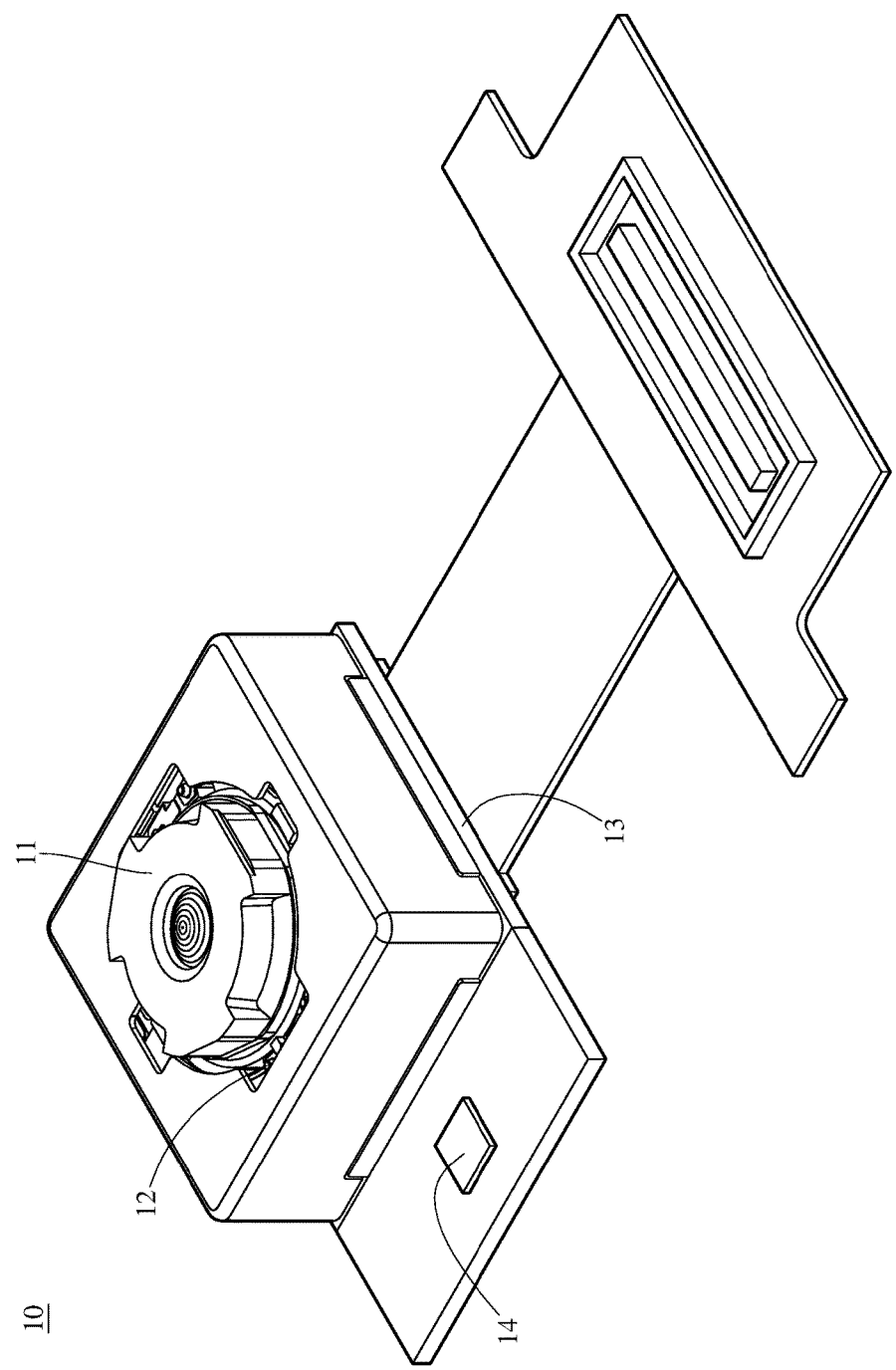
FIG. 29 is a perspective view of an image capturing unit according to the 15th embodiment of the present disclosure.

FIG. 29 is a perspective view of an image capturing unit according to the 15th embodiment of the present disclosure. In this embodiment, an image capturing unit 10 is a camera module including a lens unit 11, a driving device 12, an image sensor 13 and an image stabilizer 14. The lens unit 11 includes the image capturing lens system disclosed in the 1st embodiment, a barrel and a holder member (their reference numerals are omitted) for holding the image capturing lens system. The imaging light converges into the lens unit 11 of the image capturing unit 10 to generate an image with the driving device 12 utilized for focusing the image on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the image capturing lens system to provide higher image quality.

The image stabilizer 14, such as an accelerometer, a gyroscope and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

16th Embodiment

Figure 30:
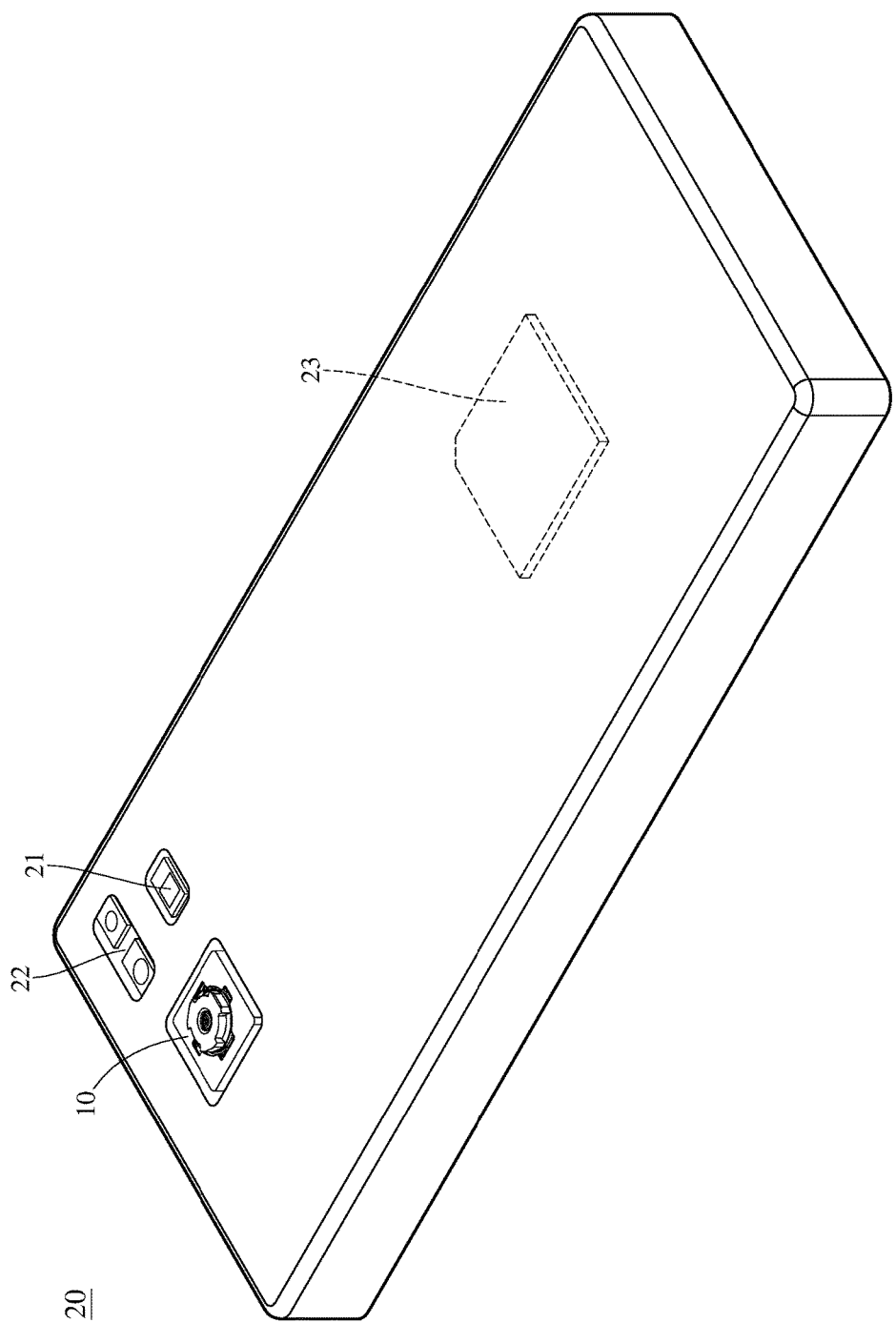
FIG. 30 is one perspective view of an electronic device according to the 16th embodiment of the present disclosure.
Figure 31:
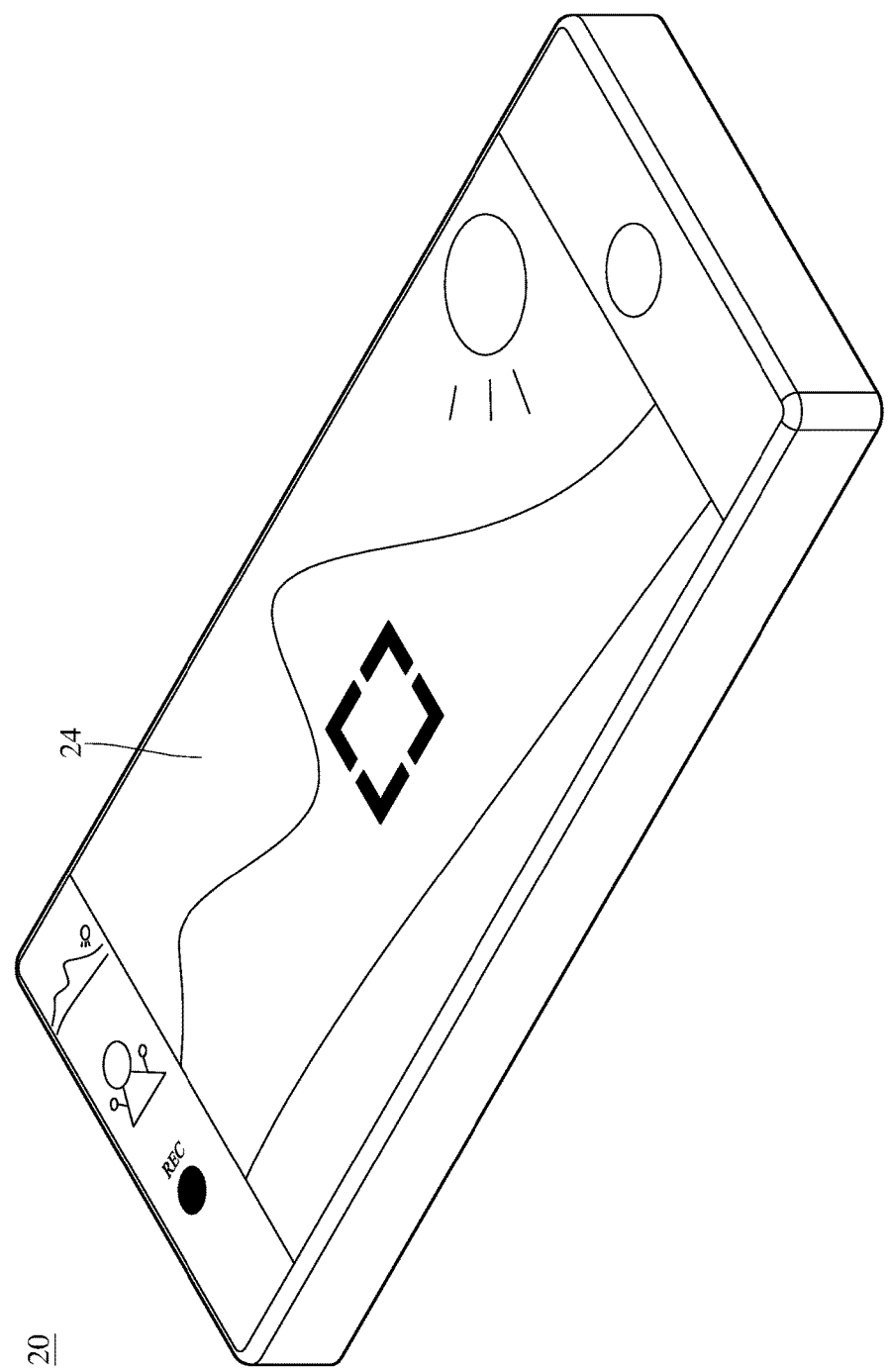
FIG. 31 is another perspective view of the electronic device in FIG. 30.
Figure 32:
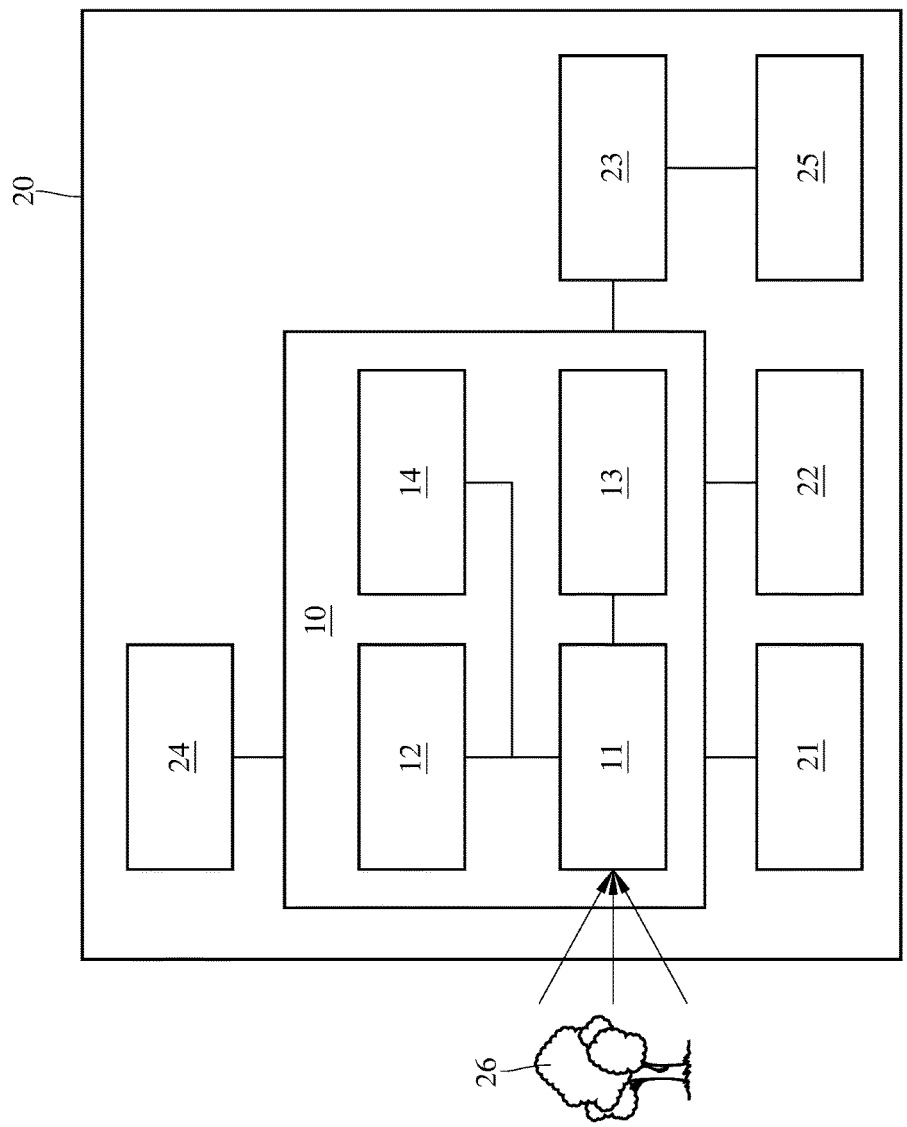
FIG. 32 is a block diagram of the electronic device in FIG. 30.

FIG. 30 is one perspective view of an electronic device according to the 16th embodiment of the present disclosure. FIG. 31 is another perspective view of the electronic device in FIG. 30. FIG. 32 is a block diagram of the electronic device in FIG. 30. In this embodiment, an electronic device 20 is a smartphone including the image capturing unit 10 disclosed in the 15th embodiment, a flash module 21, a focus assist module 22, an image signal processor 23, a user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user captures images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve the image quality. The light beam emitted from the focus assist module 22 can be either conventional infrared or laser. The user interface 24 can be a touch screen or a physical button. The user is able to interact with the user interface 24 and the image software processor 25 having multiple functions to capture images and enable further image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the image capturing lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, motion sensing input devices, wearable devices and other electronic imaging devices.

The foregoing description, for the purpose of explanation, has been described with reference to specific embodiments. It is to be noted that TABLES 1-28 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system comprising five lens elements, the five lens elements being, in order from an object side to an image side, a first lens element, a second lens element, a third lens element, a fourth lens element and a fifth lens element, each of the five lens elements having an object-side surface facing toward the object side and an image-side surface facing toward the image side, the first lens element having positive refractive power, the object-side surface of the first lens element being convex in a paraxial region thereof, and the second lens element having negative refractive power;

wherein at least one surface among the object-side surfaces and the image-side surfaces of the five lens elements is aspheric, the image capturing lens system further comprises an aperture stop disposed between an imaged object and the object-side surface of the second lens element, a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the second lens element and the third lens element is T23, an axial distance between the third lens element and the fourth lens element is T34, a curvature radius of the object-side surface of the fourth lens element is R7, a curvature radius of the image-side surface of the fourth lens element is R8, an axial distance between the aperture stop and the object-side surface of the second lens element is Dsr3, an axial distance between the aperture stop and the image-side surface of the second lens element is Dsr4, and the following conditions are satisfied:

$0.20 < (CT2+CT3+CT4+CT5)/CT1 < 1.0;$ $0 < (T23+T34)/CT1 < 0.70;$ $-2.50 < (R7+R8)/(R7-R8) < 8.0;$ and $|Dsr3/Dsr4| < 1.0.$ 2. The image capturing lens system of claim 1, wherein a focal length of the first lens element is f1, a focal length of the second lens element is f2, and the following condition is satisfied:

$0.10<|f2/f1|<1.20$.

3. The image capturing lens system of claim 1, wherein the central thickness of the first lens element is CT1, the central thickness of the second lens element is CT2, the central thickness of the third lens element is CT3, the central thickness of the fourth lens element is CT4, the central thickness of the fifth lens element is CT5, and the following condition is satisfied:

$0.30<(CT2+CT3+CT4+CT5)/CT1<0.90$.

4. The image capturing lens system of claim 1, wherein there is an air gap in a paraxial region between each of the five adjacent lens elements of the image capturing lens system, and the image-side surface of the fourth lens element is concave in a paraxial region thereof.

5. The image capturing lens system of claim 1, wherein an Abbe number of the second lens element is V2, an Abbe number of the fifth lens element is V5, and the following condition is satisfied:

$20<V2+V5<80$.

6. The image capturing lens system of claim 1, wherein an axial distance between the aperture stop and the image-side surface of the fifth lens element is SD, an axial distance between the object-side surface of the first lens element and the image-side surface of the fifth lens element is TD, an axial distance between the object-side surface of the first lens element and an image surface is TL, a maximum image height of the image capturing lens system is ImgH, and the following conditions are satisfied:

$0.40<SD/TD<0.95$; and $3.0<TL/ImgH<4.50$.

7. The image capturing lens system of claim 1, wherein a focal length of the image capturing lens system is f, a focal length of the fourth lens element is f4, a focal length of the fifth lens element is f5, and the following condition is satisfied:

$0.20<|f/f4|+|f/f5|<3.0$.

8. The image capturing lens system of claim 1, wherein a focal length of the image capturing lens system is f, a curvature radius of the object-side surface of the third lens element is R5, a curvature radius of the image-side surface of the third lens element is R6, and the following condition is satisfied:

$1.0<|f/R5|+|f/R6|<12.0$.

9. The image capturing lens system of claim 1, wherein a curvature radius of the object-side surface of the second lens element is R3, a curvature radius of the image-side surface of the second lens element is R4, and the following condition is satisfied:

$-1.50<(R3+R4)/(R3-R4)<0.95$.

10. The image capturing lens system of claim 1, wherein an axial distance between the object-side surface of the first lens element and an image surface is TL, a focal length of the image capturing lens system is f, and the following condition is satisfied:

$0.70<TL/f<1.10$.

11. The image capturing lens system of claim 1, wherein a maximum effective radius of the object-side surface of the first lens element is Y11, a maximum effective radius of the image-side surface of the fifth lens element is Y52, an axial distance between the first lens element and the second lens element is T12, the axial distance between the second lens element and the third lens element is T23, the axial distance between the third lens element and the fourth lens element is T34, an axial distance between the fourth lens element and the fifth lens element is T45, and the following conditions are satisfied:

$0.90<Y11/Y52<2.30$; and $0.10<(T23/T12)+(T34/T45)<30.0$.

12. An image capturing lens system comprising five lens elements, the five lens elements being, in order from an object side to an image side, a first lens element, a second lens element, a third lens element, a fourth lens element and a fifth lens element, each of the five lens elements having an object-side surface facing toward the object side and an image-side surface facing toward the image side, the first lens element having positive refractive power, the fourth lens element having negative refractive power, and the image-side surface of the fifth lens element being concave in a paraxial region thereof;

wherein at least one surface among the object-side surfaces and the image-side surfaces of the five lens elements is aspheric, a central thickness of the first lens element is CT1, a central thickness of the second lens element is CT2, a central thickness of the third lens element is CT3, a central thickness of the fourth lens element is CT4, a central thickness of the fifth lens element is CT5, a curvature radius of the object-side surface of the second lens element is R3, a curvature radius of the image-side surface of the second lens element is R4, half of a maximum field of view of the image capturing lens system is HFOV, and the following conditions are satisfied:

$0.20<(CT2+CT3+CT4+CT5)/CT1<1.40$;

$0.60<CT3/CT5<1.90$;

$-1.50<(R3+R4)/(R3-R4)<2.0$; and $0.10<\tan(HFOV)<0.30$.

13. The image capturing lens system of claim 12, wherein the second lens element has negative refractive power, a focal length of the image capturing lens system is f, a curvature radius of the image-side surface of the fourth lens element is R8, and the following condition is satisfied:

$-0.50<f/R8<7.50$.

14. The image capturing lens system of claim 12, wherein an Abbe number of the second lens element is V2, an Abbe number of the fifth lens element is V5, and the following condition is satisfied:

$20<V2+V5<80$.

15. The image capturing lens system of claim 12, wherein there is an air gap in a paraxial region between each of the five adjacent lens elements of the image capturing lens system, the image-side surface of the fourth lens element is concave in a paraxial region thereof, and at least one of the object-side surface and the image-side surface of the fourth lens element has at least one inflection point.

16. The image capturing lens system of claim 12, wherein a focal length of the image capturing lens system is f, a focal length of the first lens element is f1, a focal length of the second lens element is f2, and the following condition is satisfied:

$$3.80<(f/f1)-(f/f2)<5.50.$$

17. The image capturing lens system of claim 12, wherein at least one of the five lens elements of the image capturing lens system has an Abbe number smaller than 21.0.

18. The image capturing lens system of claim 12, wherein an axial distance between the second lens element and the third lens element is T23, an axial distance between the fourth lens element and the fifth lens element is T45, and the following condition is satisfied:

$$0<T23/T45<4.50.$$

19. An image capturing lens system comprising five lens elements, the five lens elements being, in order from an object side to an image side, a first lens element, a second lens element, a third lens element, a fourth lens element and a fifth lens element, each of the five lens elements having an object-side surface facing toward the object side and an image-side surface facing toward the image side, the first lens element having positive refractive power, and the image-side surface of the fifth lens element being concave in a paraxial region thereof;

wherein at least one surface among the object-side surfaces and the image-side surfaces of the five lens elements is aspheric, a central thickness of the first lens element is CT1, a central thickness of the second lens element is CT2, a central thickness of the third lens element is CT3, a central thickness of the fourth lens element is CT4, a central thickness of the fifth lens element is CT5, an Abbe number of the fifth lens element is V5, a curvature radius of the object-side surface of the second lens element is R3, a curvature radius of the image-side surface of the second lens element is R4, and the following conditions are satisfied:

$$0.20<(CT2+CT3+CT4+CT5)/CT1<1.40;$$

$$0.40<CT3/CT5<2.50;$$

$$10.0<V5<25.0; \text{ and}$$

$$-1.50<(R3+R4)/(R3-R4)<2.0.$$

20. The image capturing lens system of claim 19, wherein at least one of the object-side surface and the image-side surface of the fifth lens element has at least one inflection point.

21. The image capturing lens system of claim 19, wherein a focal length of the image capturing lens system is f, a curvature radius of the object-side surface of the third lens element is R5, a curvature radius of the image-side surface of the third lens element is R6, and the following condition is satisfied:

$$1.0<|f/R5|+|f/R6|<12.0.$$

22. The image capturing lens system of claim 19, wherein half of a maximum field of view of the image capturing lens system is HFOV, the central thickness of the second lens element is CT2, the central thickness of the fifth lens element is CT5, and the following conditions are satisfied:

$$0.10<\tan(HFOV)<0.30; \text{ and}$$

$$0.42<CT2/CT5<1.60.$$

23. The image capturing lens system of claim 19, wherein a focal length of the first lens element is f1, a focal length of the second lens element is f2, an axial distance between the first lens element and the second lens element is T12, an axial distance between the second lens element and the third lens element is T23, and the following conditions are satisfied:

$$0.10<|f2/f1|<1.20; \text{ and}$$

$$0<T23/T12<4.0.$$

24. The image capturing lens system of claim 19, wherein at least three of the five lens elements of the image capturing lens system are made of plastic material, and at least one of the five lens elements has an Abbe number smaller than 22.0.

25. An image capturing unit, comprising:
the image capturing lens system of claim 19;
a reflector disposed on either the object side of the image capturing lens system or the image side of the image capturing lens system; and
an image sensor disposed on an image surface of the image capturing lens system.

26. An electronic device, comprising:
the image capturing unit of claim 25.

27. An image capturing lens system comprising five lens elements, the five lens elements being, in order from an object side to an image side, a first lens element, a second lens element, a third lens element, a fourth lens element and a fifth lens element, each of the five lens elements having an object-side surface facing toward the object side and an image-side surface facing toward the image side, and the first lens element having positive refractive power;

wherein at least one surface among the object-side surfaces and the image-side surfaces of the five lens elements is aspheric, a central thickness of the first lens element is CT1, a central thickness of the second lens element is CT2, a central thickness of the third lens element is CT3, a central thickness of the fourth lens element is CT4, a central thickness of the fifth lens element is CT5, an Abbe number of the fifth lens element is V5, an axial distance between the second lens element and the third lens element is T23, an axial distance between the third lens element and the fourth lens element is T34, and the following conditions are satisfied:

$$0.20<(CT2+CT3+CT4+CT5)/CT1<1.40;$$

$$0.60<CT3/CT5<1.90;$$

$$10.0<V5<23.0; \text{ and}$$

$$0<(T23+T34)/CT1<1.50.$$

28. The image capturing lens system of claim 27, wherein a maximum effective radius of the object-side surface of the first lens element is Y11, a maximum effective radius of the image-side surface of the fifth lens element is Y52, and the following condition is satisfied:

$$0.90<Y11/Y52<2.30.$$

29. The image capturing lens system of claim 27, wherein an axial distance between the image-side surface of the fifth lens element and an image surface is BL, an axial distance between the object-side surface of the first lens element and the image-side surface of the fifth lens element is TD, a focal length of the image capturing lens system is f, and the following conditions are satisfied:

$$0.40<BL/TD<2.50; \text{ and}$$

$$9.0 \text{ [mm]}<f<20.0 \text{ [mm]}.$$

30. The image capturing lens system of claim 27, wherein the axial distance between the second lens element and the third lens element is T23, an axial distance between the fourth lens element and the fifth lens element is T45, and the following condition is satisfied:

$$0 < T23/T45 < 4.50.$$

31. The image capturing lens system of claim 27, wherein a vertical distance between a non-axial critical point on the object-side surface of the second lens element and an optical axis is Yc21, the central thickness of the fifth lens element is CT5, and the following condition is satisfied:

$$0.30 < Yc21/CT5 < 5.50.$$

32. The image capturing lens system of claim 27, wherein a focal length of the image capturing lens system is f, a focal length of the fourth lens element is f4, a focal length of the fifth lens element is f5, and the following condition is satisfied:

$$0.20 < |f/f4| + |f/f5| < 3.0.$$

33. The image capturing lens system of claim 27, wherein at least three of the five lens elements of the image capturing lens system are made of plastic material, and at least one of the five lens elements has an Abbe number smaller than 22.0.

* * * * *